(12) United States Patent
Jabri et al.

(10) Patent No.: US 7,680,143 B2
(45) Date of Patent: Mar. 16, 2010

(54) METHODS AND APPARATUS FOR COMBINING SESSION ACCELERATION TECHNIQUES FOR MEDIA ORIENTED NEGOTIATION ACCELERATION

(75) Inventors: Marwan A. Jabri, Tiburon, CA (US); David Jack, Glebe (AU); Robert Jongbloed, Rozelle (AU); Brody Kenrick, San Francisco, CA (US); David Myers, Glebe (AU); Mohammed Raad, Cringila (AU); Craig Southeren, Holgate (AU); Albert C. Wong, Rohnert Park, CA (US)

(73) Assignee: RPX Corporation, San Francisco, CA (US)

( * ) Notice: Subject to any disclaimer, the term of this patent is extended or adjusted under 35 U.S.C. 154(b) by 363 days.

(21) Appl. No.: 11/734,209
(22) Filed: Apr. 11, 2007

(65) Prior Publication Data
US 2007/0297352 A1 Dec. 27, 2007

Related U.S. Application Data

(63) Continuation-in-part of application No. 11/449,904, filed on Jun. 9, 2006, now Pat. No. 7,388,873, which is a continuation of application No. 10/732,917, filed on Dec. 9, 2003, now Pat. No. 7,139,279, application No. 11/734,209, which is a continuation-in-part of application No. 10/934,077, filed on Sep. 3, 2004, now Pat. No. 7,206,316, which is a continuation-in-part of application No. 10/732,917, application No. 11/734,209, which is a continuation-in-part of application No. 11/303,858, filed on Dec. 15, 2005, and a continuation-in-part of application No. 11/408,810, filed on Apr. 21, 2006, and a continuation-in-part of application No. 11/482,515, filed on Jul. 7, 2006, and a continuation-in-part of application No. 11/548,670, filed on Oct. 11, 2006, now abandoned, which is a continuation-in-part of application No. 10/732,917, application No. 11/734,209, which is a continuation-in-part of application No. 11/604,177, filed on Nov. 22, 2006, now abandoned.

(60) Provisional application No. 60/791,300, filed on Apr. 11, 2006, provisional application No. 60/433,252, filed on Dec. 12, 2002, provisional application No. 60/636,638, filed on Dec. 15, 2004, provisional application No. 60/674,160, filed on Apr. 21, 2005, provisional application No. 60/697,788, filed on Jul. 8, 2005, provisional application No. 60/725,950, filed on Oct. 11, 2005, provisional application No. 60/739,342, filed on Nov. 23, 2005.

(51) Int. Cl.
*H04J 3/16* (2006.01)
(52) U.S. Cl. .................... 370/437; 370/465; 455/450; 709/237
(58) Field of Classification Search .................. None
See application file for complete search history.

(56) References Cited

U.S. PATENT DOCUMENTS 5,371,734 A 12/1994 Fischer
(Continued)

FOREIGN PATENT DOCUMENTS

EP 1 202 522 A2 5/2002
(Continued)

OTHER PUBLICATIONS

Han, et al., Dept. of Computer Engineering and Information Technology, Design and Implementation of 3G-324M—An Event-Driven Approach, Vehicular Technology Conference, 2004, Sep. 26-29, 2004, pp. 2108-2112.
(Continued)

*Primary Examiner*—Hong Cho
*Assistant Examiner*—Robert C Scheibel
(74) *Attorney, Agent, or Firm*—Townsend and Townsend and Crew LLP

(57) ABSTRACT

A method of establishing a session between a first device and a second device. The session is established over a telecommunications network using an accelerated session setup technique. The method includes providing a first accelerated session setup technique and providing a second accelerated session setup technique. The method also includes establishing the session using either the first accelerated session setup technique or the second accelerated session setup technique based on a predetermined process.

5 Claims, 29 Drawing Sheets

U.S. PATENT DOCUMENTS

| | | | |
|---|---|---|---|
| 5,694,457 | A | 12/1997 | Nixon et al. |
| 5,852,631 | A * | 12/1998 | Scott .......................... 375/222 |
| 6,219,662 | B1 | 4/2001 | Fuh et al. |
| 6,377,818 | B2 | 4/2002 | Irube et al. |
| 6,384,853 | B1 | 5/2002 | Shaffer et al. |
| 6,404,802 | B1 | 6/2002 | Kang et al. |
| 6,625,223 | B1 | 9/2003 | Wimmer et al. |
| 6,636,745 | B2 | 10/2003 | Oprescu-Surcobe et al. |
| 6,654,606 | B1 * | 11/2003 | Foti et al. ................ 455/432.1 |
| 6,694,471 | B1 | 2/2004 | Sharp |
| 6,754,228 | B1 | 6/2004 | Ludwig |
| 6,810,035 | B1 | 10/2004 | Knuutila et al. |
| 6,909,708 | B1 | 6/2005 | Krishnaswamy et al. |
| 6,922,731 | B1 | 7/2005 | Morioka et al. |
| 6,987,974 | B1 | 1/2006 | Mostafa et al. |
| 7,031,279 | B2 | 4/2006 | Lee et al. |
| 7,139,279 | B2 | 11/2006 | Jabri et al. |
| 7,206,316 | B2 | 4/2007 | Jabri et al. |
| 7,227,873 | B2 * | 6/2007 | Lehtimaki ................... 370/467 |
| 7,330,542 | B2 | 2/2008 | Kauhanen et al. |
| 7,388,873 | B2 | 6/2008 | Jabri et al. |
| 7,464,167 | B2 * | 12/2008 | Levent-Levi et al. ........ 709/228 |
| 2002/0114272 | A1 | 8/2002 | Stewart |
| 2003/0202487 | A1 | 10/2003 | Harris |
| 2003/0214573 | A1 * | 11/2003 | Oh .......................... 348/14.01 |
| 2004/0028037 | A1 | 2/2004 | Rasanen et al. |
| 2004/0064351 | A1 | 4/2004 | Mikurak |
| 2004/0076145 | A1 | 4/2004 | Kauhanen et al. |
| 2004/0158647 | A1 | 8/2004 | Omura |
| 2004/0174817 | A1 | 9/2004 | Jabri et al. |
| 2005/0037765 | A1 * | 2/2005 | Rajkotia et al. ............. 455/450 |
| 2005/0193420 | A1 | 9/2005 | Hocevar et al. |
| 2007/0014251 | A1 | 1/2007 | Jabri et al. |
| 2007/0266161 | A1 | 11/2007 | Kenrick et al. |

FOREIGN PATENT DOCUMENTS

| | | |
|---|---|---|
| WO | WO 00/51387 | 8/2000 |
| WO | WO 00/76107 A2 | 12/2000 |
| WO | WO 01/37606 A2 | 5/2001 |
| WO | WO 01/76288 | 10/2001 |
| WO | WO 02/052825 A2 | 7/2002 |
| WO | WO 02/071721 | 9/2002 |
| WO | WO 2004/054221 A1 | 6/2004 |
| WO | WO 2005/055556 | 6/2005 |
| WO | WO 2006/020031 A2 | 2/2006 |
| WO | WO 2006/020031 A3 | 2/2006 |
| WO | WO 2006/066246 A2 | 6/2006 |

OTHER PUBLICATIONS

ITU Study Group 16, Series H: Audiovisual and Multimedia Systems: Infrastructure of Audiovisual services—Systems and terminal equipment for audiovisual services, H.324 Terminal for low bit-rate multimedia communication, Feb. 1998, pp. 1-50.

ITU Study Group 16, Series H: Audiovisual and Multimedia Systems: Infrastructure of Audiovisual services—Systems and terminal equipment for audiovisual services, H.460.6 Extended Fast Connect Feature, Oct. 2002, pp. 1-17, Retrieved from the Internet <<http://ftp3.itu.int/av-arch/avc-site/2001-2004/0210_Gen/h460-6plan.zip>> on Dec. 9, 2005.

ITU-T Recommendation H.245, Series H: Audiovisual and Multimedia Systems: Infrastructure of Audiovisual Services Procedures, Control Protocol for Multimedia Communication, International Telecommunication Union, Sep. 1998, pp. 1-273.

Jabri, The 3G-324M Protocol for Conversational Video Telephony, IEEE Computer Society, 2004, pp. 102-105.

Lee et al., An Implementation of Control Protocol for Multipoint Audio-Video Teleconferencing Systems, Distributed Multimedia Section, ETRI, Taejon, Korea, 4 pages, 1998.

Lindbergh, PictureTel Corporation, The H.324 multimedia communication standard, Communications Magazine, IEEE, vol. 34, Issue 12, Publication Date: Dec. 1996, pp. 46-51.

Nokia, Packet Video, "Fast Media: An enhancement to H.324 call set up", Document Q1-E04, Attachment #1, ITU Telecommunication Standardization Sector, Study Group 16, Q.1/16 Rapporteur Meeting, Geneva, Switzerland (Nov. 30-Dec. 2, 2005), 20 pages.

Nokia, Packet Video, "Fast Media: Changes to H.324", Document Q1-E04, Attachment #2, ITU Telecommunication Standardization Sector, Study Group 16, Q.1/16 Rapporteur Meeting, Geneva, Switzerland (Nov. 30-Dec. 2, 2005), 6 pages.

Nokia, Packet Video, "Fast Media: An enhancement to H.324 call set up", Document Q1-E04, ITU Telecommunication Standardization Sector, Study Group 16, Q.1-16 Rapporteur Meeting, Geneva, Switzerland (Nov. 30-Dec. 2, 2005), 1 page.

Wen et al., Implement of System Control Part in a Multimedia Communication Terminal, State Key Laboratory on Mircrowave & Digital Communications, pp. 1372-1375.

European Search Report of PCT Application EP 07006646, dated Aug. 3, 2007, 2 pages total.

Jabri et al. Dilithium Networks, "Fast session setup extensions to H.324," ITU Telecommunication Standardization Sector, Study Group 16—Delayed Contribution 32, Nov. 16, 2004, pp. 1-18.

Jabri et al. Dilithium Networks, "Proposal of Bearer-Based Fast Session Setup Procedure to H. 324," ITU Telecommunication Standardization Sector Study Group 16, Q.1/16 Rappporteur Meeting, Biel-Bienne, Switzerland 19-20-2005, Document Q1-D16, retrieved from the Internet:<http://www.imtc.org/docs/Q1-16_Proposal_of_Bearer-based_FastSession_Setup_Procedure_to_h324.doc, 29 pages.

Series H: Audiovisual and Multimedia Systems, Infrastructure of Audiovisual Services—Systems and Terminal Equipment for Audiovisual Services, Extended Fast Connect Feature, ITU—T Recommendation H 460.6, Oct. 6, 2002, pp. 3-17.

* cited by examiner

```
Type2Request ::= SEQUENCE
{
    version INTEGER (1..255),
    license INTEGER (1..MAX),
    terminalType    INTEGER (0..255), -- For MSD
    multiplexEntryDescriptors    SET SIZE (1..15) OF
                    MultiplexEntryDescriptor OPTIONAL, -- MTE
    ...
}
```

FIG. 5

```
Type2Response ::= SEQUENCE
{
    sequenceNumber  SequenceNumber, version INTEGER (1..255),
    license INTEGER (1..MAX), decision    CHOICE   -- MSD result based on "terminalType" compare
    {                    -- if terminalType is the same then caller
        master  NULL,    -- is always the master
        slave   NULL
    }, multiplexTableEntryNumber SET SIZE (1..15) OF
                    MultiplexTableEntryNumber OPTIONAL, logicalChannels SEQUENCE OF OpenLogicalChannel,

```
Type3Setup ::= SEQUENCE
{
    version     INTEGER (1..255),
    license     INTEGER (1..MAX),
    terminalType INTEGER (0..255),  -- For MSD
    profiles    SEQUENCE (1..30) OF INTEGER (0..65535),
    mediaWaitForConnect BOOLEAN,
    ...
}
```

*FIG. 16*

```
Type3Connect ::= SEQUENCE
{
    version INTEGER (1..255),
    license INTEGER (1..MAX),
    decision    CHOICE  -- MSD result based on "terminalType" compare
    {                   -- if terminalType is the same then caller
        master  NULL,   -- is always the master
        slave   NULL
    },
    profile INTEGER (0..65535),
    ...
}
```

*FIG. 18*

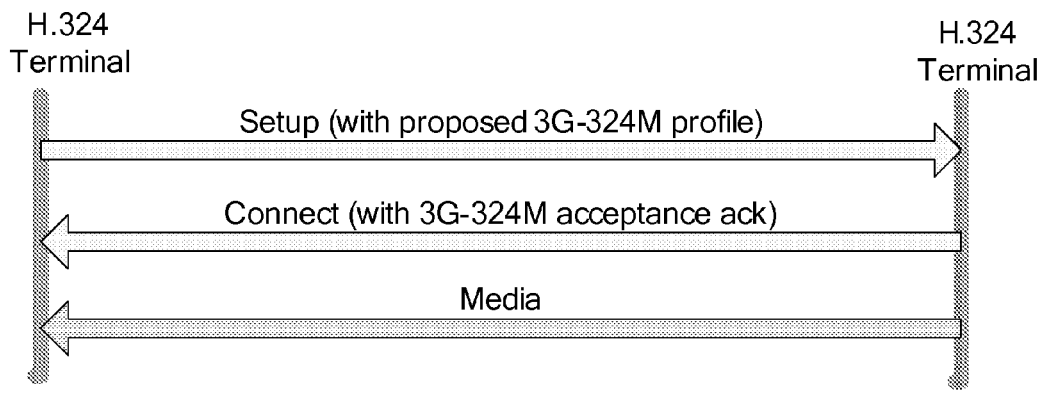

*FIG. 20*

Profile 0
    Mobile Level 2
    G.723.1 Audio on LCN1
    MUX table 1={LCN1,RC,UCF}
Profile 1
    Mobile Level 2
    GSM-AMR Audio on LCN1
    MUX table 1={LCN1,RC,UCF}, 2={LCN2,RC,UCF}
Profile 2
    Mobile Level 2
    G.723.1 Audio on LCN1
    H.263 QCIF Video on LCN2
    MUX table 1={LCN1,RC,UCF}, 2={LCN2,RC,UCF}
Profile 3
    Mobile Level 2
    GSM-AMR Audio on LCN1
    H.263 QCIF Video on LCN2
    MUX table 1={LCN1,RC,UCF}, 2={LCN2,RC,UCF}
Profile 4
    Mobile Level 2
    GSM-AMR Audio on LCN1
    MPEG4 QCIF Video on LCN2
    MUX table 1={LCN1,RC,UCF}, 2={LCN2,RC,UCF}

*FIG. 17*

| 8 | 7 | 6 | 5 | 4 | 3 | 2 | 1 | |
|---|---|---|---|---|---|---|---|---|
| MDI3 | MDI2 | MDI1 | DPI13 | DPI12 | DPI11 | DPI10 | DPI9 | Octet 1 |
| DPI8 | DPI7 | DPI6 | DPI5 | DPI4 | DPI3 | DPI2 | DPI1 | Octet 2 |

| 8 | 7 | 6 | 5 | 4 | 3 | 2 | 1 | |
|---|---|---|---|---|---|---|---|---|
|   |   |   | CI5 | CI4 | CI3 | CI2 | CI1 | Octet 1 |
| PID8 | PID7 | PID6 | PID5 | PID4 | PID3 | PID2 | PID1 | Octet 2 |

*Note that if the mediaWaitForConnect is set to TRUE in the Setup message then the media is not transmitted until after the Connect message is sent.

Object Identifier Assignment for Fast Session Setup Procedure

| Object Identifier Value | Clause Reference |
|---|---|
| {itu-t(0) recommendation(0) h(8) 324 generic-capabilities(1) fastSessionSetup(0) explicit profile (1) } | |

| | |
|---|---|
| Parameter name: | profileVersion |
| Parameter description | Version number. It shall be set to 1. |
| Parameter identifier value: | 1 |
| Parameter status: | Mandatory |
| Parameter type: | unsignedMin |
| Supersedes: | - |

| | |
|---|---|
| Parameter name: | terminalType |
| Parameter description: | Terminal type as defined in 7.4/H.324. |
| Parameter identifier value: | 2 |
| Parameter status: | Mandatory |
| Parameter type: | unsignedMax |
| Supersedes: | - |

| | |
|---|---|
| Parameter name: | mobileLevel |
| Parameter description: | First octet indicates initial mobile level. Second octet: MSB indicates using H.223 Annex A double flag mode; next bit indicates using H.223 Annex B optional header mode; other bits are reserved and shall be set to 0. Other octets shall be ignored. |
| Parameter identifier value: | 3 |
| Parameter status: | Mandatory |
| Parameter type: | octetString |
| Supersedes: | - |

| | |
|---|---|
| Parameter name: | mediaProfile |
| Parameter description: | One or more H.245 OpenLogicalChannel structures specifying media channels in order of preference. |
| Parameter identifier value: | 4 |
| Parameter status: | Optional |
| Parameter type: | octetString |
| Supersedes: | - |

*FIG. 38*

| Parameter name: | mediaSymmetric |
|---|---|
| Parameter description: | When set, all media capabilities are symmetric as per H.245. When this parameter is absent, all media capabilities are non-symmetric as per H.245. |
| Parameter identifier value: | 5 |
| Parameter status: | Optional |
| Parameter type: | Logical |
| Supersedes: | - |

| Parameter name: | additionalInfo |
|---|---|
| Parameter description: | One or more H.245 MultimediaSystemControlMessage such as UserInputIndication, MultiplexEntrySend and TerminalCapabilitySet. OpenLogicalChannel should not be included. No H.245 response shall be generated for request messages interpreted as commands. Only messages with settings within the mandatory limit of the recommendation shall be sent as receivers, receivers shall ignore messages outside these limits. Response messages are meaningless. Values specified in this parameter take precedence to inferred values. An exception is to MultiplexEntrySend such that inferred multiplex entry indice take precedence.<br>If a TerminalCapabilitySet is supplied, OPTIONAL fields such as multiplexCapability, capabilityTable and capabilityDescriptors are optional. Capabilities already inferred from mediaProfile parameter should not be included. Additional capabilities such as receiveUserInputCapability may be appended to capabilityTable. |
| Parameter identifier value: | 6 |
| Parameter status: | Optional |
| Parameter type: | octetString |
| Supersedes: | - |

| Parameter name: | Caller |
|---|---|
| Parameter description: | Indication that the terminal is a caller. When not specified, the terminal is a callee. |
| Parameter identifier value: | 7 |
| Parameter status: | Mandatory |
| Parameter type: | logical |
| Supercedes: | - |

| Parameter name: | statusDeterminationNumber |
|---|---|
| Parameter description: | A random number as defined in B.1.1/H.245. |
| Parameter identifier value: | 8 |

FIG. 39

METHODS AND APPARATUS FOR COMBINING SESSION ACCELERATION TECHNIQUES FOR MEDIA ORIENTED NEGOTIATION ACCELERATION

CROSS-REFERENCES TO RELATED APPLICATIONS

This application claims priority to U.S. Provisional Application No. 60/791,300, filed on Apr. 11, 2006, which is hereby incorporated by reference in its entirety for all purposes. This application is also a continuation-in-part of U.S. patent Ser. No. 11/449,904 U.S. Pat. No. 7,388,873, filed on Jun. 9, 2006, which is a continuation of U.S. patent application Ser. No. 10/732,917, filed on Dec. 9, 2003 now U.S. Pat. No. 7,139,279, which claims priority to U.S. Provisional Patent Application No. 60/433,252, filed on Dec. 12, 2002. This application is also a continuation-in-part of U.S. patent Ser. No. 10/934,077 U.S. Pat. No. 7,206,316, filed on Sep. 3, 2004, which is a continuation-in-part of U.S. patent Ser. No. 10/732,917 U.S. Pat. No. 7,139,279, referenced above. This application is also a continuation-in-part of U.S. patent application Ser. No. 11/303,858, filed on Dec. 15, 2005, which claims priority to U.S. Provisional Patent Application No. 60/636,638, filed on Dec. 15, 2004. This application is also a continuation-in-part of U.S. patent application Ser. No. 11/408,810, filed on Apr. 21, 2006, which claims priority to U.S. Provisional Patent Application No. 60/674,160, filed on Apr. 21, 2005. This application is also a continuation-in-part of U.S. patent application Ser. No. 11/482,515, filed on Jul. 7, 2006, which claims priority to U.S. Provisional Patent Application No. 60/697,788, filed on Jul. 8, 2005. This application is also a continuation-in-part of U.S. patent application Ser. No. 11/548,670, filed on Oct. 11, 2006 (Abandoned), which claims priority to U.S. Provisional Patent Application No. 60/725,950, filed on Oct. 11, 2005 and is a continuation-in-part of U.S. patent application Ser. No. 10/732,917, referenced above. This application is also a continuation-in-part of U.S. patent application Ser. No. 11/604,177, filed on Nov. 22, 2006 (Abandoned), which claims priority to U.S. Provisional Patent Application No. 60/739,342, filed on Nov. 23, 2005. The disclosures of the above-referenced applications are incorporated herein by reference in their entirety.

BACKGROUND OF THE INVENTION

H.324 is an International Telecommunication Union (ITU) protocol standard for multimedia communication over general switched networks (GSTN). H.324M is an extension of H.324 for operations over mobile networks, and 3G-324M is a recommendation by the third generation partnership program (3GPP) defining adaptation of H.324M for use within 3GPP and also adopted by 3GPP2. We call H.324-like equipment devices and systems employing protocol based or derived from H.324. H.324-like equipment can connect to other H.324-like equipment via switching centers and to other non-H.324-like equipment through multimedia gateways. An example of a non-H.324-like equipment is an H.323 equipment. H.323 is an International Telecommunication Union protocol Standard for multimedia communication over non-guaranteed bandwidth packet networks. An H.323-like equipment is an equipment that employs a protocol based or derived from the H.323 protocol.

Without any loss of generality, we will use the term "H.324" to indicate H.324-like equipment including H.324M and 3G-324M equipment and "H.323" to indicate H.323-like equipment.

Also without any loss of generality we use the term "equipment" to indicate either a user end equipment such as a handset, or network end equipment such as a switch or gateway. The term "equipment" covers the meaning of "entity". We also use the terms "equipment" and "terminal" interchangeably, and they both indicate the same meaning in the present document.

The present invention relates generally to the field of mobile networks. More particularly, the present invention relates to a method and apparatus for accelerated session setup in mobile networks. The method allows for the combination of a number of session setup techniques that can be used in a mobile terminal either together or independently of each other. Merely by way of example, three session setup techniques are combined in order to illustrate the operation of embodiments of the present invention.

If a call is made between equipments which are an embodiment of the H.324, H.324M or 3G-324M, the first stage of the call is to establish an end-to-end bearer between the equipments. This stage is called Call Signaling and is outside the scope of H.324, except where modems and the General Switched Telephony Network are used. The second stage of the call is to establish the H.324 session, to provide a means of transporting video, audio and data between the equipments in a format that is known to, and supported by the equipments.

We will refer to the time taken for information transmitted by one terminal to reach the other terminal and be reflected back in a response to the first terminal (see examples in FIG. 1) as a "round trip delay." It should be noted that this round-trip delay assumes devices involved in the media processing and communication do not add delays and is intended to be a representative measure of the network delay.

The key steps involved in setting up and connecting a typical H.324 call are as follows:

1. Call signaling (bearer establishment)—outside the scope of H.324. Normally a modem connection if GSTN, through ISDN, or signaling through mobile switching centers in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging Once these steps have completed, media (video, audio and data) can flow between the terminals.

The key steps above are often handled sequentially; as shown in FIG. 2, however this results in as many as ten H.245 message round trip delays in order to establish an H.324 session with two logical channels in each direction. Note in this case unidirectional video channels are used (e.g. video over adaptation layer AL2 of the H.223 multiplexer). In addition, the SRP scheme (or Numbered version—NSRP, in cases where the mobile level is greater than zero) used for H.324/H.245, which requires an SRP message to be received by the endpoint for every message sent, prior to sending any other message, regardless of whether it is associated with the same Signaling Entity or not, further limits the scope to pipeline messages on the network, making call setup slower than if this were not the case. SRP messages are not shown in FIG. 2.

In conventional equipment, the combined effect of the requirement to send an H.245 Response message for each H.245 Request Message received, and of the need to receive an SRP Ack for every SRP Command Frame sent means that a single H.245 Request message may take some time to be conveyed successfully. The communication involved in sending an H.245 Request message from one terminal (A) to another (B), and getting an H.245 Response (Ack) message back is shown in FIG. 1, which also shows the SRP Command Frames (SRP CF) and SRP Response Frames (SRP RF or SRP Ack) involved when single H.245 messages are formed into single SRP Command Frames.

Arising from the set of procedures described above that are required to take place to establish an H.324M call, when a call is made from a terminal which is an embodiment of the H.324 protocol it is prone to suffer from long call setup time, which is the interval between the time that the call signaling is initiated to the time that the exchange of voice and video commences between an H324-like end-point (H.324, H.324M or 3G-324M) and other terminals whether H.324-like or not.

Thus there exists a need for techniques to speed up the call setup between H.324 like terminals and other terminals (including servers) either of the H.324 type directly, or terminals such as H.323 via multimedia gateways that terminates the H.324 side and would have an H.324-like termination in them. The differences between the H.324 protocol (and its extensions such as H.324M and 3G-324M) and H.323 and other protocols mean that additional aspects need to be considered when introducing call establishment speed-up techniques for H.324-like terminals. Such differences include the information about mobile levels where they are used and the messaging and information related to the H.223 multiplexer such as its multiplex table entries, adaptation layers and so on. Also there is a tradeoff between characteristics, such as speed and flexibility that also must considered.

SUMMARY OF THE INVENTION

The present invention relates generally to the field of mobile networks. More particularly, the present invention relates to a method and apparatus for accelerated session setup in mobile networks. The method allows for the combination of a number of session setup techniques that can be used in a mobile terminal either together or independently of each other. Merely by way of example, three session setup techniques are combined in order to illustrate the operation of embodiments of the present invention.

The present invention relates generally to methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this (H.324-like) such as the 3G-324M recommendation developed and adopted by the Third Generation Partnership Projects (3GPP and 3GPP2). Merely by way of example, the invention has been applied to the establishment of multimedia telecommunication between 3G-324M (an H.324M based protocol) multimedia handsets on a mobile telecommunications network, and between 3G-324M multimedia handsets and other types of terminals (handsets or servers) and could be based on proprietary protocols or IP based terminals, such as H.323, SIP, RTSP, MRCP, or any other form of proprietary or standard multimedia communication protocol, on a packet network using a Multimedia Gateway or a 3G-324M terminating device to mediate between the protocols used at each end, but it would be recognized that the invention may also include other applications. Merely by way of another example, the 3G-324M terminating device could be a line-card that terminates 3G-324M calls and locally converts the signaling, session and media information to formats that could be processed and/or consumed locally and/or retransmitted using another protocol (proprietary or IP base) to another type of terminal (handset or server). Without any loss of generality, we will use the term Multimedia Gateway to indicate a stand-alone, a distributed or a simple line-card (e.g. blade, board or chip-set) that has the function of mediating connectivity between one or more multimedia terminals, regardless of whether the terminals are handsets or servers/gateways themselves.

Also merely by way of another example, the 3G-324M session could be established in a way where the call signaling could be performed using a protocol such a SIP, and where the 3G-324M payloads could be transported using one or more RTP channels.

According to an embodiment of the present invention, a method of establishing a session between a first device and a second device is provided. The session is established over a telecommunications network using an accelerated session setup technique. The method includes providing a first accelerated session setup technique, providing a second accelerated session setup technique, and establishing the session using either the first accelerated session setup technique or the second accelerated session setup technique based on a predetermined process.

According to another embodiment of the present invention, a telecommunications apparatus is provided. The telecommunications apparatus includes a first processor adapted to attempt session establishment using one or more explicit parameters and a second processor adapted to attempt session establishment using one or more preconfigured profiles. The telecommunications apparatus also includes a third processor adapted to attempt session establishment using a field in an H.245 message and a transmitter adapted to transmit audio and video information in accordance with a session established in whole or in part by the first processor, the second processor, or the third processor.

According to an alternative embodiment of the present invention, a telecommunications apparatus is provided. The telecommunications apparatus includes a first processor adapted to attempt session establishment using one or more preconfigured profiles and one or more explicit parameters and a second processor adapted to attempt session establishment using a field in an H.245 message. The telecommunications apparatus also includes a transmitter adapted to transmit audio and video information in accordance with a session established in whole or in part by the first processor or the second processor.

According to another alternative embodiment of the present invention, a telecommunications apparatus is provided. The telecommunications apparatus includes a first transmitter adapted to send media to a telecommunications device prior to receiving an in-band message from the telecommunications device and a second transmitter adapted to send interleaved multiplexer level sequences to the telecommunications device. The telecommunications apparatus also includes a processor adapted to determine a partial completion of a desired session and a third transmitter adapted to send one or more H.245 messages. The one or more H.245 messages are used to establish a video channel or an audio channel.

According to a specific embodiment of the present invention, a method of establishing a session between a first terminal and a second terminal communicating through a telecommunications network is provided. The method includes performing a first session setup technique and determining a first portion of a set of desired session characteristics. The method also includes performing a second session setup technique and determining a second portion of the set of desired session characteristics.

According to another specific embodiment of the present invention, a telecommunications apparatus is provided. The telecommunications apparatus includes a first processor adapted to attempt session establishment using a first session establishment technique and a second processor adapted to attempt session establishment using a second session establishment technique. The telecommunications apparatus also includes a transmitter adapted to transmit audio and video information in accordance with a session established in whole or in part by the first processor or the second processor. A negotiated parameter of the first session establishment technique and the second session establishment technique includes a shared negotiated parameter.

According to yet another embodiment of the present invention, a method of modifying a mode of operation for a session over one or more 3G telecommunication networks is provided. The method is provided between at least a pair of H.324-like terminals coupled to the one or more 3G telecommunication networks. The method includes utilizing a first accelerated session setup technique to establish the session between users prior to receiving an initial H.245 message. The session is characterized by a first mode of operation. The method also includes determining a second mode of operation for the session utilizing an H.245 message and establishing the second mode of operation for the session.

Many benefits are achieved by way of the present invention over conventional techniques. For example, embodiments of the present invention provide for enhanced performance compared to conventional techniques and accelerated techniques. Moreover, embodiments provide increased flexibility in comparison with some accelerated techniques. As described throughout the present specification, by combining various techniques, embodiments provide a performance and flexibility tradeoff not available using a single technique. Utilizing a hierarchical approach, differing session setup techniques are employed in a logical manner. Additionally, embodiments provide desired performance in conditions of interoperation between conflicting versions of various session setup techniques. Furthermore, minimal degradation when negotiating with a conventional terminal or with terminals that support various acceleration techniques is experienced when using embodiments of the present invention. Also, since the desires of man-to-machine services might be different than man-to-man services, implementation options for varying services are provided as appropriate.

For example, networks that support the H.324M standard for mobile multi-media telephony may use a number of available session setup schemes as further disclosed in the present application. These schemes differ in the speed of the session setup and the flexibility and reliability offered to the terminal and the network. Flexibility refers to the ability of service providers to provide the media in a differentiated way without having to define these new formats as part of the default formats supported by the network. Flexibility also refers to an ability to establish a session with desired characteristics determined at the terminal. Reliability refers to the confidence in successfully establishing a session, both in the presence of noise and in the likelihood that a peer terminal does not support a feature. Some session setup methods can be considered lossless in that acknowledgments are mandatory on the communicating devices, while others can be considered highly reliable because of the repetition of messages and other techniques. Depending upon the embodiment, one or more of these benefits, as well as other benefits, may be achieved.

The objects, features, and advantages of the present invention, which to the best of our knowledge are novel, are set forth with particularity in the appended claims. Embodiments of the present invention, both as to their organization and manner of operation, together with further objects and advantages, may best be understood by reference to the following description, taken in connection with the accompanying drawings.

BRIEF DESCRIPTION OF THE DRAWINGS

FIG. 5 illustrates an embodiment of the ASN.1 Syntax description for an AnswerFast2 Request;

FIG. 6 illustrates an embodiment of the ASN.1 Syntax description for an AnswerFast2 Response;

FIG. 16 illustrates an embodiment of the ASN.1 Syntax description for AnswerFast3 Request;

FIG. 17 illustrates an embodiment of some coded Profiles, and their description, that can be used in AnswerFast3 Request and Response;

FIG. 18 illustrates an embodiment of the ASN.1 Syntax description for AnswerFast3 Response;

FIG. 20 is a simplified diagram illustrating the use of AnswerFast3 in Q.931 SETUP between two H.324 terminals according to an embodiment of the present invention;

FIG. 38 provide a listing of FSS/MOS parameters utilized in embodiments of the present invention;

FIG. 39 provide a listing of FSS/MOS parameters utilized in embodiments of the present invention;

DETAILED DESCRIPTION OF SPECIFIC EMBODIMENTS

Mobile networks utilize methods and apparatus that provide for session creation between two mobile terminals or between a mobile terminal and an infrastructure node (i.e. equipment in the network that the mobile device is communicating with) to allow media (voice, video, text, and the like) to flow between the terminals and/or the nodes. For example, networks that support the H.324M standard for mobile multimedia telephony may use a number of available session setup schemes. These methods differ in the speed of the session set-up and the flexibility and reliability offered to the terminal and the network. Flexibility refers to the ability of service providers to provide the media in a differentiated way without having to define these new formats as part of the default formats supported by the network. Reliability refers to the confidence in successfully establishing a session. Some session setup methods can be considered lossless in that acknowledgments are mandatory on the communicating devices, while others can be considered highly reliable because of the repetition of messages and other techniques.

It is recognizable, for those skilled in the art and familiar with the field, that it may be attractive to allow a terminal or a node in the network to use a number of session setup schemes, taking advantage of the strengths of the different schemes in different situations.

Figure 1:
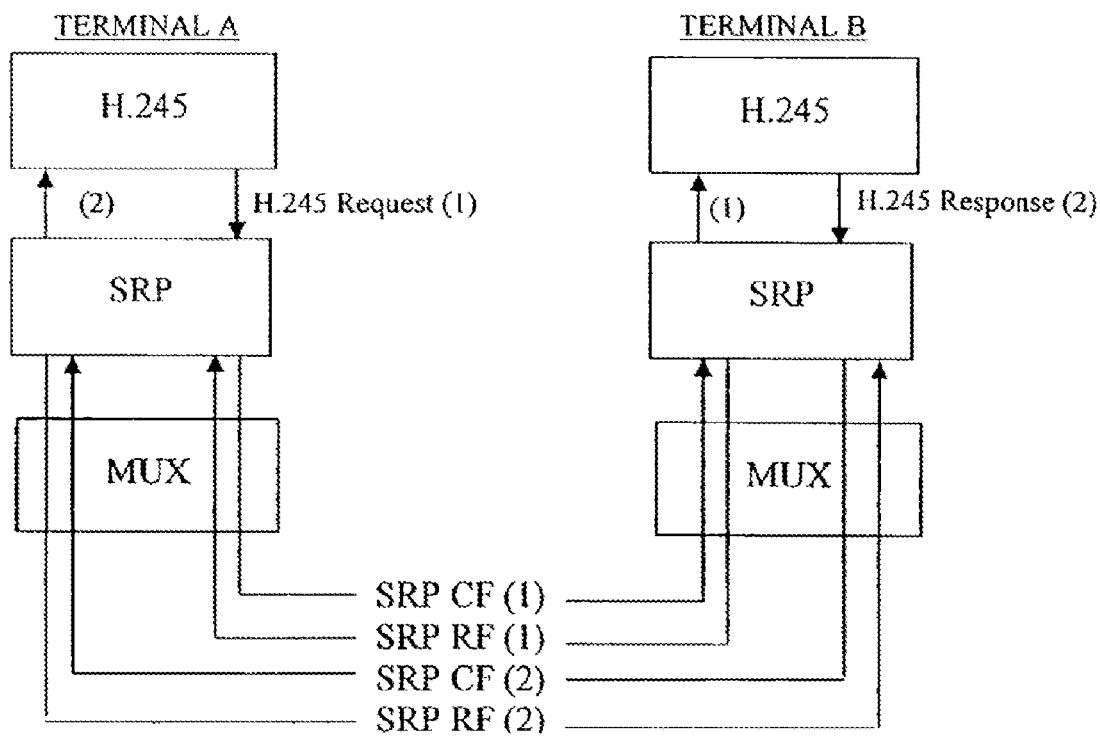
FIG. 1 is a diagram useful in illustrating the communications that flow between two H.324 terminals when an H.245 Request message is sent from one terminal to the other.

In an embodiment of the present invention, initial messages are sent by both terminals and/or nodes after a bearer channel has been established. The bearer channel is the channel established by the network that carries information between the terminals and/or the nodes. Referring to FIG. 1, these messages may be referred to as "bullets." Typically, these messages carry a small amount of information that express some of the capabilities and preferences (as in which media types the device prefers to use) of each of the communicating devices (whether they be terminals or nodes). Using the received information, the communicating devices use a common decision making algorithm to determine which session setup mechanism is used. Once the session setup is complete, media flows between the communicating devices until the session is closed.

In FIG. 1, the "bullets" carry the information referred to above. Using this information, a decision is made on whether the fastest session setup method (referred to as FM in the figure) should be used (which in turn has lower flexibility than the other methods). If the decision is made to use the fastest session setup method, then the session is created in that manner. If session creation fails, then a common, reliable method (and most time consuming method, referred to as H.245 in the figure) is used to set-up the session. More flexibility can be added to the session set-up by the optional adoption of a more flexible session set-up method (for example in FIG. 1, fast session setup is included as an example) which allows the communicating devices to share more information and thus consumes more time while allowing additional flexibility to the way media is communicated between the communicating devices.

Again, if the session setup fails, then the slowest and most reliable session set-up method is used. However, it should be noted that may not be acceptable to device manufacturers and so a more reliable session set-up scheme which is slightly faster than the most reliable scheme could optionally be included in the device. In FIG. 1, this scheme is referred to as ACN. ACN typically involves the transmission of more information and the acknowledgement of more of that information than the faster session set-up schemes. As with the other schemes, if the session fails to be established, then the most reliable session set-up scheme will be used. In this way, a number of session setup schemes can be used in the same communication device to allow the advantages of the various schemes to be realized in different situations.

Embodiments of the present invention allows the different session setup schemes or protocols to operate in the same device with a meaningful result. Moreover, embodiments provide for scalable session setup creation, where speed is traded with flexibility and reliability. A further advantage of embodiments of the present invention is that methods and systems provided herein allow a subset of the available session set-up schemes to be used in any one device and still operate reliably with devices that implement a smaller or larger subset.

Mobile networks utilize methods and apparatus that provide for session creation between two mobile terminals or between a mobile terminal and an infrastructure node (i.e. equipment in the network that the mobile device is communicating with) to allow media (voice, video, text, and the like) to flow between the terminals and/or the nodes.

According to the present invention, techniques for telecommunications are provided. More particularly, the invention provides methods for reducing the time required to establish calls (in particular the completion of session setup and the transmission of usable media) between terminals that implement the ITU-T H.324 Recommendation and other Standards and Recommendations derived from or related to this such as the 3G-324M recommendation developed and adopted by the Third Generation Partnership Projects (3GPP and 3GPP2). More specifically, it relates to (i) a method and apparatus for concatenating the H.245 messages that are required to pass between the terminals at the start of the call to establish the capabilities of both terminals and agree on the type and format of media and data to be exchanged (ii) a method and apparatus for using non-standard H.245 messages to accelerate such establishment (iii) a method and apparatus of informing each terminal of the capabilities of the other and proposing the type and format of media and data to be exchanged by means of any user-defined fields that are inserted in the call signaling protocol that is used for bearer establishment prior to the start of the H.324 stage of the call, (iv) a method and apparatus of making transmissions on the bearer channel prior to, or in parallel with, the initiation of the H.324 Standard procedures, the messages comprising media or preference information informing each terminal of the capabilities of the other and proposing the type and format of media and data to be exchanged by means of messages that are transmitted and (iv) a method and apparatus of transmitting and receiving one or more SRP messages concurrently in order to achieve greater throughput, and hence reduced session setup, for H.324 H.245 messages.

These five different families of session speed-up methods are described in the present specification. Collectively, the methods are referred to herein as AnswerFast and they include the following:

AnswerFastSRP: This method enables terminals to send multiple SRP/NSRP messages in a particular way to speed up the session set up time.

AnswerFast1: This method enables terminals to group H.245 messages in a particular way to speed up the session set up time.

AnswerFast2: This method makes use of fields in the H.245 TerminalCapabilitySet request message.

AnswerFast3: This method makes use of the signaling layer (TS 24.008) to incorporate one or more preferred operation modes.

AnswerFast4: This method transmits messages including media and preferred operation mode as the first burst of bits transmitted on the bearer channel. These bits are prevented from emulating existing mobile level flags, including the baseline H.324 mode, so they are ignored by existing terminals, maintaining interoperability.

The use of these procedures allows significant reduction of the session setup time. These methods may be used separately or severally to reduce the time that is taken from the point when a user requests the establishment of a call to the point where media starts to be exchanged between the terminals. They may also be used in various partial combinations where a particular aspect of one type may confer an advantage in another, or where a set of partial parameters are determined in an earlier step that may be used in a later step.

As an example, one hierarchical order of utilizing the AnswerFast techniques in H.324 is:
1. AnswerFast3
2. AnswerFast4
3. AnswerFast2 (optionally with AnswerFast1 and/or AnswerFastSRP)
4. AnswerFast1 (optionally with AnswerFastSRP)
5. Session with AnswerFastSRP
6. Normal session without AnswerFast From the hierarchy shown, AnswerFast1 may be adopted after successful utilization of AnswerFast3 and AnswerFast4. AnswerFast1 may be adopted at the same time as AnswerFast2. AnswerFastSRP may be adopted in conjunction with AnswerFast 1 and AnswerFast2 and may also be used in conjunction only with an otherwise normal session setup. It is also feasible some subpart of negotiations may be conducted in an AnswerFast negotiation in an earlier phase of the call and a later negotiation could build on that earlier negotiation or refine (or even redefine) it, or avoid an aspect that might be conflicting. For example AnswerFast2 negotiations might use some outcomes of an AnswerFast3 or AnswerFast4 negotiation to continue a call. For example the AnswerFast2 phase may use a mobile/multiplexer level negotiated in an earlier stage, or may choose to use or choose to avoid using some particular logical channel numbers or multiplexer table entry numbers. Additionally a feature may be redefined or re-determined in a later phase, for example a master-slave relationship may have been used to avoid conflicts in AnswerFast4 media flows, but then the session may re-determine the relationship using an H.245 based MasterSlaveDetermination message. One of ordinary skill in the art would recognize many variations, modifications, and alternatives.

Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a multimedia gateway to mediate between the protocols used at each endpoint, but it would be recognized that the invention may also include other applications.

The methods described above are generic and can be implemented in many different ways by a person skilled with the field. We describe below example embodiments to illustrate the methods which can be adapted easily to suit specific equipment needs.

It can also be note that the Equipment Preference signaling can be done using a combination of information access and communication methods using call signaling protocols (e.g. ISUP, Q.931, SIP, BICC), bearer based methods (circuit switched or packet switched), on-line stored information and off-line stored information.

AnswerFastSRP Exemplary Embodiment

There is scope to optimize H.324 SRP to support faster call setup, call tear-down and other session messaging (H.245 Messaging), in environments where network latency is significant. One of the features of H.324/H.245 is the use of SRP, which provides acknowledgement for all delivered PDUs. This is useful to ensure that all command and control messages have been received at the far end terminal, but provides a limit to the throughput of messages on networks with moderate to high latency (>40 ms round trip time).

In conventional systems, SRP only allows for one message to be outstanding (without acknowledgement) at any time to ensure guaranteed delivery and correct message sequencing. This latency can be mitigated to some extent by minimizing the number of messages exchanged during call setup such as a message containing multiple Multiplex Table Entries, or combining Terminal Capability Set and Master Slave determination messages, however it does still adversely impact the can setup time. In addition timeouts are such within H.324/H.245 that if a critical packet (or its acknowledgement) is lost during call setup (perhaps due to data loss) the call may fail, and abort if timer values within stack implementations are not tuned appropriately. All of these phases are necessary to remain standards compliant, but it may be the case that in some circumstances SRP may be used in such a way to allow messages to be sent while an SRP ACK is outstanding.

In many cases the H.324/H.245 procedures are artificially held back due to the behavior of H.245/SRP. Essentially independent procedures such as the opening of different logical channels are unnecessarily coupled by the requirement that only one H.245 SDU may be outstanding at any time. By removing this limitation for independent procedures the time to execute H.245 procedures could be reduced by between 50 100%.

Some SDUs must be preserved in strict order, for example with all procedures, or within a single instance of an Open Logical Channel procedure, however independent OLC requests do not need to be coupled as they are in the current standard.

In order to allow new SDUs to be transmitted while SRP ACKs are outstanding, a means of identifying SRPs and associating them with the relevant message is required. One approach would be to use Numbered SRPs (NSRP). The alternatives to this approach are based on a Selective ACK (SAckSRP), or a sliding window scheme (WNSRP), as described below.

In order to minimize implementation complexity and maintain maximum consistency it is recommended that a sliding window scheme is used to allow multiple outstanding SRP messages. This will allow the H.324/H.245 implementation to send a maximum of n SRP packets without corresponding ACKs being received. The H.245 implementation itself must maintain locking to ensure that only one SDU ACK is outstanding from each state machine instance (typically per H.245 procedure), otherwise message sequences within each state machine cannot be guaranteed. In order to enable this behavior the H.324 entity must generally be able to signal to the far end that it is capable of handling this method. It is suggested that this be included with Terminal Capability Set, as is the case with NSRP, but an alternative header field would be required to specify the remote handling of this case.

In the case where the scheme described above as AnswerFast2 is combined with this technique this will have no impact on call setup time in the successful accelerated case, but would still have advantages if communicating on a heavily errored connection, when using large H.245 messages or if communicating with a terminal supporting only this SRP Extension (and not AnswerFast2). It will improve speed and reliability for subsequent H.245 control operations in the AnswerFast2 case however.

AnswerFast1 Exemplary Embodiment

Figure 4:
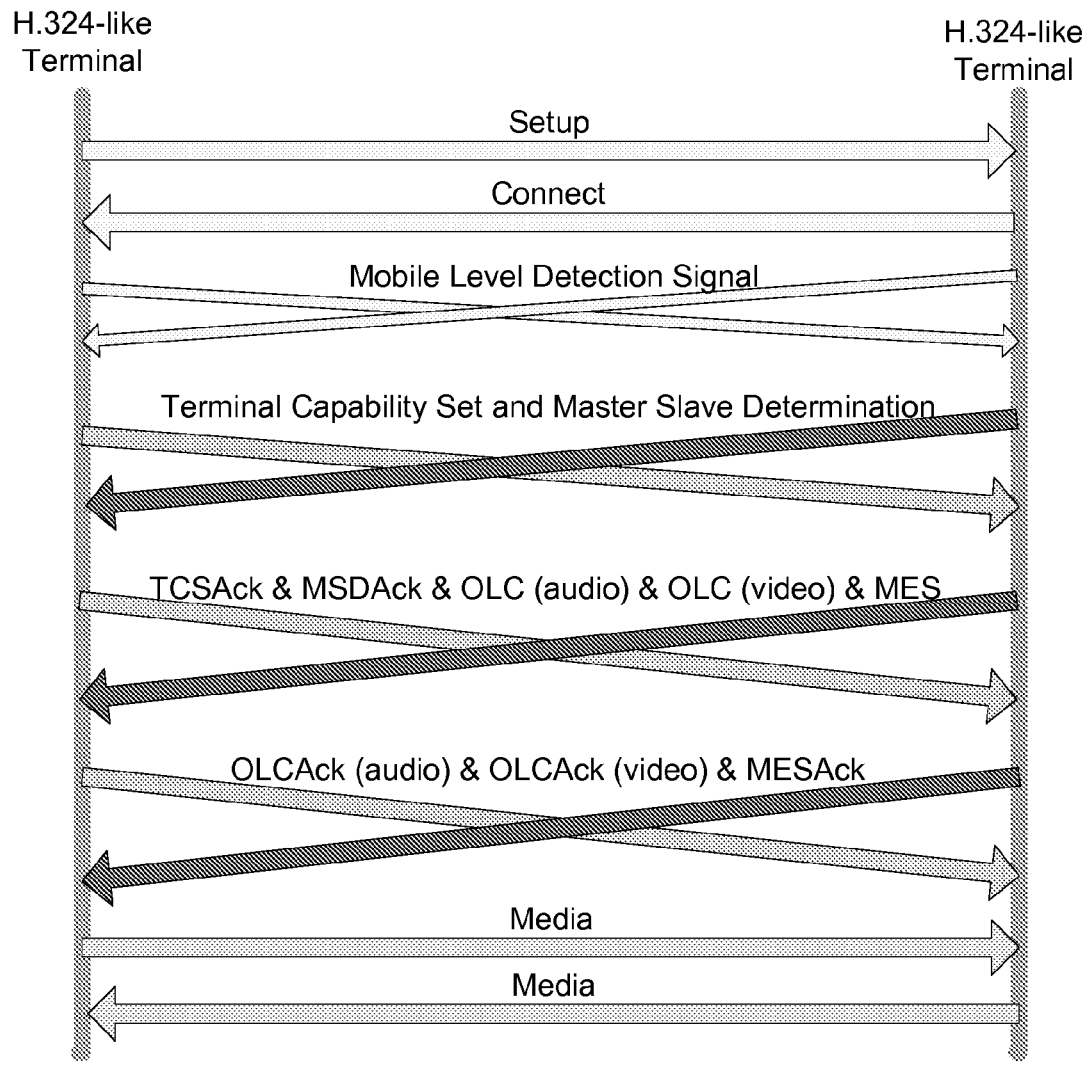
FIG. 4 is a simplified diagram illustrating the use of AnswerFast1 according to an embodiment of the present invention.

In a particular embodiment of this method of concatenated H.245 messages a terminal combines H.245 Request Terminal Capabilities (TCS) and Request Master Slave Determination (MSD) messages into a single H.245 PDU. It also concatenates TCS and MSD Response Messages (Acks), multiple Open Logical Channel Requests (OLC) and Multiplex Table Entry Send Request (MES) in a single H.245 PDU. Finally it combines OLC and MES responses into a third H.245 PDU. The process of setting up an H.324 call between two terminals that support this embodiment of the concatenation method is illustrated in FIG. 4. The result of adopting this approach reduces the number of round trips required for call setup from around ten to three. This embodiment requires that the MSDSE and CESE state machines can run in parallel, and that the multiple LCSE and MTSE state machines can run in parallel. This embodiment is merely one example of the application of the method of concatenated H.245 messages in the present invention; other concatenations of messages can be constructed; these may put different constraints on the signaling entity state machines within the implementation of H.245.

Optionally, the method also includes reverting to a normal operation if one of the terminals does not support AnswerFast1 (i.e., concatenated H.245 messages). The calling terminal in this case detects that because it would not have received the H.245 response to the second of the concatenated H.245 messages. In this case, the calling terminal would revert to individual H.245 messages in the SRP command frames and retransmit the H.245 messages individually from the second message onwards. There can be many other variations, alternatives, and modifications.

Alternatively, the method can also be applied to the Numbered Simple Retransmission Protocol (numbered version of SRP which includes a sequence number in the SRP command and SRP acknowledgement frames) and other like variations, such as WNSRP. Of course, there can be other variations, modifications, and alternatives.

AnswerFast1 Variant Exemplary Embodiment

AnswerFast1 provides a mechanism whereby terminals combine multiple H.245 messages in order to reduce the session set up time. The usage of H.245 within H.324 allows terminals to concatenate multiple H.245 messages into a single PDU, thus avoiding the need to use two round trips for each request/response pair (due to the need for an SRP response for each PDU). Although some deployed H.324 terminals do not take advantage of this capability, other H.324 terminals will incorporate these techniques. By allowing terminals to use concatenated H.245, AnswerFast1 techniques reduce the number of round trips required for call set up from ten to three. As an example, a terminal can send a MasterSlaveDetermination Request and TerminalCapabilitySet Request messages in a single PDU, or can send TerminalCapabilitySetAck, MasterSlaveDeterminationAck, Open Logical Channel Requests and MultiplexEntrySend Request messages in a single PDU.

According to embodiments of the present invention, AnswerFast1 takes advantage of the existing protocol facilities, rather than as an extension to it. Thus, a terminal that implements AnswerFast1 does not need to define any behavior or protocol elements in addition to those already allowed and defined by the H.245 and H.324 standards.

FIG. 4 is a simplified diagram illustrating the use of AnswerFast1 according to an embodiment of the present invention. In general, the media may be unidirectional or bidirectional. As illustrated in FIG. 4, H.245 message are concatenated in the AnswerFast1 technique. Interoperability with terminals that do not implement AnswerFast1 is achieved by noting that if the receiving terminal ignores the second and subsequent H.245 elements in a PDU, the transmitting terminal can detect any time-outs and continues the H.245 messaging using one H.245 message per PDU.

According to embodiments of the present invention, methods and systems are provided to perform H.245 message grouping for H.324, also referred to as concatenation. As provided herein, H.245 message grouping is compatible with the H.324 recommendation as defined in clause A. 1 of H.324. By utilizing such techniques, the number of SRP Acks may be reduced for a call session, thus shortening the call setup time. The use of concatenation is not required by embodiments of the present invention, which may result in increased call setup times. Utilizing embodiments of the present invention, H.245 message grouping makes techniques and systems available to implementers that avoid unnecessary long call setup times, which delays message exchange. For purposes of consistency between H.324 and H.245, the terms "MultimediaSystemControlPDU messages" and "MultimediaSystemControlMessage's" are utilized interchangeably. Accordingly, the use of these terms is not intended to limit the present invention, but merely to provide alternative phrases.

The use of concatenation as described herein is preferably added to the H.324 Recommendation, providing a recommended approach for H.245 message grouping. In some embodiments, bits produced by the X.691 encoding process shall be put into the octets of an information field, with the first bit generated going into the Most Significant Bit (MSB) of the first octet, and progressing down to the Least Significant Bit (LSB) of the last octet. One or more complete H.245 MultimediaSystemControlPDU messages may be sent in each information field, to be transported in a single SRP or LAPM frame. It should be noted that the specified X.691 encoding process produces MultimediaSystemControlPDU messages which are each a multiple of 8 bits in length (10.1.3/ X.691), so all messages begin on an octet boundary. It is recommended that as many available complete H.245 MultimediaSystemControlMessages as possible should be sent in an information field of a single SRP or LAPM frame. One message sending sequence during initial H.245 message exchange is:

TerminalCapabilitySet, MasterSlaveDetermination, and VendorIdentification

TerminalCapabilitySetAck, MasterSlaveDeterminationAck, MultiplexEntrySend, and all OpenLogicalChannel messages MultiplexEntrySendAck and all OpenLogicalChannelAck messages H.324 terminals capable of using LAPMN.42 as the control channel link layer can indicate this capability by setting the transportWithI-frames parameter of the H223Capability structure true. Such terminals, upon receiving the corresponding indication from the far-end terminal, shall henceforth, and without further notification of intent, proceed to establish an error-corrected connection according to the procedures given in 6.8.1.2/H.324 and subsequently transmit control channel messages only using LAPMN.42 for the duration of the connection. The terminal transmits an SRP response message in reply to any SRP command message received.

AnswerFast2 Exemplary Embodiment

In a particular embodiment of the method of using custom H.245 messages, a non-standard Capability is used. An H.324-like equipment requires that the first H.245 message it sends is a Terminal Capability Set (TCS) message. The calling equipment includes a capability of type NonStandardParameter in the TCS it sends to the answering equipment. This capability is identified by a NonStandardIdentifier with a unique Object Identifier. This capability contains Equipment Preferences which are the additional parameters needed by the called terminal to start the call, including terminalType (needed for MSD in the same manner as it is required for standard H.245 operation) and Multiple Table Entry (MTE) Descriptors. FIG. 5 shows an example of an ASN.1 description containing the syntax for all of these data. By including this NonStandard Capability, the calling party is required to accept the decision of the called party as to whether this method is used, and what channels are selected. If the called equipment does not support this method the calling equipment receives a conventional TCSAck and normal H.245 negotiation is then used to continue the session setup.

If a called terminal receives a TCS containing the NonStandard capability relating to this method and itself supports the method, it will perform a master slave determination by comparing the terminalType value in the received NonStandard capability with the value for the local terminal. The highest value will be selected as the master. In the event of equal terminal type values, the calling terminal will be selected as the master.

The called terminal will analyze the received capability table and capability descriptors to determine the OpenLogicalChannel and multiplex table entries for the new connection. The called terminal will respond with a normal TCSAck if it cannot derive an acceptable channel configuration, or if it is unable to accept the multiplexEntryDescriptors provided. The remainder of the call setup will then be via normal H.245 negotiation.

If acceptable channel configurations and multiplex table entries can be derived, the called party will replace the normal TCSAck with an H.245 ResponseMessage of the type NonStandardMessage. See FIG. 6 for an ASN.1 Syntax description of the encoded data. The NonStandardIdentifier of the non-standard response message will have the same Object Identifier as the NonStandard capability which identifies this method. It should be noted that the called terminal does not include any additional or NonStandard capabilities into the TCS it sends to the calling terminal, even if it supports this method. The calling terminal must wait to receive either a TCSAck or the NonStandardMessage before proceeding.

Figure 7:
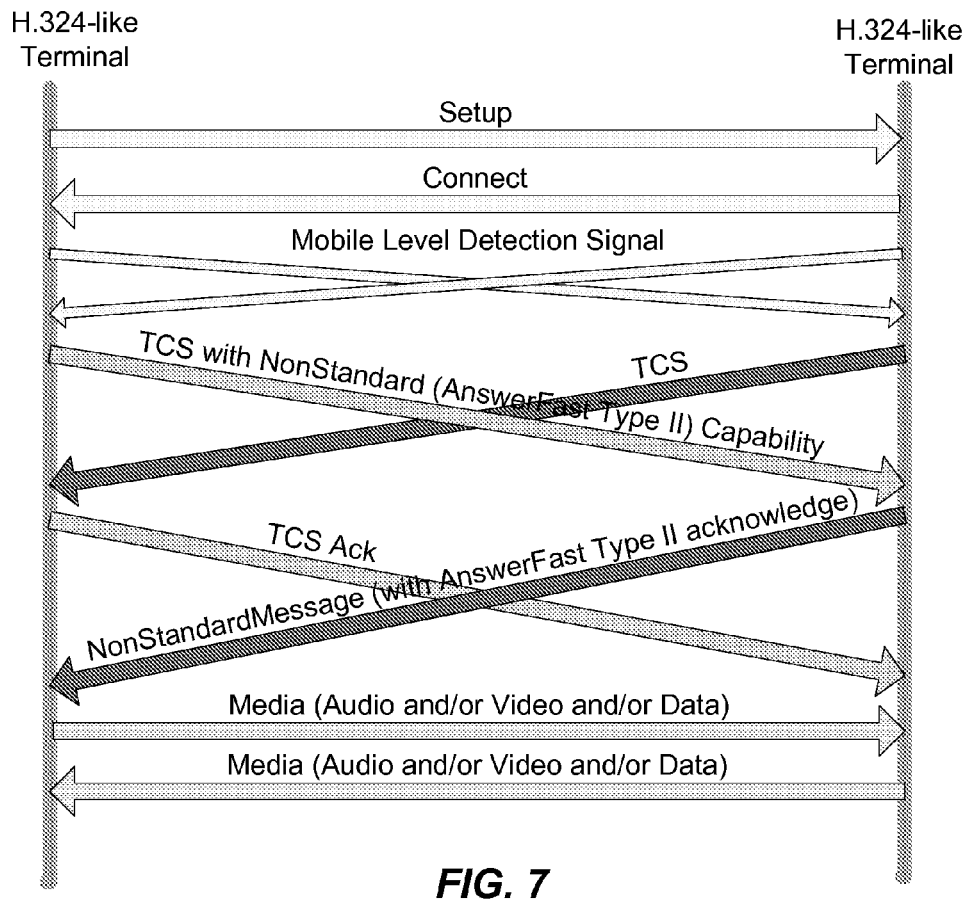
FIG. 7 is a simplified diagram illustrating the use of AnswerFast2 according to an embodiment of the present invention.

The process of setting up an H.324 call between two terminals which support this embodiment of the method of using custom H.245 messages is illustrated in FIG. 7. This embodiment offers one and a half less round trip exchanges than the embodiment of the method of Concatenated H.245. By embedding the Equipment Preferences as a NonStandard capability on the TerminalCapabilitySet request message the methods and systems provided herein ensure that the called terminal will not malfunction or hang-up since it is able to handle the case of a non-standard Capability being communicated to it.

The second key aspect is that the encapsulation of the custom message in the TerminalCapabilitySet request message allows the terminal to transmit the custom message in the first H.245 message after the mobile level determination is done, and hence it does not have to wait. The third aspect is that the TerminalCapabilitySet request containing the AnswerFast2 message embedded as a non-standard Capability can be transmitted using the AnswerFast1 mode (together with one or more H.245 messages). The fourth aspect is that the called terminal responds with an Ack message that informs the calling terminal of the preferred modes of the called terminal and its selection of one of the preferred modes of the calling terminal if the calling terminal presented several preferences in its AnswerFast2 message.

Variant AnswerFast2 Exemplary Embodiment

According to another embodiment of the present invention, the AnswerFast2 method uses the H.245 protocol to transmit "special" messages that are aimed at shortening the procedure to establish a session. The concept is to transmit special messages as soon as possible, and this can be done in various ways. Which way is selected depends on how stringent one wants to be with regards to departure from conventional H.324 session establishment. For example, the H.324 protocol mandates that the first H.245 message be the TerminalCapabilitySet (TCS) Request message. Hence one can insert the special messages in the TCS. Alternatively, if one is not concerned about literal compliance with the H.324 standard, one can also transmit a special message prior to the TCS (in order of appearance in the message). Embodiments of the present invention cover the concept of transmitting special message(s) for the purpose of speeding up the session establishment, regardless of the actual position and order of the message, which will depend on the particular embodiment.

These special message(s) are termed "non-standard" as the conventional H.324 protocol does not provide for them, or provides for them in a generic way, and they are not yet standardized. For example, the non-standard message(s) can be inserted as a "non-standard" Capability of the TerminalCapabilitySet request message, and this is the approach that we will describe, without loss of generality, to illustrate the mechanics of the operations. The "non-standard" Capability allows H.324-like terminals to define a mode of operation that enables faster session set up. As discussed more fully below, AnswerFast2 enables the minimization of the amount of information that is incorporated in the non-standard Capability. As a result, embodiments utilizing AnswerFast2 reduce the amount of transmitted information, for example, to a minimum amount. We refer to the non-standard Capabilities as Non-Standard Capabilities or Non-Standard H.245 Capabilities.

FIG. 7 is a simplified diagram illustrating the use of AnswerFast2 according to an embodiment of the present invention. As shown in FIG. 7, a H.245 NonStandard Capability is used between two H.324 terminals that support AnswerFast2. The message flow between the two H.324 terminals supporting AnswerFast2 in H.245 NonStandard Capability is illustrated. The media may be a unidirectional or bidirectional channel. Using a minimal amount of information to signal a capability through the use of bit fields and/or use of profiles minimizes the amount of information required to be transmitted. This in turn leads to minimized call set up time, even in the reduced call set up time case.

For AnswerFast2, the profiles can be the same as described for either AnswerFast3 or AnswerFast4, or any variants listed. It is also possible, with minimum additional information, or special use and interpretation of an otherwise unused field, to indicate the use of a system of predefined rules based on already available information. An example could be a capability indication and the use of rules to select from the conventional capabilities as to which channels would be opened in an accelerated fashion. This could be performed completely by inference, or could also be explicitly acknowledged. An acknowledgment may also contain extra session information, such as further information used to open a channel.

To use AnswerFast2 in H.245 NonStandard Capability, the calling terminal includes a capability of type NonStandardParameter in the TerminalCapabilitySet it sends to the called party terminal (a possible format for this capability is described more fully below). This capability contains additional information needed by the called terminal to start the session, possibly including indications of multiplexer table entries, or entry numbers and logical channels characteristics, or logical channel numbers to use. By including this NonStandard Capability, the calling party is enabled to accept the decision of the called party as to whether AnswerFast2 is used, and what channels are selected.

If the called terminal accepts the AnswerFast2 capability, it may respond with a NonStandardMessage containing the further information needed for the calling terminal to start the session (a possible format for this capability is described more fully below). In some embodiments, the called terminal does not include any additional capabilities into the TerminalCapabilitySet it sends to the called terminal. Additionally, other H.245 messages, such as a MasterSlaveDetermination request message, may be concatenated with the TerminalCapabilitySet in case the fallback procedure as described herein is used.

Figure 8:
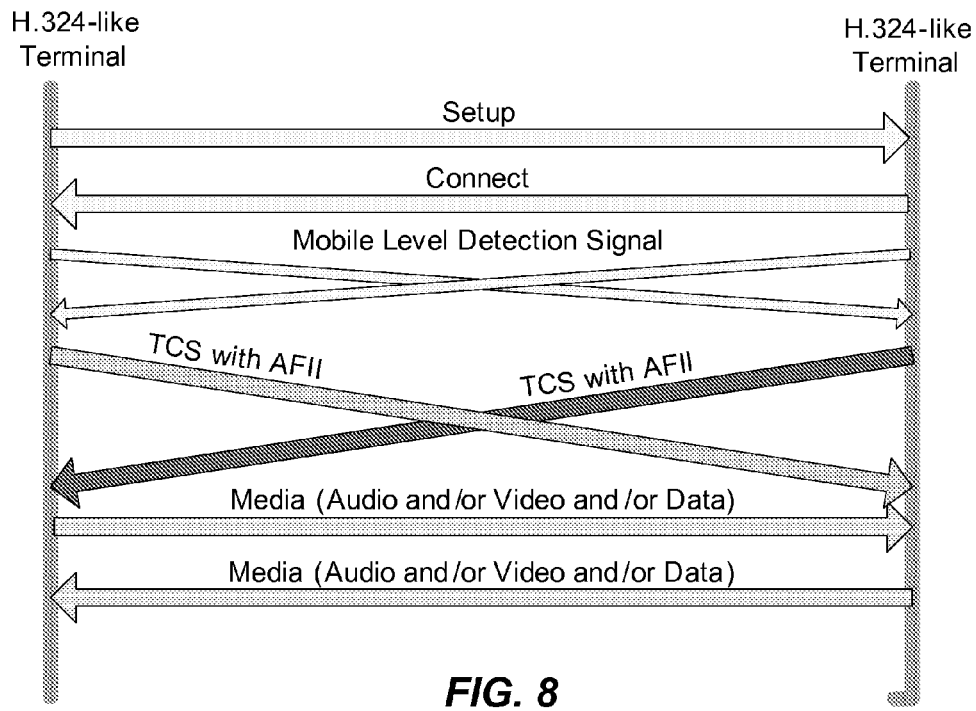
FIG. 8 is a simplified diagram illustrating the use of AnswerFast2 according to another embodiment of the present invention.

FIG. 8 is a simplified diagram illustrating the use of AnswerFast2 according to another embodiment of the present invention. As shown in FIG. 8, a H.245 NonStandard Capability is used between two H.324 terminals that support AnswerFast2. The message flow between the two H.324 terminals supporting AnswerFast2 in H.245 NonStandard Capability is illustrated. In this case inference or a preference rule set is used at each terminal and the optional response message is not required to be sent before media transmission may begin. The media may be a unidirectional or bidirectional channel.

AnswerFast2 Request Capability

According to embodiments of the present invention, the AnswerFast2 Request Capability is provided as follows. A calling terminal requests AnswerFast2 by including a capability of type NonStandardParameter into the outgoing TerminalCapabilitySet. This capability is identified by a NonStandardIdentifier with an object ID to be determined. The data field of the NonStandardParameter is populated with a PER encoded structure with the following ASN definition:

```
AnswerFast2Request ::= SEQUENCE
{
    version      INTEGER (1..255),
    afkey        INTEGER (1 ... MAX),
    terminalType INTEGER (0 ... 255), -- For
```

```
        -continued

MasterSlaveDetermination
    multiplexEntryDescriptors SET SIZE (1 ... 15) OF
                    MultiplexEntryDescriptor
OPTIONAL, -- MTE
    ...
}
```

The version field indicates the version of the AnswerFast2 extension. The afkey field is a unique identifier to identify it is an AnswerFast2 non-standard parameter and is defined as 71123521. The terminalType field is encoded with the same value as would be used in the terminalType field of an outgoing H.245 MasterSlaveDetermination Request from the calling party. And finally, the multiplexEntryDescriptors are settings as would be used in an outgoing MultiplexEntrySend Request.

The NonStandardIdentifier is defined as "{iso (1) memberbody (2) au (36) acn (71123521) vendor specific 1 (1) vendor specific 2 (1)}", which represents AnswerFast2.

In general, it is preferable that a calling terminal be able to open logical channels for all transmitAudioCapability, receiveAudioCapability (treated also as having the ability to transmit audio), receiveAndTransmitAudioCapability, transmitVideoCapability receiveVideoCapability (treated also as having the ability to transmit audio), and receiveAndTransmitVideoCapability entries that are advertised in the outgoing TerminalCapabilitySet, as the receiving terminal will interpret each capability as a proposed OpenLogicalChannel request. Each indicated capability (receive and/or transmit) may be interpreted by the receiver as a proposition to open a logical channel matching the capability. Other rules, such as a preference order for acceptance, or a limitation based on media type could be applied to determine properties of a channel to be opened. A media type limitation could take the form of limiting accelerated session set up to only a single audio, single video or single data channel.

Additionally, it is generally preferable that there is symmetry for multiplex table entries. Thus, in some embodiments, the calling terminal sets its multiplex table to be exactly as the calling terminal specifies for its transmitted channels. A terminal may determine its multiplex table entries using some method, predefined, predetermined or explicit. In cases wherein the called terminal sets its multiplex table entries to be exactly as the calling terminal uses, the receiver is allowed to properly accept and process data that is received.

The AnswerFast2 capability is contained in a CapabilityDescriptor within the capability table that is distinct from the audio, video, and user indication capabilities. This ensures that terminals that do not support AnswerFast2 will ignore the additional entry. Endpoints that support AnswerFast2 generally provide multiple capabilities in the same CapabilityDescriptor as the AnswerFast2 capability. This allows for future enhancement of the AnswerFast2 procedure using new NonStandardIdentifier values.

AnswerFast2 Response

According to embodiments of the present invention, an AnswerFast2 Request Response may be provided as follows. If a called terminal receives a TerminalCapabilitySet containing an AnswerFast2 capability, it will perform a master slave determination by comparing the terminal type value in the received AnswerFast2 request with the value for the local terminal. The highest value will be selected as the master. In the event of equal terminal type values, the calling terminal will be selected as the master. Alternatively if the MasterSlaveDetermination Request is transmitted with the TerminalCapabilitySet it may instead be used for Master Slave determination.

The called terminal will analyze the received capability table to determine the proposed OpenLogicalChannel and multiplex table entries for the new connection. The called terminal may respond with a normal TerminalCapabilitySetAck if it cannot derive an acceptable channel configuration, or if it is unable to accept the multiplexEntryDescriptors provided. This will also occur if the called terminal does not support AnswerFast2.

If acceptable channel configurations and multiplex table entries can be derived, the called party may replace the normal TerminalCapabilitySetAck with a H.245 ResponseMessage of type NonStandardMessage. The NonStandardIdentifier of the non-standard response message will have the same object ID as the incoming AnswerFast2Request. The data field of the NonStandardParameter is populated with a PER encoded structure with the following ASN definition:

```
AnswerFast2Response ::= SEQUENCE
{
    sequenceNumber SequenceNumber,
    version INTEGER (1 ... 255),
    decision    CHOICE    -- MasterSlaveDetermination
result based on "terminalType" compare
    {                       -- if terminalType is the
same then caller
        master    NULL,    -- is always the master
        slave     NULL
    },
    multiplexTableEntryNumber SET SIZE (1 ... 15) OF
MultiplexTableEntryNumber OPTIONAL,
    logicalChannels SEQUENCE OF OpenLogicalChannel,
    ...
}
```

The sequenceNumber field corresponds to the sequence number value of the TerminalCapabilitySetAck that is being replaced by this response. This allows the calling terminal to maintain H.245 message synchronization. The decision field indicates the master/slave status of the called terminal, i.e. the calling terminal sets its master/slave status to the opposite of the value indicated in this field. The multiplexTableEntryNumber field contains a list of all multiplex table entries that were accepted by the called terminal. In general, there is an implied symmetry for multiplex table entries. The called terminal sets its multiplex table to be exactly as the caller terminal specifies for its transmitted channels.

The logicalChannels field contains a list of all channels that both terminals will transmit. Channels transmitted from the calling party are indicated by a dataType field of value nullData in the forwardLogicalChannelParameters element in combination with an optional reverseLogicalChannelParameters containing the channel information.

Fallback from AnswerFast2

According to embodiments of the present invention, fallback techniques are provided for terminals that do not support one or more of the AnswerFast techniques described herein. For example, for fallback from AnswerFast2, if the called terminal does not support AnswerFast2, or if it rejects the proposed AnswerFast2 parameters, the called terminal receives a conventional TerminalCapabilitySetAck and normal H.245 negotiation are used to continue the call.

Figure 9:
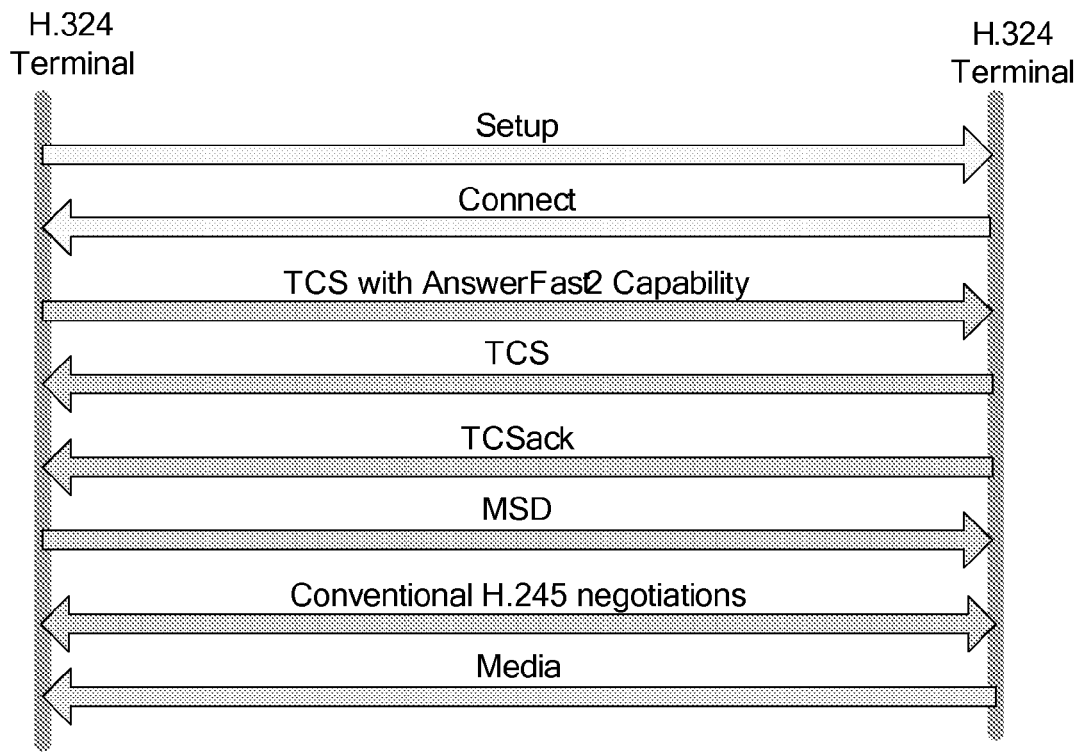
FIG. 9 is a simplified diagram illustrating fallback from AnswerFast2 according to an embodiment of the present invention.

FIG. 9 is a simplified diagram illustrating fallback from AnswerFast2 according to an embodiment of the present invention. As illustrated in FIG. 9, the calling terminal attempts a call with AnswerFast2 in H.245 NonStandard Capability to a terminal that does not support AnswerFast2. After the calling terminal receives the TCSAck, an MSD is transmitted and H.245 negotiations are continued according to AnswerFast1, AnswerFastSRP or conventional negotiations. Depending on the embodiments other fallback mechanisms are possible.

A Further AnswerFast2 Variant Exemplary Embodiment

Further by way of example, the invention has been applied to performing a fast session setup procedure over the H.245 control-channel utilizing an inference algorithm, but it would be recognized that the invention may also include other applications. The methods described herein are generic and can be implemented in many different ways by a person skilled in the art. We describe herein exemplary embodiments to illustrate the methods which can be adapted easily to suit specific equipment needs.

Figure 10:
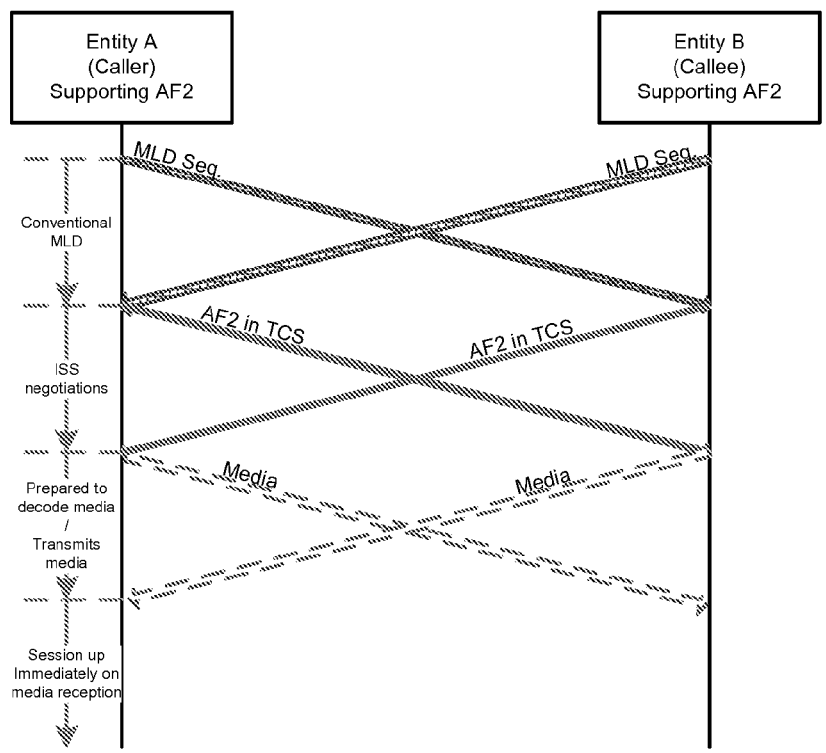
FIG. 10 is a diagram illustrating communication flow between two H.324 terminals using extensions of H.245 messages to reduce connection times for H.324 calls according to an embodiment of the present invention.

FIG. 10 is a diagram illustrating communication flow between two H.324 terminals using extensions of H.245 messages to reduce connection times for H.324 calls according to an embodiment of the present invention. As illustrated in FIG. 10, a method is provided in which call setup times are reduced (i.e., the number of sequential steps used to establish an H.324-like call are reduced) by using the non-standard or generic messaging capabilities of the H.245 protocol during the call setup process. In embodiments of the present invention, the use of the non-standard or generic messaging capabilities are referred to as "AF2" in or with the TCS message in the figures.

There are a number of ways to add non-standard, or custom, messages in the H.245 protocol in order to speed up the call. One approach provided herein is the use of a non standard, or generic, capability within the H.245 TerminalCapabilitySet message and/or a NonStandardMessage H.245 Response message. According to an embodiment of the present invention, a terminal includes a capability in the genericInformation field in the TerminalCapabilitySet. According to another embodiment, information related to a capability of a terminal is included in the genericInformation field in the TerminalCapabilitySet message. The capability used in a particular embodiment is the FSS request message {itu-t(0) recommendation(0) h(8) 324 generic-capabilities(1) fastSessionSetup(0) explicit profile (2), with this OID in genericInformation.messageIdentifier field}. According to some embodiments, the mobileLevel field is not used, and it is determined at an earlier stage negotiation, either through pre-arranged/predefined selection, or as a result of an earlier negotiation such as an AnswerFast3 or an AnswerFast3 negotiation.

These messages can be used to signal that the calling equipment is capable of operating in a particular way, and to provide proposals and preferences to the remote terminal relating to Master Slave Determination, Logical Channel(s) to be opened and Multiplexer Table Entries embedded within these non-standard extensions to accelerate call setup. If the remote terminal supports this method, it may signal the calling terminal using a non-standard extension which will also indicate that it accepts, and may also propose modifications or provide other information, including for example the Multiplexer Table Entries that it is using.

If the called terminal does not support this method (i.e., the inclusion of a non-standard capability in the H.245 messaging), the terminal will simply ignore the non-standard extension and not respond with the non-standard response, but a standard response (e.g., a conventional TCSAck). The call will then proceed as for a standard H.324-like call, utilizing normal H.245 negotiation to continue the call setup. These fallback modes are well known to one of skill in the art. The use of Non-Standard messaging does not require non-supporting terminals to handle concatenation methods as described more fully below.

As illustrated in FIG. 10, an MLD sequence is performed between the two terminals Entity A (Caller) and Entity B (Callee). As will be evident to one of skill in the art, prior to the MLD sequence, a call signaling message is transmitted from the first terminal to the second terminal through the telecommunication network. The call signaling message is used to initiate a call. A bearer channel is established between the first terminal and the second terminal once the call signaling message has been received by the second terminal. Then a common mobile level for operation is determined.

One or more custom Non-Standard H.245 messages or custom Non-Standard fields are provided in standard messages as illustrated after the conventional MLD process shown in FIG. 10. In FIG. 10, the one or more custom Non-Standard H.245 messages, custom Non-Standard fields in standard messages, or messages in generic fields are illustrated as "AF2 in TCS," that is, messaging in the terminal capability set (TCS) field.

In a particular embodiment of the method of using custom H.245 messages, a non-standard Capability is used. Typically, in conventional H.324-like equipment, the first H.245 message sent is a Terminal Capability Set (TCS) message. The calling equipment includes a capability of type NonStandardParameter in the TCS it sends to the answering equipment. This capability is identified by a NonStandardIdentifier with a unique Object Identifier. This capability contains the additional parameters needed by the called terminal to start the call, including terminalType (needed for MSD in the same manner as it is required for standard H.245 operation) and Multiple Table Entry (MTE) Descriptors. FIG. 5 shows an example of an ASN.1 description containing the syntax for these data. By including this NonStandard Capability, the calling party is enabled to accept the decision of the called party as to whether this method is used, and what channels are selected.

According to embodiments of the present invention, the response message is not required to determine what channels are selected. A determination of the inferred common mode (ICM) follows the rules defined in FSS using only the information available in the first H.245 message group, the TCS and/or the MSD and any custom messages contained therein.

According to one embodiment of the inference algorithm for an inferred common mode, the codecs are selected in the same way as normal H.245 message exchange, except all transactions are conducted implicitly till the final outcome, this outcome forms the inferred common mode. The following discussion provides examples of inference algorithms and is provided merely by way of example. One of ordinary skill in the art would recognize many variations, modifications, and alternatives.

Adaptation layer settings are specified by the local terminal in OpenLogicalChannel messages. For each media, adaptation layer 3 (AL3) is commonly supported. If only AL3 is specified for a media in the mediaProfiles of a terminal, only AL3 is supported. If AL2 is included, both AL2 and AL3 are supported. If AL1 is included, all AL1, AL2 and AL3 are supported.

Initial logical channel number selections are made by the local terminal. If a reverse channel number conflicts with a receive channel number opened by the remote, the receive channel number will use the next available logical channel number. The processing of channels should be from the first entry of the mediaProfiles. Conflicts that can occur during determination of ICM and logical channel number can be resolved implicitly as described above.

In this inference algorithm, media are represented by a list OpenLogicalChannel. Media preferences may be indicated by specifying more than one OpenLogicalChannel, with the same logical channel number in the desired logical channel preference order. If more than one logical channel of the same type is expected to be opened, different OpenLogicalChannel message of the same media type but different logical channel numbers are specified. Further symmetric codecs are indicated by specifying a separate OpenLogicalChannel with reverse logical channel parameter only, which is the same as the expected symmetric media type.

By way of example, the following describes the inference outcome using this embodiment. Terminal capability sets for both terminals are inferred from the combination of mediaProfiles from local and remote. Multiple OpenLogicalChannel entries with the same LCN correspond to a series of alternative capability descriptor entry; OpenLogicalChannels with different LCNs correspond to simultaneous capability descriptor entries.

The capability direction is set to receive capability (e.g. receiveVideoCapability, receiveAudioCapability) unless symmetric is set, where the capability direction is set to receive and transmit capability (e.g. receiveAndTransmitVideoCapability, receiveAndTransmitAudioCapability).

The set of capability descriptors is derived with the same order of preference as the order in mediaProfile, and includes by default an instance of each logical channel type. The remote terminal is assumed to support all adaptation layers (AL1, AL2 and AL3) for all media categories (audio, video and data). Other settings in the TerminalCapabilitySet adopt the corresponding recommended values specified in 3GPP TR26.110, H.324, H.245 and H.223.

Codecs are selected in the same way as normal H.245 message exchanges, deduced according to capability preferences and media mode conflict resolution as in B.2.2.2/H.324 and C.4.1.3/H.324. Channels are considered open following the computation of the inferred mode. The peer's channel is selected by reversing the TCS inputs to the selection algorithm.

The following behavior is described as a method to minimize the chance of endpoints attempting to open conflicting logical channels when the slave endpoint has symmetric capability limitations. When the master and the slave have indicated choices of receive capabilities for a particular media type, the slave should attempt to open a logical channel for the master's most preferred capability for which it has capability, as given by the order the master has expressed its capabilities; and the master should attempt to open a logical channel for its most preferred capability for which the slave has capability, as given by the order it has expressed its capabilities.

If a terminal has a preference for the mode it would like to transmit or receive, and wishes to express this when transmitting its capabilities, it may do so by giving CapabilityDescriptors that relate to its preferred mode or modes small values of capabilityDescriptorNumber.

An example of ICM that does NOT have symmetric codecs set is shown in Table 1.

TABLE 1

| Entity A (Master) | Entity B (Slave) |
| --- | --- |
| LCN1: AMR Tx, AL2 | LCN1: AMR Tx, AL2 |
| LCN2: MPEG4 Tx, AL2 | LCN1: G.723.1 Tx, AL2 |
| LCN2: H.263 Tx, AL2 | LCN2: H.263 Tx, AL2 |
| | LCN2: MPEG4 Tx, AL2 |
| LCN1, AMR Tx, AL2 | LCN1: AMR Tx, AL2 |
| LCN2: H.263 Tx, AL2 | LCN2: MPEG4 Tx, AL2 |

In this example, each entity selects media channels most preferred for reception by its peer entity. Both entities prefer AMR. Entity A prefers to receive MPEG4-Video while entity B prefers to receive H.263.

An example of ICM that does have symmetric codecs set is shown in Table 2.

TABLE 2

| Entity A (Master) | Entity B (Slave) |
| --- | --- |
| LCN1: AMR Tx, AL2 | LCN1: AMR Tx, AL2 |
| LCN2: MPEG4 Tx, AL2 | LCN1: G.723.1 Tx, AL2 |
| LCN2: H.263 Tx, AL2 | LCN2: H.263 Tx, AL2 |
| | LCN2: MPEG4 Tx, AL2 |
| LCN1, AMR Tx, AL2 | LCN1: AMR Tx, AL2 |
| LCN2: MPEG4 Tx, AL2 | LCN2: MPEG4 Tx, AL2 |

In this example, each entity selects media channels most preferred for reception by its peer entity. Both entities prefer AMR. Entity A prefers to receive MPEG4-Video while entity B uses MPEG4-Video in symmetry to the master.

Embodiments of the present invention utilize an ICM procedure. For example, in a particular embodiment, the ICM is the unique media mode determined by both terminals based on local profile request and peer profile request. In a particular implementation, the ICM is the same for both terminals.

In an embodiment, if a called terminal receives a TCS containing the NonStandard capability relating to this method and itself supports the method, it will perform a master slave determination by comparing the terminalType value in the received NonStandard capability with the value for the local terminal. The highest value will be selected as the master. In the event of equal terminal type values, the calling terminal will be selected as the master.

Additionally, in this embodiment, the called terminal will analyze the received capability table to determine the OpenLogicalChannel and multiplex table entries for the new connection. The called terminal will respond with a normal TCSAck if it cannot derive an acceptable channel configuration, or if it is unable to accept the multiplexEntryDescriptors provided. The remainder of the call setup will then be via normal H.245 negotiation.

If acceptable channel configurations and multiplex table entries can be derived, the called party may replace the normal TCSAck with an H.245 ResponseMessage of the type NonStandardMessage. See FIG. 6 for an ASN.1 Syntax description of the encoded data. The NonStandardIdentifier of the non-standard response message will have the same Object Identifier as the NonStandard capability which identifies this method.

Referring to FIG. 10, media is transmitted from the first terminal to the second terminal prior to the completion of a further H.245 procedures. In particular, H.245 OpenLogicalChannel procedures do not need to be completed to establish the media stream, however depending on the levels of predefined additional information they may be used to transfer additional information. In contrast with FIG. 1, in which media transmission is delayed until after OpenLogicalChannel, embodiments of the present invention reduce call setup times and thereby transmit media with less delay after bearer establishment.

Figure 2:
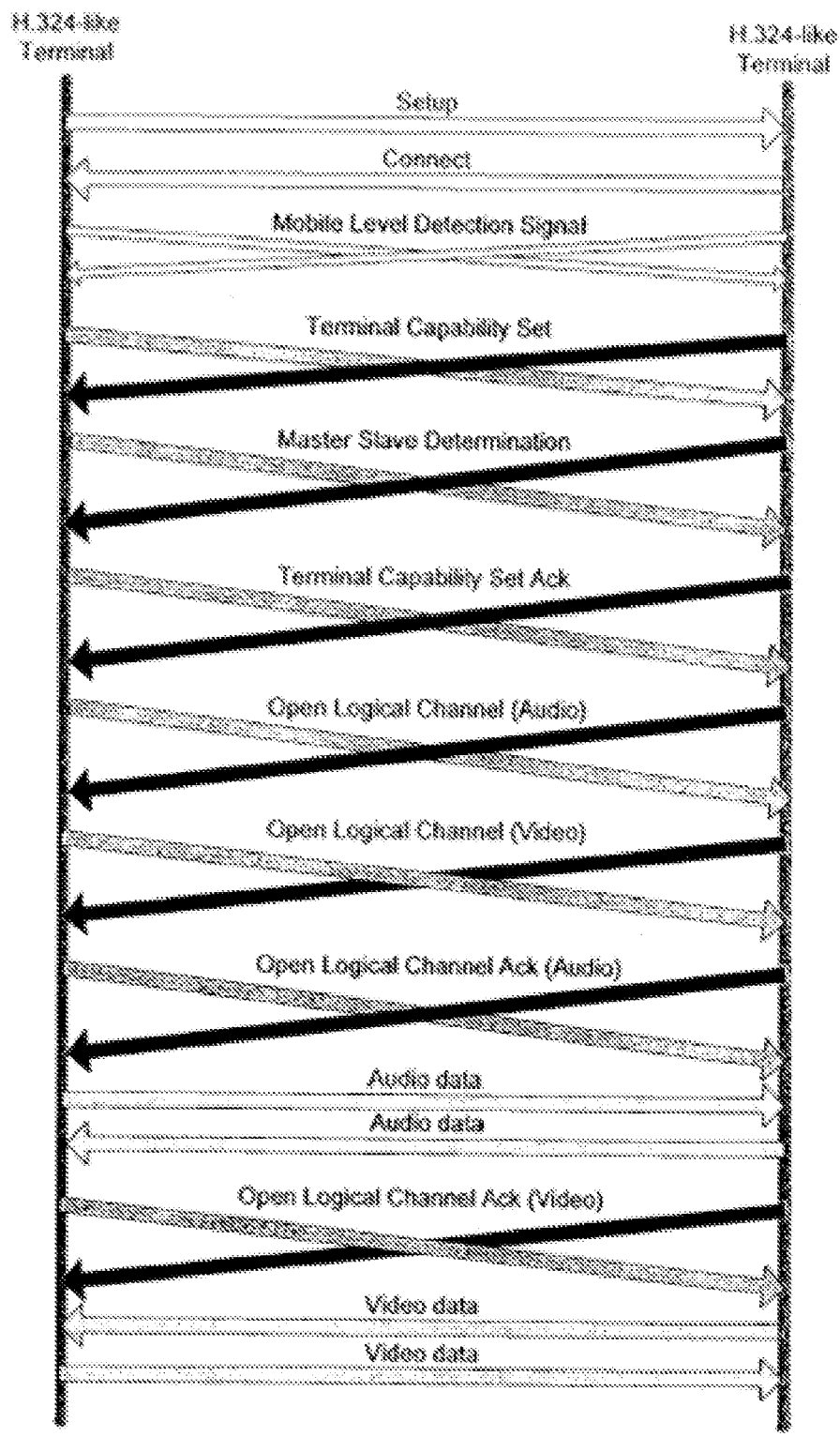
FIG. 2 illustrates session Setup for a call between H.324-like equipment;.

Referring to FIG. 2 and FIG. 4, there are many messages that do not need to be completed before media can be transmitted when using embodiments of this invention. These include TCSAck, MSD Ack, OLC and OLC Ack, MTE, and MTE Ack. Some or all of these messages could be employed after media transmission to modify some characteristics of the session.

The one or more custom H.245 messages or custom non-standard fields are associated with one or more set up parameters for a mode of operation for the call. In an embodiment, the mode of operation includes an initial mode of operation. In another embodiment, the mode of operation includes a predetermined mode of operation. The one or more custom Non-Standard H.245 messages or custom Non-Standard fields in standard messages are transmitted from the first terminal to the second terminal. In an optional process, a custom Non-Standard response message associated with the one or more custom Non-Standard H.245 messages or custom Non-Standard fields may be transmitted from the second terminal to the first terminal.

Computer-readable medium are utilized herein to provide the functionality enabled by embodiments of the present invention. Generally, the computer-readable medium include instructions utilized in practicing the methods described herein.

Embodiments of the present invention are not limited to implementations solely employing the use of Non-Standard messaging, but may include fast session setup techniques as described throughout the present specification. As discussed below, other embodiments incorporate concatenation techniques to reduce call setup times. In these other embodiments, other H.245 messages, such as the MasterSlaveDetermination (MSD) request message, may be concatenated with the TerminalCapabilitySet for interoperation with non-supporting terminals.

Depending on the particular embodiment, this may include ignoring the outcome of mobile level. After a terminal has received its peer's TCS, decoded it successfully, and determined an ICM, further H.245 message exchange for session setup may be skipped and opened logical channels operate immediately. A response message or confirmation message could also be sent.

Embodiments of the present invention utilizing Non-Standard messaging offer a number of benefits including one and a half less round trip exchanges than the embodiment of the method of Concatenated H.245. The expression of Capability in the NonStandard field of the TerminalCapabilitySet request message provides that the called terminal will not malfunction or hang-up as it is required to be able to handle the case of a non-standard Capability being communicated to it.

Another benefit provided herein is that the encapsulation of the custom message in the TerminalCapabilitySet request message allows the terminal to transmit the custom message in the first H.245 message after the mobile level determination is done, and hence it does not have to wait for any further messages, or acknowledgements, or underlying SRP acknowledgements, before it may transmit media. A third benefit provided herein is that the TerminalCapabilitySet request containing the Non-Standard message embedded as a non-standard Capability can be transmitted together with one or more H.245 messages using concatenation allowing for additional information to be sent for common mode inference, or for establishing sessions more quickly with terminals employing AnswerFast1 techniques. Yet another benefit provided herein is that in embodiments in which the calling terminal presents several preferences in the Non-Standard messaging, the called terminal responds with an acknowledgement message that informs the calling terminal of the preferred modes of the called terminal and its selection of one of the preferred modes of the calling terminal.

Figure 11:
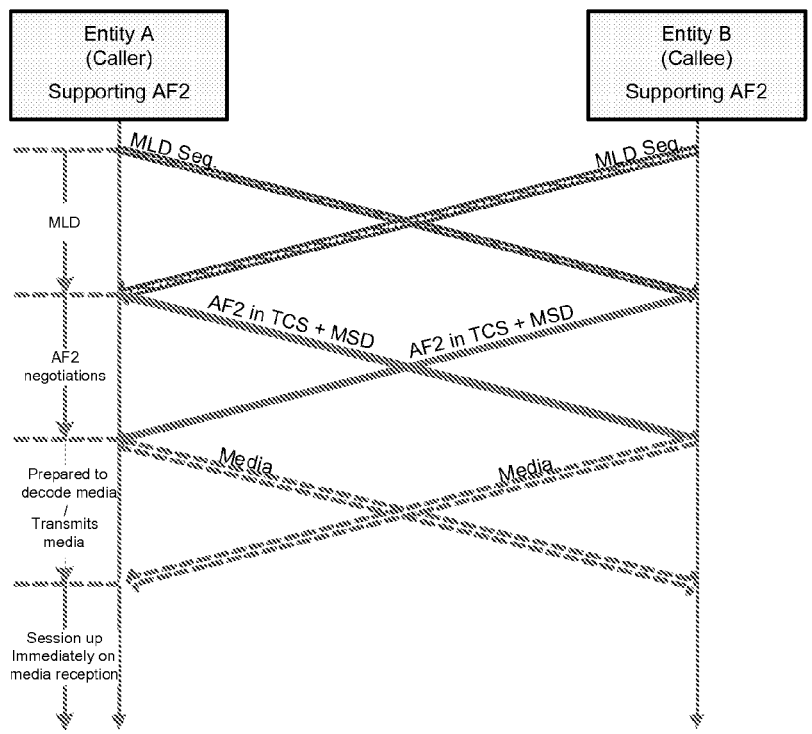
FIG. 11 is a diagram illustrating communication flow between two H.324 terminals using extensions of H.245 messages and concatenation to reduce connection times for H.324 calls according to an embodiment of the present invention.

FIG. 11 is a diagram illustrating communication flow between two H.324 terminals using extensions of H.245 messages and concatenation to reduce connection times for H.324 calls according to an embodiment of the present invention. As illustrated in FIG. 11, call setup times are reduced by concatenating multiple H.245 messages in one or more SRP/NSRP (H.245 PDU) Command Frames. Accordingly, the number of H.245, SRP/NSRP messages and associated round-trip delays are reduced. The H.245 messages are concatenated in a way as not to violate inter-procedure dependencies.

The usage of H.245 within H.324 allows equipment to concatenate multiple H.245 elements into a single PDU, thus avoiding the need to use two round trips for each request/response pair due to the need for an SRP/NSRP response to be received for each H.245 PDU before the next PDU is allowed be transmitted. Embodiments of the present invention use concatenated H.245 to send multiple H.245 messages, each originating from different Signaling Entities that have no dependencies on each other, within a single H.245 PDU.

Interoperability with equipment that do not support concatenated H.245 is achieved by noting that such equipment ignores the second and subsequent H.245 elements in a PDU, so will not send any required H.245 Response messages if the ignored message is an H.245 Request message. Therefore, the first concatenated H.245 PDU sent contains at least two Request messages, where the first message is a Request. If only the Ack for the first message is received, the sending equipment will retransmit those Requests and any other messages that have not been acknowledged, and in doing this and in sending any and all subsequent H.245 messages should revert to sending only a single H.245 message in each subsequent H.245 PDU. If responses to all H.245 messages in the first H.245 PDU are received, the sending equipment can continue to use concatenated messages. The use of this technique will reduce the number of round trip delays if concatenated messages are supported. This method does not define any protocol elements additional to those already allowed and defined by the H.245 and H.324 standards. It can be considered to be utilizing the existing protocols in a smart fashion, rather than an extension to it.

Referring to FIG. 11, a method provided herein includes transmitting a call signaling message from a first terminal to a second terminal through a telecommunication network to initiate a call, establishing a bearer channel between the first terminal and the second terminal once the call signaling message has been received by the second terminal, and determining a common mobile level. Additionally, the method includes determining two or more H.245 messages associated with set up parameters for an initial mode of operation, concatenating the two or more H.245 messages into one SRP command frame according to a predetermined size of the SRP command frame, and transmitting the SRP command frame including the two or more H.245 messages from the first terminal to the second terminal through a telecommunication network. As illustrated in FIG. 11, an AnswerFast2 message in the TCS field is concatenated with an MSD message. In other embodiments, as described more fully below, other H.245 messages are concatenated and the example illustrated in FIG. 11 is provided merely by way of example. One of ordinary skill in the art would recognize many variations, modifications, and alternatives.

In a particular embodiment of this method of concatenated H.245 messages, a terminal combines H.245 Request Terminal Capabilities (TCS) and Request Master Slave Determination (MSD) messages into a single H.245 PDU. It also concatenates TCS and MSD Response Messages (Acks), multiple Open Logical Channel Requests (OLC) and Multiplex Table Entry Send Request (MES) in a single H.245 PDU. Moreover, it combines OLC and MES responses into a third H.245 PDU. The process of setting up an H.324 call between two terminals that support this embodiment of the concatenation method is illustrated in FIG. 11. The result of adopting this approach reduces the number of round trips required for call setup from around ten to three. This embodiment provides that the MSDSE and CESE state machines can run in parallel, and that the multiple LCSE and MTSE state machines can run in parallel. This embodiment is merely one example of the application of the method of concatenated H.245 messages in the present invention; other concatenations of messages can be constructed. As will be evident to one of skill in the art, these may put different constraints on the signaling entity state machines within the implementation of H.245.

Optionally, the method also includes reverting to a normal operation if one of the terminals does not support concatenated H.245 messages. In this case, the calling terminal detects the lack of support since the calling terminal does not receive the H.245 response to the second of the concatenated H.245 messages. In this case, the calling terminal would revert to individual H.245 messages in the SRP command frames and retransmit the H.245 messages individually from the second message onwards. There can be many other variations, alternatives, and modifications.

Alternatively, the method can also be applied to the Numbered Simple Retransmission Protocol (numbered version of SRP which includes a sequence number in the SRP command and SRP acknowledgement frames) and other like variations. Of course, there can be other variations, modifications, and alternatives.

Figure 12:
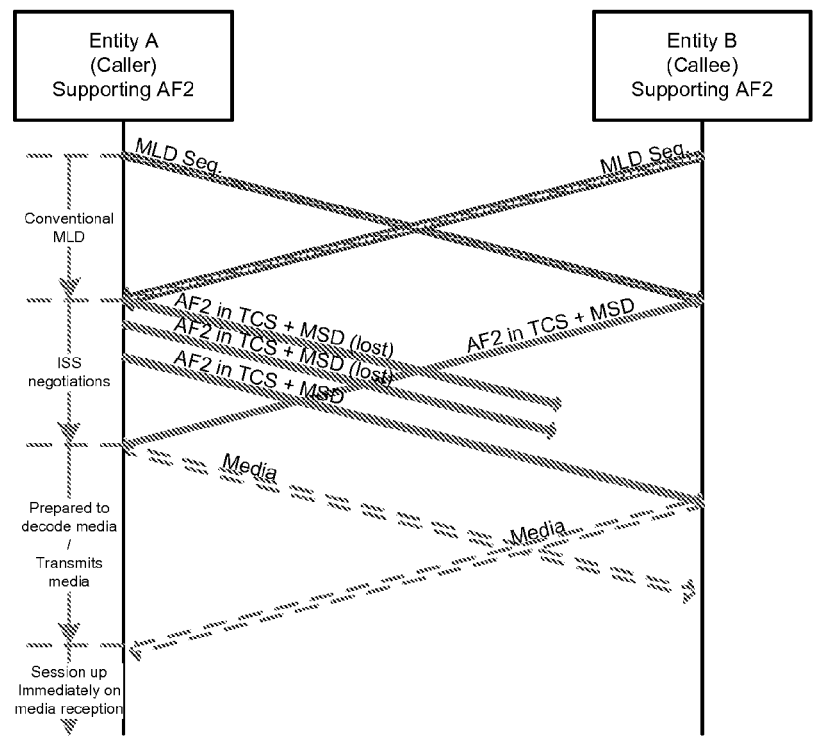
FIG. 12 is a diagram illustrating an alternative communication flow between two H.324 terminals using extensions of H.245 messages to reduce connection times for H.324 calls according to another embodiment of the present invention.

FIG. 12 illustrates an alternative communication flow between two H.324 terminals using extensions of H.245 messages to reduce connection times for H.324 calls according to another embodiment of the present invention. As illustrated in FIG. 12, a retransmission of the H.245 messages, and underlying SRP frame or frames, can be performed. The retransmission can be performed at the network link layer, for example in a modem buffer, at the SRP layer, or at the H.245 layer. The lower layers are simple retransmissions not affecting the H.245 layer. The H.245 layer retransmission could be redundant retransmissions without regard to the standard retransmission timer or the retransmissions could be achieved by a shortening of the standard timer associated with retransmission, T401, to much less than the round trip time.

The advantages of the retransmission are most useful in errored conditions when several transmissions of a message could be lost. If a normal retransmission of around a round trip time was employed, then very large delays could be accumulated. These delays due to slow retransmission have a larger proportional impact on the setup time of the inferred method, doubling or worse the setup time from good to bad conditions. As a result, employing the retransmission technique the AnswerFast2 inferred technique described herein provides better performance in error conditions and more consistent performance across a variety of network conditions.

Figure 13:
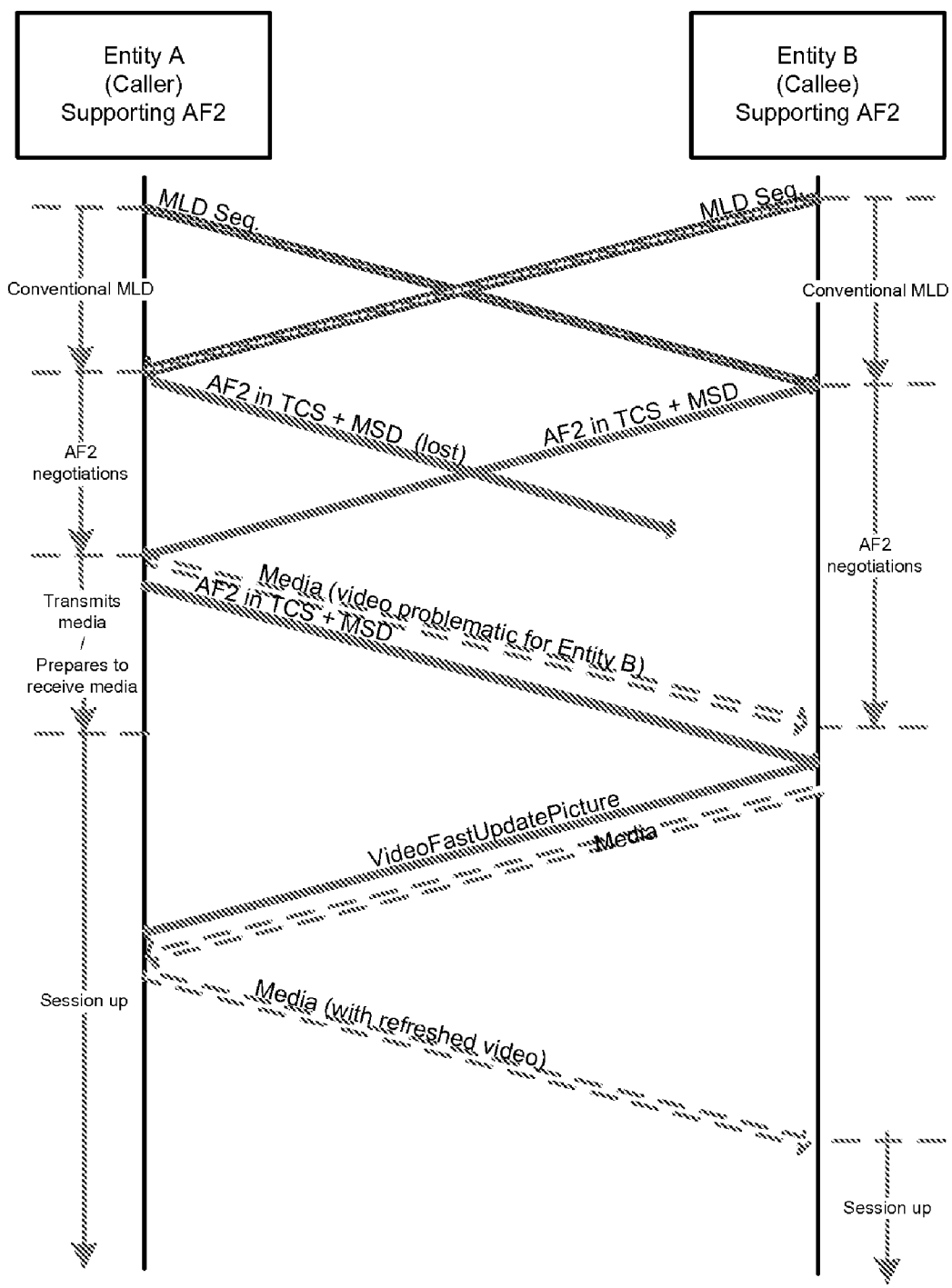
FIG. 13 is a diagram illustrating a method of recovering media after loss of a preference message according to an embodiment of the present invention.

FIG. 13 is a diagram illustrating a method of recovering media after loss of a preference message according to an embodiment of the present invention. The preference/capability message, TCS, transmitted from the first terminal to the second terminal is lost and media arrives at the second terminal (Entity B) before the preferences, TCS, message. In the embodiment illustrated in FIG. 13, if media is detected (i.e. MUX-PDUs) before the TCS/AF2 message is processed, the terminal will wait for the TCS to arrive. This sequence may occur, for example, if TCS is lost, or could also occur if a response message required for media to be able to be decoded arrives after the first media. After the TCS arrives, the AnswerFast2 negotiations are finalized and the terminal may use conventional procedures to recover an incoming media stream so that it can be decoded.

In particular applications including video, one procedure to recover media is to immediately transmit a VideoFastUpdatePicture signal allowing for clear media decoding at the arrival of the produced updated picture. This procedure is illustrated in FIG. 13. Furthermore, the likelihood of media arriving before the capability/preference message, the TCS in this example, is reduced in some embodiments by using WNSRP with a short T401 timer, as previously mentioned with reference to FIG. 12.

According to embodiments of the present invention, the media recovery message may use a CloseLogicalChannel message with a "reopen" indication. According to other embodiments of the present invention, the media recovery message may use a new Custom message (H.245 or other) that causes a restart of media transmission to facilitate recovery.

Figure 14:
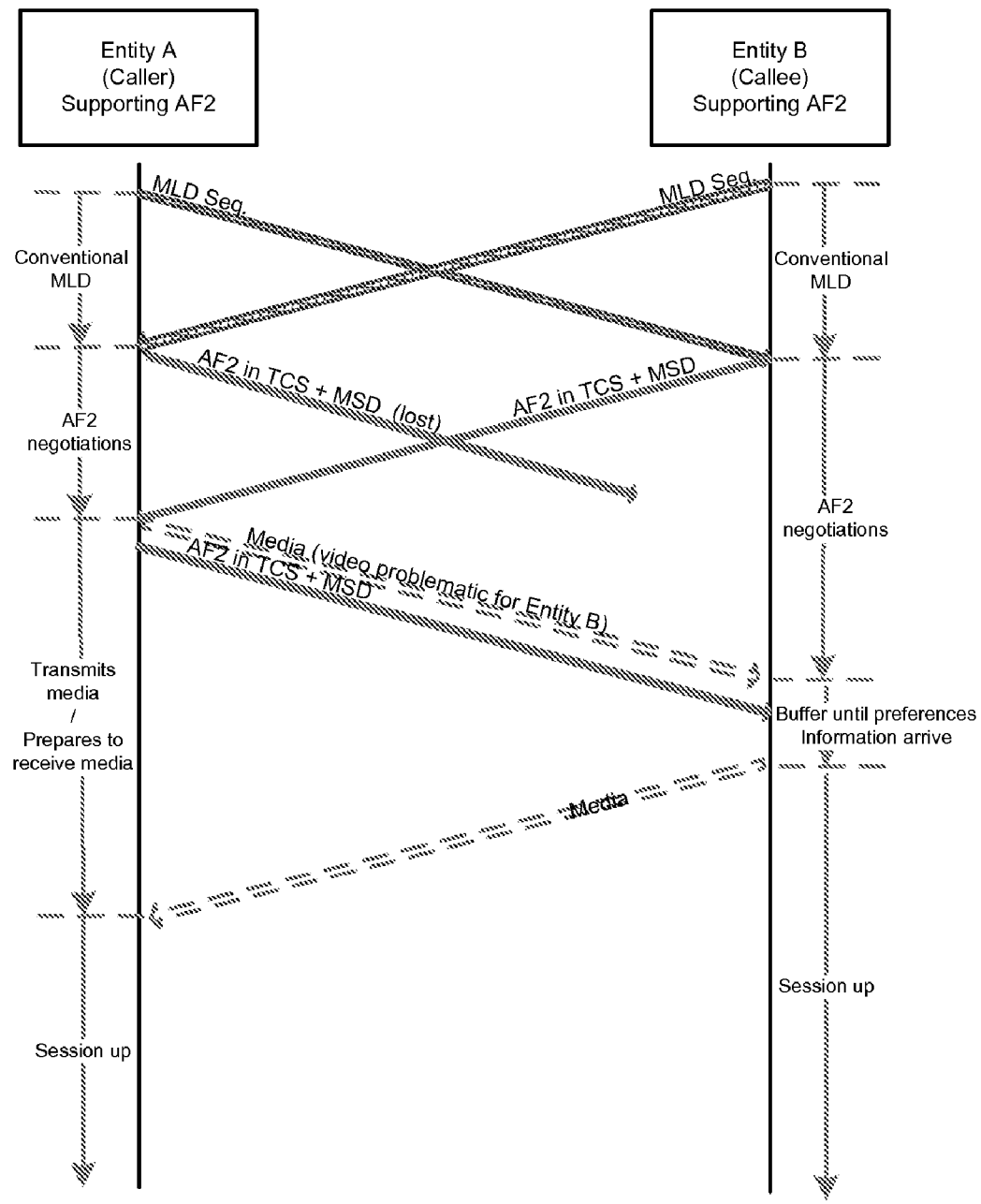
FIG. 14 is a diagram illustrating a method of recovering media after loss of a preference message according to an embodiment of the present invention.

FIG. 14 is a diagram illustrating a method of recovering media after loss of a preference message according to an embodiment of the present invention. The preference/capability message, TCS, transmitted from the first terminal to the second terminal is lost and media arrives at the second terminal (Entity B) before the preferences, TCS, message. In the embodiment illustrated in FIG. 14, if media is detected (i.e. MUX-PDUs) before the TCS/AF2 message is processed, the terminal will wait for the TCS to arrive and, while waiting, it will buffer all arriving media. This sequence may occur, for example, if TCS is lost, or could also occur if a response message required for media to be able to be decoded arrives after the first media.

After the TCS arrives, the AnswerFast2 negotiations are finalized and the terminal may then decode the buffered media stream at faster than real time to arrive at real time decoding of the arriving media. This has the benefit of not missing any of the media at the decoder, but only displaying from the point after where the decoder can be configured correctly. The buffer may also be adaptive and need only store the media after certain key points of temporal significance, such as intra coded frames. The transmitter could also transmit more intra coded frames until such point that it has received an acknowledgment that indicates to it that the other end is fully configured. This may be an H.245 Ack or a lower level SRP Ack.

Figure 15:
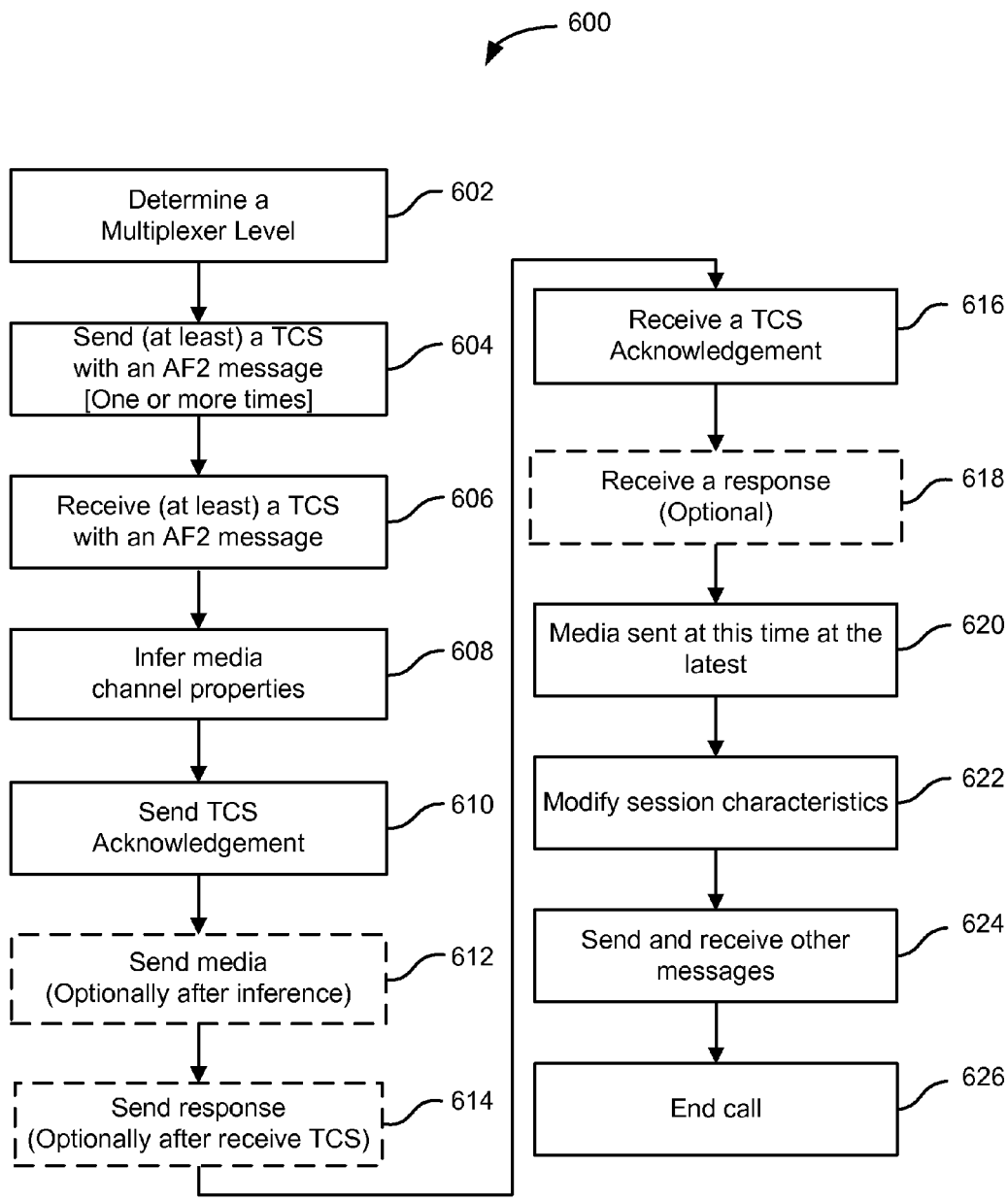
FIG. 15 is a simplified flowchart illustrating a method of reducing a call setup time for a call between H.324-like terminals according to an embodiment of the present invention.

FIG. 15 is a simplified flowchart illustrating a method of reducing a call setup time for a call between H.324-like terminals according to an embodiment of the present invention. The method (600) is considered from the perspective of one of the two terminals (referred to as a first terminal) communicating during a call and includes determining a multiplexer level (602) and sending a TCS message with an AF2 message (604). As described throughout the present specification, terminal capability information and/or preferences may be provided in a Non-Standard H.245 message or a Non-Standard field in standard messages. Alternatively, the terminal capability information and/or preferences may be provided in the GenericCapabilities field of the TCS message. In an embodiment, the terminal capability information relates to the procedures utilized to setup the call, for example, call setup with reduced setup times. As illustrated in FIG. 15, multiple TCS messages with an AF2 message may be transmitted. Additionally, the process of sending one or more TCS messages with an AF2 message may be repeated, resulting in a series of groups of messages.

One or more TCS messages with an AF2 message transmitted from the second terminal are received at the first terminal (606). Utilizing the preference information in the first TCS message (604), which relates to characteristics of the first terminal, and preference information in the second TCS message (606), which relates to characteristics of the second terminal, the media channel properties are inferred (608). Additional discussion related to methods of inferring the media channel properties are provided throughout the present specification, for example, in relation to the discussion of the determination of the ICM above.

A TCS acknowledgement (TCSAck) is transmitted from the first terminal to the second terminal (610) and media may be optionally transmitted (612) after the inference of the common mode of operation. Additionally, a response to the second TCS message may be transmitted from the first terminal to the second terminal (614). A TCS acknowledgement (TCSAck) is received from the second terminal (616) and in some cases, an optional response is also received from the second terminal (618). As illustrated in process 620, embodiments of the present invention provide for the transmission of media as early as process 612 and as late as process 620. Thus, the time delay between initiating a call and sending and receiving media is reduced through the use of the methods and systems described herein.

Session characteristics may be modified (622) and additional messages may be sent and received (624) before the call is ended (626).

It should be appreciated that the specific steps illustrated in FIG. 15 provide a particular method of reducing a call setup time for a call between H.324-like terminals according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

AnswerFast3 Exemplary Embodiment

In a particular embodiment of the method of using call signaling "user" information, Q.931 User-User Information Element is used in the SETUP and CONNECT PDUs (See. 3GPP TS 24.008 or Q.931). This Information Element is filled with an ASN.1 encoded structure (See FIG. 16) including terminalType (used for MSD in the same manner as it is required for standard H.245 operation) and a list of profiles the calling terminal wishes to offer. By including this Information Element, the calling party is required to accept the decision of the called party as to whether this method is used, and what profile is selected.

Each profile dictates the Mobile Level, Multiplex Table Entries, Logical Channels used and codecs used for each Logical Channel. FIG. 17 illustrates some examples of profiles. The profile contains all the information required to immediately begin a call and establish media between the terminals without the need to go through further H.245 signaling after the bearer is set up.

If the called terminal does not support this method, the calling terminal receives a Q.931 CONNECT PDU without a User-User Information Element and normal call setup is then used.

If a called terminal receives a SETUP PDU containing the User-User Information Element relating to this method and itself supports the method, it will perform a master slave determination by comparing the terminalType value in the received Information Element with the value for the local terminal. The highest value will be selected as the master. In the event of equal terminal type values, a technique such as selecting the calling terminal as the master can be used to resolve the conflict.

The called terminal will also select one of the offered profiles. If none of the offered profiles are suitable then no User-User Information Element should be added to the Q.931 CONNECT PDU, and the call proceeds as normal.

If a profile is suitable then the master slave determination result and the selected profile is encoded according to the ASN.1 Syntax for the response and added to the Q.931 CONNECT PDU as a User-User Information Element. FIG. 18 illustrates a particular embodiment.

Figure 19:
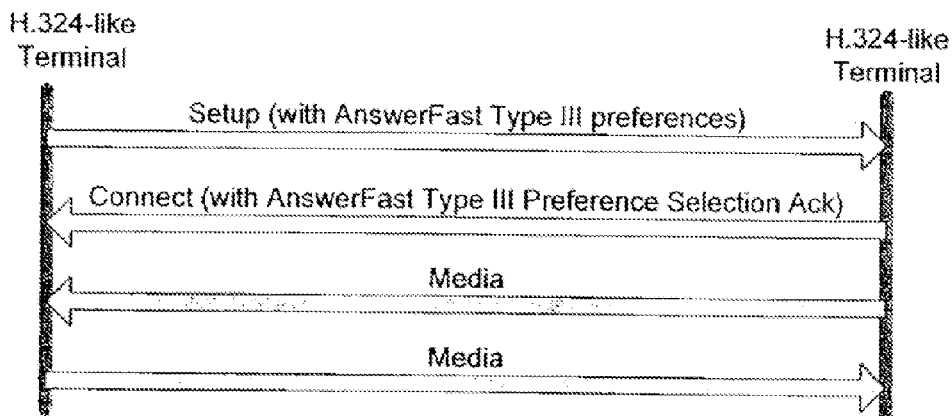
FIG. 19 illustrates an embodiment of the method of using bearer "user" information to reduce connection times for H.324 calls.

The process of setting up an H.324 call between two terminals which support this embodiment of the method of using call signaling "user" information is illustrated in FIG. 19.

Further AnswerFast3 Example Embodiment

If the underlying call signaling network is capable of transporting terminal-defined additional data elements, AnswerFast3 allows a H.324 calling terminal to specify a list of session profiles as part of the Q.931 SETUP PDU. This technique shares some similarities with the procedures performed by H.323 FastConnect. According to embodiments of the present invention, a session profile is provided that specifies values for the multiplexer as well as H.245 parameters for codecs and logical channels. In a particular embodiment, exact values for the all aspects of the multiplexer, H.245 parameters for the codecs to be used, and the logical channels are specified by the session profiles. Using the profiles provided by embodiments of the present invention, the terminals are enabled to exchange the parameters of the session at the time the called terminal accepts the call, rather than using mobile level detection, multiple H.245 procedures, and NSRP round trips after the call is accepted.

According to an embodiment of the present invention, session profiles define the following information either explicitly or implicitly:

Initial Mobile Level
Terminal type for determining Master/Slave status
Video codec(s)
Audio codec(s)
Logical channel numbers
H.223 MUX table entries and parameter limits Profiles as described herein can cover several characteristics of a call or session, all characteristics of a call/session, or only a single characteristic, such as one selected from the list above. Additionally, profiles could be coupled with preference rules that either make them additive, mutually exclusive, or any combination thereof. One of ordinary skill in the art would recognize many variations, modifications, and alternatives.

Merely by way of example, separate profiles could be used for audio, video, data and multiplexer. Overarching profiles could use sub-profiles as piece parts or define each detail explicitly. Profiles may also refer to other standard's and recommendation's profiles. Profiles may indicate a "transmit only", a "receive only" or a "transmit and receive" capability. Profiles could also be used on an individual codec basis, whereby each codec has a different profile associated with it.

Profile modifiers can be used to modify aspects of several profiles in a more general way. For example, if the bandwidth of a link was to increase, for instance double (due to bonding or otherwise) the bandwidth associated with each channel could also increase (e.g., double). However, if the profile is hard coded, the channel would be under utilizing the resources. In this case a rule could be applied to all profiles such that all channels with variable bit rates get a proportional increase, while constant bit rates do not. The re-allocation could be proportional, or redundancy coding could be put into effect on certain channels with a resulting effective rate change. Other profile features may also be modified on bit rate, such as video frame size or frame rate. Thus, after a certain bit rate is met, the next frame size up (i.e. QCIF→CIF) may be used, or the frame rate may be increased.

Other profiles may be modified such that they only become active under certain other conditions. An example is a CIF video profile that does not become active until a predetermined sufficient bit rate is met. In a particular embodiment, the predetermined sufficient bit rate is 128 kbps, whereas in other embodiments, other bit rates are utilized.

An additional modifier may be the indication of an expectation of symmetric properties for a session. One such symmetry might be the desire to have the same codec running for both transmit and receive. This may be desirable due to some limitations in some devices such as processing power or internal memory.

Audio profiles can specify many characteristics, with non limiting examples relating to codec, maximum bit rate and maximum number of AL-SDU (max al-sdu) frames allowed. Video profiles can specify many characteristics, including, but not limited to codec, frame size, maximum bit rate, unrestrictedVectors, arithmeticCoding, advancedPrediction, pbFrames, decoderConfigurationInformation, combinations thereof, and the like. Multiplexer profiles can specify many characteristics, including, but not limited to multiplexer level and use of double flag or optional header, as well as relationships between other channels for multiplexing data/media streams.

Profiles may also have other predefined characteristics associated with them, such as pre-assigning logical channel number(s) to a given logical channel type or profile definition. Profiles can also define relationships between a codec or logical channel and a multiplexer table entry or multiplexer table entry number. A simple rule would be mapping logical channel number to the multiplexer table entry number, or vice versa, an example being multiplexer table entry 1 mapping to/from logical channel number 1 for an audio channel and multiplexer table entry 2 mapping to/from logical channel number 2 for a video channel.

Profiles could be created in the Annex to the H.324 recommendation. Creating or refining further profiles in separate documents to the H.324 Recommendation may be used to extend profiles in a way more useful to industry. A separate set of profiles could be specified and recommended by H.324 and by 3GPP/3G-324M. Different profiles could be used in different releases of 3GPP/3G-324M allowing for the reuse of profile indices/identifiers and greater control over capabilities required/expected in a device. Embodiments of the present invention are not limited to presently available profiles, but include the use of future profiles as they are developed and standardized.

Merely by way of example, a number of audio, video, and multiplex profiles are listed in the following description. These profiles are not intended to limit the present invention, but only to provide examples of profiles utilized by various embodiments of the present invention.

Audio Profiles
audioProfile 0 (0x0000)
G.723.1 Audio
Baseline profile [TBD]
[Other subsets TBD]
audioProfile 256 (0x0100)
G.711 Audio
Baseline profile [TBD]
[Other subsets TBD]
audioProfile 4096 (0x1000)
GSM-AMR Audio
Baseline profile [TBD]
audioProfile 16385 (0x1001)
GSM-AMR Audio
3G-324M recommended profile [TBD]
[Other subsets TBD]
Video Profiles
videoProfile 0 (0x0000)
H.263 QCIF Video
Baseline profile [TBD]
[Other subsets TBD]
videoProfile 16 (0x0010)
H.263 QCIF Video
3G-324M recommended profile [TBD]
[Other subsets TBD]
videoProfile 256 (0x0100)
H.261 QCIF Video
Baseline profile [TBD]
[Other subsets TBD]
videoProfile 4096 (0x1000)
MPEG4-Video
3G-324M recommended profile [TBD]

Multiplex Profiles (In the following profiles, audio channels are represented as A1, A2, A3, etc, and video channels are represented as V1, V2, V3, etc.
multiplexProfile 0 (0x0000)
1={LCN A1,RC UCF}
multiplexProfile 1 (0x0001)
1={LCN V1,RC UCF}
multiplexProfile 256 (0x0100)
1={LCN A1,RC UCF},
2={LCN V1,RC UCF}
multiplexProfile 512 (0x0200)
1={LCN A1,RC UCF},
2={LCN V1,RC UCF},
3={LCN A1,RC 25}, {LCN V1,RC UCF}
4={LCN A1,RC 22}, {LCN V1,RC UCF}
5={LCN A1,RC 5}, {LCN V1,RC UCF}
6={LCN A1,RC 25}, {LCN0,RC UCF}
7={LCN A1,RC 22}, {LCN0,RC UCF}
8={LCN A1,RC 5}, {LCN0,RC UCF}
multiplexProfile 513 (0x0201)
1={LCN A1,RC UCF},
2={LCN V1,RC UCF},
3={LCN A1,RC 26}, {LCN V1,RC UCF}
4={LCN A1,RC 23}, {LCN V1,RC UCF}
5={LCN A1,RC 6}, {LCN V1,RC UCF}
6={LCN A1,RC 26}, {LCN0,RC UCF}
7={LCN A1,RC 23}, {LCN0,RC UCF}
8={LCN A1,RC 6}, {LCN0,RC UCF}
multiplexProfile 528 (0x0210)
1={LCN A1,RC UCF}, 2={LCN V1,RC UCF},
3={LCN A1,RC 32}, {LCN V1,RC UCF}
4={LCN A1,RC 27}, {LCN V1,RC UCF}
5={LCN A1,RC 22}, {LCN V1,RC UCF}
6={LCN A1,RC 20}, {LCN V1,RC UCF}
7={LCN A1,RC 19}, {LCN V1,RC UCF}
8={LCN A1,RC 17}, {LCN V1,RC UCF}
9={LCN A1,RC 15}, {LCN V1,RC UCF}
10={LCN A1,RC 14}, {LCN V1,RC UCF}
11={LCN A1,RC 7}, {LCN V1,RC UCF}
12={LCN A1,RC 2}, {LCN V1,RC UCF}
13={LCN A1,RC 32}, {LCN0,RC UCF}
14={LCN A1,RC 7}, {LCN0,RC UCF}
15={LCN A1,RC 2}, {LCN0,RC UCF}
multiplexProfile 529 (0x0211)
1={LCN A1,RC UCF},
2={LCN V1,RC UCF},
3={LCN A1,RC 33}, {LCN V1,RC UCF}
4={LCN A1,RC 28}, {LCN V1,RC UCF}
5={LCN A1,RC 23}, {LCN V1,RC UCF}
6={LCN A1,RC 21}, {LCN V1,RC UCF}
7={LCN A1,RC 20}, {LCN V1,RC UCF}
8={LCN A1,RC 18}, {LCN V1,RC UCF}
9={LCN A1,RC 16}, {LCN V1,RC UCF}
10={LCN A1,RC 15}, {LCN V1,RC UCF}
11={LCN A1,RC 8}, {LCN V1,RC UCF}
12={LCN A1,RC 3}, {LCN V1,RC UCF}
13={LCN A1,RC 33}, {LCN0,RC UCF}
14={LCN A1,RC 8}, {LCN0,RC UCF}
15={LCN A1,RC 3}, {LCN0,RC UCF}

In some embodiments, logical channels are pre-assigned. For example, for one or more audio channels, the logical channel numbers are 1 (A1), 17 (A2), 33 (A3), and the like. For one or more video channels, the logical channel numbers are 2 (V1), 18 (V2), 34 (V3), and the like. It should be noted that AMR and MPEG4 are as defined in 3GPP and are used here merely for reference. One of ordinary skill in the art would recognize many variations, modifications, and alternatives.

Encapsulation in Q.931 Messages

Another aspect of the Q.931 signaling used in 3GPP is that some Information Elements may be preferred over others. For example User-User Information Elements in Set up/Connect messages may be blocked by Mobile Switching Centers (e.g. for fraud prevention reasons). Hence using other Information Elements in the Set up/Connect Q.931 messages such as the Subaddress IE (see 3GPP TS 24.008) could be more transparent to the network infrastructure.

This proposal leaves the choice of the appropriate information element to be done with the vendors and equipment providers. The Subaddress field may be more appropriate than the User-User Information Field. If this is the case, a maximum size of space available to a session profile information may be limited to 20 octets.

To efficiently utilize the limited space available in Q.931 related signaling for terminal/user defined information (e.g. User-User Information Element, Subaddress Information Element), it is preferable to use predefined session profiles rather than incorporating encoding of messages that explicitly define the session profile.

Regardless of whether explicit or implicit session profiles are used, the calling party transmits its preferred session profiles in its Set up message. The called party responds with a selected or accepted session profile in one of its response (Alerting, Call proceeding, Connect) messages. If a calling terminal receives a session profile acknowledge in a response message it can proceed with using the session profile as though the TerminalCapabilitySet, MasterSlaveDetermination, MultiplexEntrySend, and OpenLogicalChannel state machines have completed and established the specified profile.

After successfully setting up a session using a fast session set up mechanism provided according to embodiments of the present invention, subsequent alterations to the session configuration can be negotiated using conventional H.245 procedures. A reason for performing such alterations is to overcome any limitations inherent in the use of profiles that do not afford full expression of capabilities available using the terminals or session characteristics that are desired.

As an example, the subsequent alterations could be to add or remove additional channels, or to make modifications or replacements to the channels created through the fast session set up mechanism. Additional examples of an alteration would be an adjustment to bit rate or codec capabilities expressed through a TerminalCapabilitySet. Furthermore, modification to decoder information, such as sending an OpenLogicalChannel with decoder information, specifically decoderConfigurationInformation, to open a new channel, or to add a more optimal multiplexer table entry. An example of a session characteristic requiring alteration might be the case where a device requires symmetric codecs, but the rules used or information exchanged do not allow for this expression. In this case, a resolution could be to ignore the incorrectly asymmetric codec's data and re-open the channel based on the required symmetrical requirements.

Another technique useful for symmetric codecs and other session characteristic control is to delay message transmission, request, response or media until after certain characteristics of the receiving terminal are known. An example is that until the remote terminal characteristics are known (e.g., codec transmission selection, capabilities, and the like) a device may withhold some of its own message transmissions, request, response or media. Accordingly, the session configuration is improved by using this technique.

In general, techniques provided according to embodiments of the present invention provide session modifications that complement logical channel numbers and multiplexer table entries that are already used by the session set up process. The relationship between the logical channel number or multiplexer table entry, TerminalCapability entry, or some other aspect, and the corresponding entry in the altering message could also be used to decide if an action is to be considered as an alteration/modification or an addition. For instance, an Open Logical Channel for a channel already considered open through the use of fast session set up techniques may be considered an alteration of the established session. An Open Logical Channel on a new channel may be considered a request to open a new channel. One of ordinary skill in the art would recognize many variations, modifications, and alternatives.

Acceptance of an AnswerFast3 request by the called terminal results in a predetermined status of master slave determination by comparing the terminal type value in the received AnswerFast3 request with the value for the local terminal. The highest value will be selected as the master. In the event of equal terminal type values, the calling terminal will be selected as the master. Other variants are available, such as the transmission of an additional random number, in a similar fashion to Master Slave determination, may be used to reduce the likelihood of this resolution being decided on the caller/callee status. It is also possible that in some cases, an inability to resolve this status in a symmetrical way would be a sufficient condition to revert to another set up technique.

FIG. 20 is a simplified diagram illustrating the use of AnswerFast3 in Q.931 SETUP between two H.324 terminals according to an embodiment of the present invention. In general, the media may be a unidirectional or bidirectional channel.

As illustrated in FIG. 20, a calling terminal requests AnswerFast3 by including a request PDU in the Q.931 SETUP message (e.g., the Subaddress field Information Element). In an embodiment, the message is populated with a PER encoded structure with the following ASN definition:

```
AnswerFast3Request ::= SEQUENCE
{
    version         INTEGER (1 ... 255),
    terminalType    INTEGER (0 ... 255), -- For
MasterSlaveDetermination
    initialMobileLevel   INTEGER (0 ... 7), -- [4,7] are
reserved
    h223Extension   CHOICE
    {
        h223AnnexADoubleFlag BOOLEAN,
        h223AnnexBOptionalHeader BOOLEAN,
        ...
    }
    audioProfiles   SEQUENCE (1 ... 65535) OF INTEGER
(0 ... 65535),
    videoProfiles   SEQUENCE (1 ... 65535) OF INTEGER
(0 ... 65535),
    multiplexProfiles    SEQUENCE (1 ... 65535) OF
INTEGER (0 ... 65535),
    mediaWaitForConnect BOOLEAN,
    ...
}
```

As will be evident to one of skill in the art, in embodiments in accordance with 3GPP TS 24.008, the overall length of the AnswerFast3Request PDU cannot exceed the Q.931 prescribed Information Element length.

A called terminal responds to an AnswerFast3Request by including a response PDU in one of the allowed Q.931 response messages to establish a session on the underlying network. For example in 3GPP, the response message could be the Alerting, Call Proceeding, or Connect message depending on the type of called terminal and whether gateways are used in the core network. The called terminal can easily check for the presence of the AnswerFast3 Response message in each response message it receives. Embedding the AnswerFast3 Response message in an early message such as the Alerting or Call Proceeding could allow the calling terminal to use the time until a Connect message is received for house-keeping purposes.

In an embodiment, the AnswerFast3 Response message is an ASN.1 PER encoded structure with the following definition:

```
AnswerFast3Response ::= SEQUENCE
{
    version INTEGER (1 ... 255),
    terminalType INTEGER (0 ... 255), --
MasterSlaveDetermination result
            -- based on "terminalType"
comparison.
            -- If terminalType is the same then
caller
            -- is always the master
    audioProfile INTEGER (0 ... 65535),
    videoProfile INTEGER (0 ... 65535),
    multiplexProfile INTEGER (0 ... 65535),
    ...
}
```

If a calling terminal does not receive a session profile acknowledge in the CONNECT message, it may assume that the called terminal does not support AnswerFast3, or has not accepted any of the specified profiles. In this case, the calling terminal will proceed with the connection as if AnswerFast3 is not used. Thus, an AnswerFast3 fallback mode is provided by embodiments of the present invention. The calling terminal can also attempt to use AnswerFast2 as discussed more fully above. The calling terminal can also attempt to use AnswerFast4 as discussed more fully below.

AnswerFast4 Example Embodiment

Figure 21:
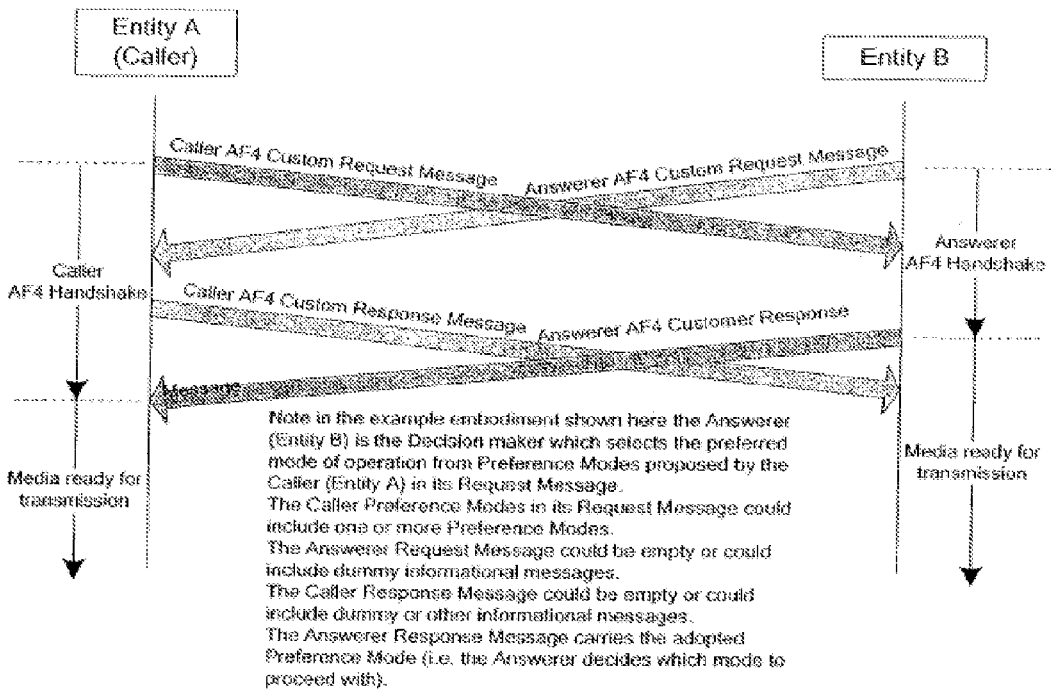
FIG. 21 illustrates an embodiment of the AnswerFast4 speed-up technique according to the present invention.

The embodiment is illustrated in FIG. 21 where the Equipment Preferred modes (Request and Response messages shown in FIG. 21) are transmitted on the bearer channel. The Equipment Preferred modes can be similar to that described in the AnswerFast3 embodiment section and can be an explicit description of preferred modes or a coded (index for look-up in a table of common modes).

Note in the example embodiment shown in FIG. 19 the Answerer (Entity B) could be the Decision maker which selects the preferred mode of operation from Preference Modes proposed by the Caller (Entity A) in its Request Message. The Caller Preference Modes in its Request Message could include one or more Preference Modes. The Answerer Request Message could be empty or could include dummy informational messages. The Caller Request Message could be empty or could include dummy informational messages. The Answerer Response Message carries the adopted Preference Mode (i.e. the Answerer decides which mode to proceed with).

Note the roles of the decision making can be reversed. That is, the Caller could make the decision of preference mode to be adopted from the Preferences transmitted by the Answerer in its Request Message.

Another way to select a Decision Maker is to have both terminals transmit a random number and have the terminal with highest (or lowest) number be the decision maker. In case of a tie, the scheme would assume the Caller (or Answerer) to be the Decision maker.

Many possible schemes for appointing a Decision Maker are possible. The important aspect is the "rule" for appointing a Decision maker has to be adopted and used by both Terminals. There is no real advantage in using one or the other. The one illustrated in the embodiment is the simplest. With reference to FIG. 21, the Caller AnswerFast4 Request message can be constructed according to the procedure below:

AnswerFast4 Requests and Responses Construction Procedure

Step A: Let S1=the Equipment Preferences message (explicit or coded such as an index in a table). The Equipment Preferences include information as described in the AnswerFast3 technique and illustrated in FIG. 17. The message can be expressed as an encoded ASN.1 string or using another syntax.

Step B: Let S2=S1 encoded for error robustness. If no error coding is used then S2 is equal to S1.

Step C: Let S3=S2 framed with framing flag sequence for facilitating detection and synchronization. Note frame flag emulation in the S2 needs to be detected and protected. Protection can utilize a repetition mechanism. For example, if the framing flag is <f1><f2>, and an <f1><f2> occurs in S2, then the <f1><f2> is replaced by <f1><f2><f1><f2> by the transmitted. The receiver will replace any received <f1><f2><f1><f2> by <f1><f2>. Note that if error encoding is used then this could be signaled by using a different set of framing flags in this procedure.

Step D: S4=S3 framed padded with framing flag sequence in order to extend the length of the string (number of octets) to a multiple of 160 octets. This optional step is practical for 3G-324M implementation as the transmission time slots typically correspond to 160 octets. If padding is not important then S4 is same as S3.

The caller and answerer terminals transmit their Request message constructed as described above one or more times (typically a minimum of 2) back to back (separated only by padding or synchronization and framing flags) in order to avoid cases where the first few octets of S4 could have been lost because of bearer setup timing. After the caller terminal transmits its preferred modes it expects a response or a conventional H.324-like initial bearer transmission of this method of session speed-up is not supported. What the answerer first transmits on the bearer channel can be ignored by the caller and only used by the caller to notice that the called (answerer) terminal supports this method of session speed-up. The called terminal transmits its response which incorporates the accepted mode of operation as described in the AnswerFast3 operation with the only difference being that the messages would be constructed according the construction procedure above with the message being the response message. Once the caller terminal receives the response it can start transmitting its media. The called terminal will be in position to accept media when it has transmitted its response.

If the Preference Messages contain only a small/limited amount of information/preferences, such as profiles, transmit and receive indications, preferences for algorithms/techniques and mobile level detect then they will have small size and may be repeated in a redundant fashion very quickly at call start up. These Preference Messages could then also be known as bullets, session setup bullets, or signaling bullets due to their size and "rapid-fire" repetition. Note that the caller will be in a position to accept media according to its proposal when it transmits its request. Also note if the terminals do not recognize the messages or cannot detect them (e.g. because of corruption) then they can proceed according to AnswerFast2 speed-up.

A Further AnswerFast4 Example Embodiment

AnswerFast4 is a method for speeding up the call set up by communicating the preferred session profiles, including those described in AnswerFast3 above, on the bearer channel instead of the signaling channel. The session profiles or preferences are messages similar to those described above, and can be further encoded for noise immunity purposes using error control techniques to improve error resiliency. The proposed session profile information is transmitted on the bearer channel as soon as it is established, and is repeated at some rate until AnswerFast4 fallback phase begins. We call the preferences message transmitted by the calling terminal (entity that originated the call) the Caller AnswerFast4 Request and the message transmitted by the called party terminal the Answerer AnswerFast4 Request. The AnswerFast4 messages are selected in a way that non AnswerFast4 supporting terminals will ignore the messages as unknown noise, corruption, or unwanted data. The called party message also contains preferences. Once the called party terminal detects the Caller AnswerFast4 Request, it analyses the request and may transmit an Answerer AnswerFast4 Response.

It should be noted that the term AnswerFast4 Response message as used in this specification is an optional message, and such a message is not necessary to the operation of AnswerFast4, but is provided for flexibility, for example, for H.324 terminals that need acknowledgement for instance of the selected mode of operation. An example may be a gateway with H.324 termination. Gateways typically need to allocate resources for transcoding, and changing the transcoding resources may be costly in complexity and processing time. In this case, the AnswerFast4 Response message may alleviate the complexity, although at the cost of slightly increased session set up time compared to the case where an AnswerFast4 Response is not used, or not necessary. The response may also take the form of a simple bit filed change to the otherwise being redundantly transmitted preferences (e.g. An Ack bit). Another example of the tradeoff of flexibility versus efficiency of set up time, is the simplification of the session profiles or preferences, in that one can elect for an approach where flexibility is not paramount but set up time is, and one can opt in this case to the simplest mechanism to signal preferences, which would include the use of predetermined profiles, and their combination as messages with media and mobile level sequences in order to achieve fast session set up, fastest fallback, but not necessarily the most flexible in terms of ability to transmit custom profiles or data. Other aspects such as symmetry of session aspects, such as symmetric codecs, are a further example of flexibility that might be desired in some protocols or implementations.

The AnswerFast4 concept described in this specification covers the principle of transmitting a "signal" early on the bearer, and independently of the H.245 messaging, and how the "signal" is exploited by the peer terminal as an indication of supporting similar acceleration technique, and provide the means to exchange media with minimal signaling. The description in the present specification covers embodiments that include the optional AnswerFast4 Response for completeness.

Figure 22:
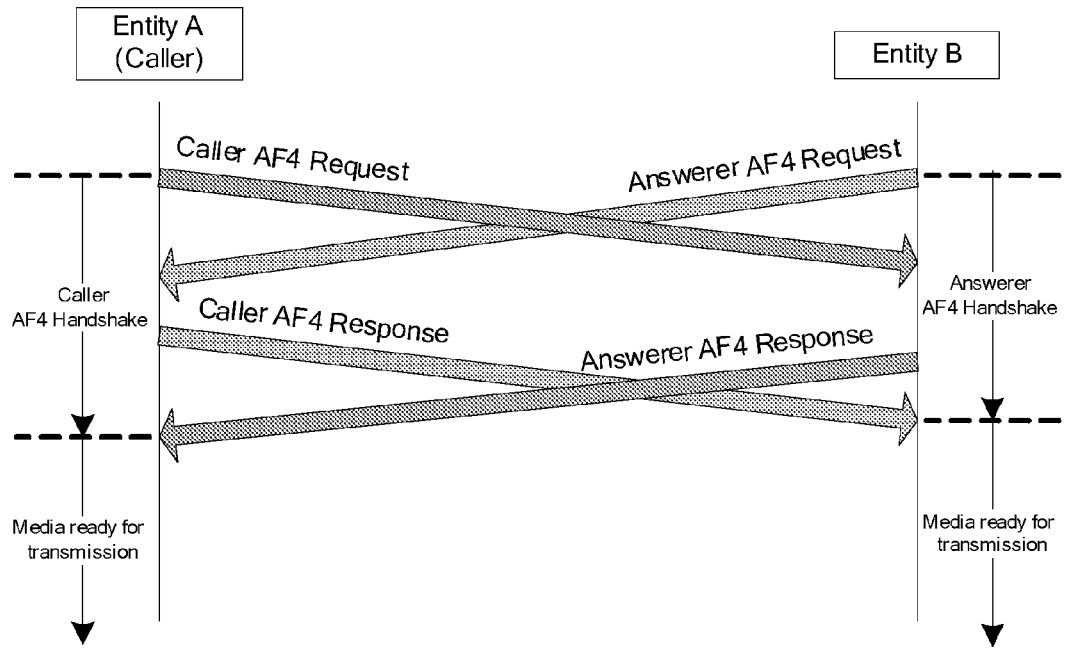
FIG. 22 is a simplified diagram illustrating the use of AnswerFast4 according to an embodiment of the present invention.

FIG. 22 is a simplified diagram illustrating AnswerFast4 according to an embodiment of the present invention. For AnswerFast 4, the session profiles are similar to that described in the AnswerFast3 section. Alternatively, the session profiles can be explicitly expressed (instead of being predefined). The AnswerFast4 Request message can be constructed according to the procedure described below.

Figure 23:
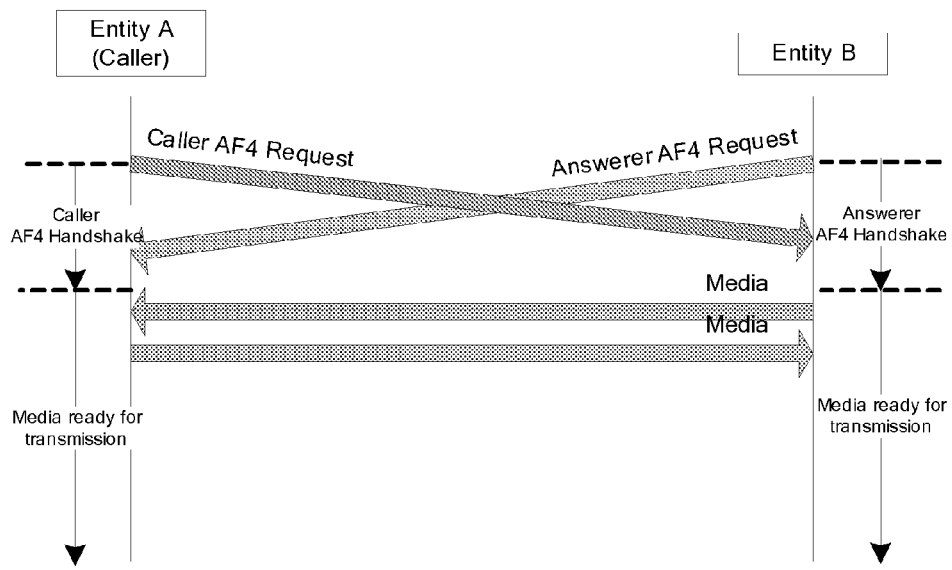
FIG. 23 is a simplified diagram illustrating the use of AnswerFast4 according to another embodiment of the present invention.

FIG. 23 is a simplified diagram illustrating AnswerFast4 according to another embodiment of the present invention. In this case, inference or a preference rule set is used at each terminal and the optional response message is not required to be sent before media transmission may begin.

AnswerFast4 Frames & Synchronization Flags

Figure 24:
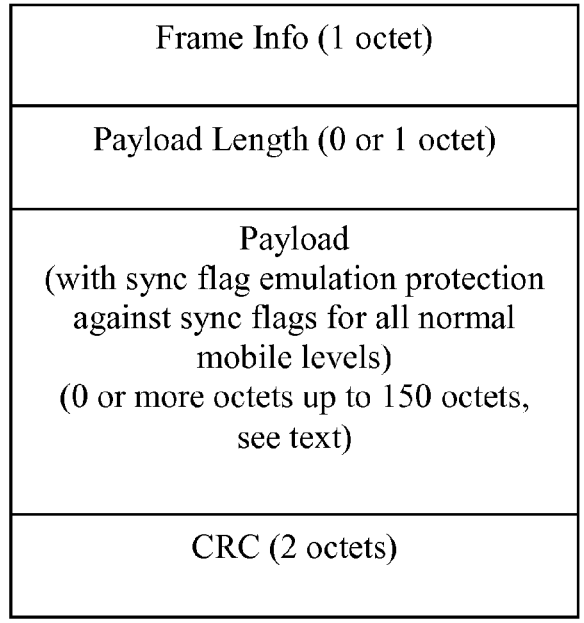
FIG. 24 is a simplified illustration of the structure of an AnswerFast4 frame according to an embodiment of the present invention.

FIG. 24 is a simplified illustration of the structure of an AnswerFast4 frame according to an embodiment of the present invention. As illustrated in FIG. 24, the AnswerFast4 request and response frames are octet aligned. Accordingly, AnswerFast4 message transmissions are octet aligned, allowing for compatibility with conventional transmissions of other mobile levels.

According to an embodiment, the Frame Info field of the AnswerFast4 frame has the values shown in Table 3:

TABLE 3

| Frame Info | Description |
| --- | --- |
| 0x00 | Request Frame |
| 0x01 | Response Frame |
| 0x02 . . . 0x7F | Reserved |
| MSB of Frame Info | 1 -> Payload length present & Payload length >=1. 0 -> Payload length is not present. No payload |

The payload length field indicates the payload size before applying emulation insertion octets. The messages can be optimized for size by use of a payload present indicator, that if not present would leave the message at a minimum size. If payload were present, a payload present indicator, a payload length and a payload would all be included in the message.

In general, the payload can be of any length. In some applications, the frame information is configured to limit the payload to 150 octets, as in many networks, frames are transmitted and processed in 160 octets time-slots. Depending on the network configuration, the payload length will be varied as appropriate to the particular applications.

The messages can also be used for differing purposes depending on certain values in a header field. Different message types, such as Request, Response or Command and Indication, or media could be indicated. Also, sequence numbers or segment indicators could also be used for error resiliency and protocol use.

Referring once again to FIG. 24, the CRC field is 16 bits in length and is determined by applying a Cyclic Redundancy Check (CRC) to the entire frame excluding the AnswerFast4 Sync Flags. In an embodiment, the CRC is as described in accordance with 8.1.1.6.1/V.42. On detecting CRC error, the frame will be discarded.

Error detection or error correction can be added to AnswerFast4 messages if desired. Error correction could be used with a Forward Error Correction code similar to those already used in H.324 for higher multiplexer levels and a modification to the message allowing transmission of the required information. Error detection could be implemented using a cyclic redundancy check. The CRC value could be transmitted in the message in a specified field.

Multiplexer synchronization flag emulation protection may be performed on AnswerFast frames to ensure the entire message appears as noise and/or unwanted data on the bearer. This ensures that any transmissions are not misinterpreted by legacy devices as conventional transmissions such as level detect. It also affords the ability to invisibly transmit AnswerFast4 messages during a session through another legacy device, such as a gateway, that may be capable of intercepting legacy transmissions.

Before sending the frame to the bearer, an emulation insertion procedure is performed. The fields with Payload Length, Payload, and CRC are applied with an emulation insertion procedure. In an embodiment, all octets with values 0xA3, 0x35, 0xE1, 0x4D, 0x19, 0xB1 and 0x7E are duplicated by 1 octet with the same value.

Once both terminals detect an AnswerFast4 Request message, they will determine the media or media modes. When an AnswerFast4 Response message is in use, and when a terminal can successfully determine the media mode according to the media preference, AnswerFast4 Response can be sent. Again, the AnswerFast4 Response message is optional, and can be used as a confirmation in some situations, for example, if a terminal such as a gateway prefers to confirm the media codec selections prior to proceeding with a session. Another situation in which a Response is used is if the AnswerFast4 Request contains some application specific information request, for example, an encryption key.

There are many ways that a media mode can be determined according to the preferences and capabilities expressed from each device. If preferences resemble H.245 preferences (e.g. expressed by TCS, OLCs, and the like) codecs may be selected in the same way as normal H.245 message exchanges except that transactions are conducted implicitly till the final outcome. This technique forms an ICM and it may be deduced according to capability preferences and media mode conflict resolution as specified in B.2.2.2 and C.4.1.3 in H.245.

Many other restrictions and rules sets for determining media mode are also possible, and some may be made over fewer variable characteristics. If profiles are used, then a simple matching of capabilities in preferred order could be conducted. For example if audio profiles 0x0000, 0x0100, 0x1000 are supported by a device, and it receives indication that a peer device supports only 0x01000, then 0x0100 would be selected. For the case where more than one profile capabilities are common to the devices, a preference selection will be made. An example of a preference rule would be to assign preference to the order in which the profiles are expressed. This preference order could be forward or reverse, and could be modified by other inputs. Another rule could be to select a preference based on index, either highest or lowest. For example if audio profiles 0x0000, 0x0100, 0x1000 are supported by a device, and it receives indication that a peer device supports 0x0000 and 0x01000, then 0x0100 could be selected by a rule using a highest index rule. One of ordinary skill in the art would recognize many variations, modifications, and alternatives.

Once a terminal detects an AnswerFast4 Request message, it can determine configurations (media/data/multiplexer modes) for both itself and the remote device according to the preferences received and the preferences it will transmit or has transmitted. The determination of configuration can be made from the input/presence of the AnswerFast4 message and a set of predefined rules. These rules may be predefined or predetermined based on some input, or may be simple rules based on explicit messages. Rules may, or may not, re-use rules that already exist in a device presently, such as H.245 most preferred mode.

The AnswerFast4 Sync Flag is defined as illustrated in Table 4.

TABLE 4

| | | |
|---|---|---|
| 0xA3 | 1 0 1 0 | 0 0 1 1 |
| 0x35 | 0 0 1 1 | 0 1 0 1 |

An AnswerFast4 synchronization flag may be selected to ensure that it is not interpreted as a conventional message, but instead appears as noise/ignorable data to a conventional terminal. In an embodiment, one AnswerFast4 Synchronization Flag is inserted immediately before and after each AnswerFast4 Frame. Generally, only one AnswerFast4 Synchronization Flag will exist in between two consecutive AnswerFast4 Frames.

Embodiments of the present invention provide a procedure for constructing AnswerFast4 Requests and Responses. Once the bearer is established, if a terminal supports AnswerFast4, it will preferably immediately send an AnswerFast4 Request frame. In an embodiment, the frame may be repeated until one of the following situations occurs:

An AnswerFast4 Request frame is detected;
A valid mobile level stuffing flag is detected, as described in C.6/H.324; or
A time out occurs, and no valid AnswerFast4 Request has been detected.

When valid mobile level stuffing flags are detected, normal H.324 session procedure will be used according to Annex C/H.324. When an AnswerFast4 Request is detected, the payload is processed according to the AnswerFast4 Payload Handling procedure described in more detail below.

If the payload is interpreted successfully, the terminal accepts it by sending an AnswerFast4 Response frame if this option is used. Note that the AnswerFast4 Response itself does not require payload data. The frame is repeated, except the payload field which may contain media data if media data tunneling is desired (alternatively media could have been transmitted based on a predetermined modes if flexibility is not paramount), until one of the following situations occurs:

An AnswerFast4 Response (if in use) is detected; or

A valid mobile level stuffing flag is detected, as described in C.6/H.324.

During transmission of the AnswerFast4 Response, media may be transmitted in the payload field of the AnswerFast4 Response frame if responses and media tunneling are in use. As an example, the payload content may contain a MUX-PDU, which is in accordance with the specification of H.223, using the finally agreed mobile level. In general, the payload length will not be more than 150 octets. According to embodiments of the present invention, all terminals supporting AnswerFast4 will support and handle MUX-PDUs if included in the AnswerFast4 messages.

An AnswerFast message, for example, AnswerFast4 messages in particular, may contain media as their payload. This media may take the form of a MUX-PDU at a given multiplexer level, but it may be a specific other coding, such as the native codec bit stream form in an AnswerFast message, to take advantage of other attributes that coding may possess. If media is sent in an AnswerFast message, then it is not necessary to redundantly transmit the message, and instead a train of messages containing media can be sent that represent the audio/visual/data of the session. Each of these different media types are sent tunneled in the messages and may be distinguished in a variety of ways from each other so that each media channel is able to be interpreted at each side. They may have special indications in the payload header, have differences in the media itself, such as using a differing mux code, or may have a known pattern (for example audio would be non-segmentable and could be interleaved between video segments without additional signaling). The media encapsulated/tunneled in an AnswerFast message may also be recovered and passed to its associated decoder even in the case where an error check has cast doubt onto the veracity of the received transmission, thus if a CRC failure occurs on a tunneled video packet, the packet may still be attempted to be used in the decoder. The continued use of a profile may be determined by receiving an indication/announcement from the peer that one or more of the channels are acceptable, which may or may not have been transmitted from the peer following reception of indications at the peer. A channel may also be bidirectional after it is established, or an implicit (or signaled/predefined) relationship set up between two distinct channels. A bidirectional channel, or a pair of unidirectional channels, might be used for accelerated and flexible negotiations without the need of establishing or using the H.245 control channel, these bidirectional messages could then be acknowledged. Alternatively, the media may simply be transmitted in appropriate MUX-PDUs on the bearer (without tunneling in AnswerFast4 messages).

Figure 25:
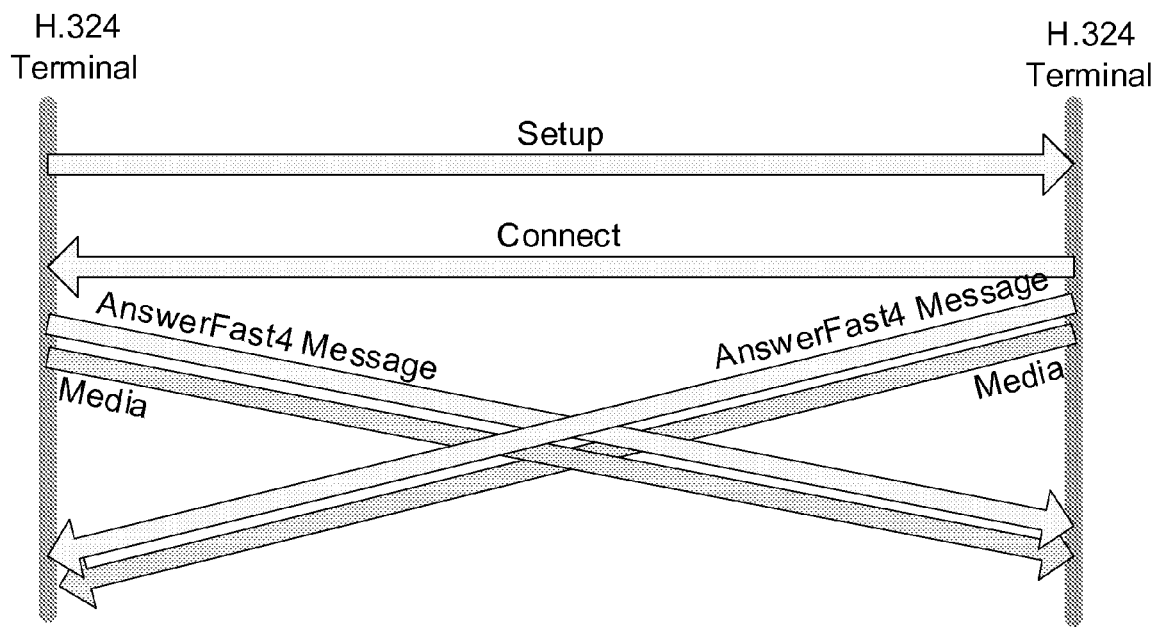
FIG. 25 is a simplified diagram illustrating a method of AnswerFast4 according to an embodiment of the present invention with media transmitted in AnswerFast4 frames.

FIG. 25 is a simplified diagram illustrating a method of AnswerFast4 according to an embodiment of the present invention with media transmitted in AnswerFast4 frames. After sending an AnswerFast4 Request and optionally detecting an AnswerFast4 Response, the terminal will begin a normal session using the agreed mobile level. Audio and video exchange will also start immediately if they have not been started during the AnswerFast4 Response stage if in use. Utilizing embodiments of the present invention, audio and video exchange are enabled to continue seamlessly if they have been started during the AnswerFast4 Response stage whether used or not.

If acceptable media is sent as part of an AnswerFast4 message, then a seamless continuance of that media is preferable through any session configuration modifications. As configurations are accepted, or even in some cases where some aspects of a session require fallback to a different technology (e.g., AnswerFast2 or even conventional operation) seamless continuance of the media is needed to provide the best user experience. An example of seamless media join would be where a particular framing is chosen in the AnswerFast media messages. Then, upon establishment of the session, the configuration is known to be of a different particular type, e.g. at a particular multiplexer level. The receiver is therefore capable of extracting the media from both types of streams/framings and rendering them to the user (or transmitting them to a remote endpoint in the case of a gateway).

If after receiving an AnswerFast4 Request, the terminal decides not to proceed with AnswerFast4 procedure, the terminal may immediately continue normal H.324 session procedure according to Annex C/H.324 as described in more detail below. Audio and video coding will be restarted if they have been started during sending AnswerFast4 Response frames.

If some, or all, aspects of an AnswerFast4 session are not successful, then a fallback to AnswerFast2 technology is recommended. If a configuration mismatch suggests a correction, then AnswerFast2 techniques can be used to determine the correct mode and, if necessary, restart the codecs and logical channels in the fashion expected by the remote device. If AnswerFast2 (optionally with AnswerFast1 and/or some SRP extensions) does not succeed, conventional behavior should be adopted. One of ordinary skill in the art would recognize many variations, modifications, and alternatives.

If after sending and receiving AnswerFast4 Requests, the calling terminal does not detect an AnswerFast4 Response if in use, but valid mobile level stuffing flags, the terminal may stop sending AnswerFast4 Response frames immediately and continue normal H.324 session procedure according to Annex C/H.324 as described in more detail below.

A fallback to conventional mobile level operation may be triggered by detection of valid normal mobile level flags. In an embodiment, a certain threshold number must be detected to provide a level associated with detection according to H.324. After this implementation dependent threshold number is detected, the terminal should preferably stop sending the AnswerFast4 messages and drop back to AnswerFast2, or conventional behavior, as it should be apparent that the terminal is communicating with a non-AnswerFast4 capable terminal.

In an embodiment, the AnswerFast4 Request payloads are ASN.1 PER encoded structure as shown below:

```
AnswerFast4Request ::= CHOICE
{
    predefinedProfile          AnswerFast3Request,
    explicitProfile
AnswerFast4ExplicitRequest,
    ...
}
AnswerFast4ExplicitRequest    ::= SEQUENCE
{
    terminalType               INTEGER (0 ... 255), -- For
                                    --
MasterSlaveDetermination
    initialMobileLevel         INTEGER (0 ... 7), -- [4,7]
are reserved
    h223Extension    CHOICE
    {
        h223AnnexADoubleFlag      BOOLEAN,
        h223AnnexBOptionalHeader BOOLEAN,
        ...
    }
```

```
        terminalCapabilitySet       TerminalCapabilitySet,
        openLogicalChannels         SEQUENCE (1 ... 65535) OF
        OpenLogicalChannel,
        multiplexEntrySend          MultiplexEntrySend,
        ...
}
```

This structure allows a terminal to use either predefined session profiles, such as those described for AnswerFast3, or to use explicit session profile definitions. Note that if flexibility is not paramount, then predetermined modes can be used and the AnswerFast4 messages can be reduced to a minimal signal that is exploited by terminals to transmit their media as early as possible, in approximately one half a round trip time.

The AnswerFast4 payload handling procedure is that the calling party is always the Master when the terminal types are identical between the two terminals and explicit Master Slave Determination knowledge is required. Alternatively the terminals may ignore the need for knowledge of master-slave relationship until later on in the session (e.g., in AnswerFast2 if used or in conventional H.245 messaging). Thus, the calling party will be in a position to accept media according to the form of the media mode signaling approach and the desired flexibility. A terminal supporting an AnswerFast technology may be required to be ready to accept (receive and decode) media immediately, depending on the form of the signaling of the session preferences whether predetermined, predefined, or explicit.

For AnswerFast3, as media will be transmitted in a known configuration immediately upon establishment of the bearer, the receiver will preferably be ready to accept and decode the media at the earliest possible time, which is equal to 0.5 round trips. In other embodiments, session establishment is performed in approximately 0.5 round trips. For AnswerFast4, with media transmitted in the payload, the media may arrive simultaneously, or in parallel, with the message indicating the preferences to be used. In this case, the receiving terminal will use the information indicating the configuration and decode/use the media.

According to embodiments of the present invention, it is possible that the information indicating the configuration may arrive or be processed too slowly to make the best use of the arriving media, or initial media is clipped by the establishment of the end to end bearer. One of several approaches to the situation involving configuration messages is to buffer all media that has arrived until the message arrives. The buffered information is used, thereby losing a minimal amount of session information. Another approach applicable to initial media clipping and lack of decoder information is to transmit non-temporally redundant media (e.g., key frames/intra frames) at either increased frequency, possibly exclusively, or at a known time. A further approach that will aid the decoding device is to include an indication, in the coding, that a media message contains non-temporally redundant media. On detection of this marker, a stream can be decoded from this point alone, allowing for processing savings and a reduction in complexity.

One particular time that would be particularly useful for the encoding/transmitting side to transmit non-temporally redundant media would be upon receipt of an acknowledgment (implicit or explicit) from the receiver at the transmitter. This follows from the fact that upon receipt of an acknowledgment, the transmitter knows the receiver is ready to decode. Other possibilities would also include the case of not receiving a negative acknowledgement in a certain time period. A particular example of this case would be the receipt of the TCS Ack in the AnswerFast2 case, or on the receipt of either an AnswerFast4 response message or AnswerFast4 session media in the AnswerFast4 case. These media arrival behaviors may be predetermined (if flexibility is not paramount), predefined, or could be explicitly signaled depending on a devices support. It should be noted that if the terminals do not recognize the messages or cannot detect them (e.g., because of corruption) then they may proceed according to AnswerFast2 speed-up techniques previously described throughout the present specification.

Embodiments of the present invention also provide for techniques to fallback from AnswerFast4. For example, if a calling terminal does not receive an AnswerFast4 message, but a normal H.245 TerminalCapabilitySet message (with or without an AnswerFast2 style message), the terminal will assume that the called terminal does not support AnswerFast4, or has not accepted any of the specified profiles. In this case, the calling terminal will continue to use the conventional TerminalCapabilitySet, MasterSlaveDetermination, MultiplexEntrySend, and OpenLogicalChannel procedures to create the session. It can also attempt to use AnswerFast2 techniques utilizing H.245 commands as described more fully throughout the present specification.

The fallback to conventional operation may be triggered by detection of a normal TCS that lacks indication of AnswerFast technique support. Upon detecting this TCS, a terminal should preferably stop sending AnswerFast4 messages and drop back to AnswerFast2 or conventional behavior as it should be apparent that the terminal is communicating with a legacy device.

Embodiments of the present invention provide techniques that combine interleaving of fast session establishment signaling or messaging with conventional techniques and media. As described more fully throughout the present specification, a further embodiment of the AnswerFast4 technique involves a combination of conventional multiplexer level set up and AnswerFast4. One possible combination of techniques is with AnswerFast4 messages being transmitted onto the bearer less densely than the maximum possible (e.g., not back to back). This sparseness of transmission leaves the bearer unused by the AnswerFast technique at points in time. When not in use, the bearer is available to the device to use in a conventional fashion. Typically, immediately upon bearer establishment, mobile level detection/set up is conducted, so in a particular embodiment, the bearer time gaps that mobile level stuffing flags would be transmitted. Such methods may be combined or used with conventional techniques depending upon the embodiment. One of ordinary skill in the art would recognize many variations, alternatives, and modifications.

Since the AnswerFast device is operating partially in a conventional manner, interleaving in this manner will minimize any delay when interoperating with another conventional device. The sparseness of AnswerFast4 message retransmission is a parameter that can be tuned based on required error resilience and conventional interoperation delay desired. Adaptation of the AnswerFast4 messages is also possible based on input from the conventional operations. For example, detection of a particular mobile level through conventional means, even in an AnswerFast4 to AnswerFast4 negotiation, may be used to determine the form of media transmissions.

A Further AnswerFast4 Example Embodiment

For purposes of clarity, techniques described herein are referred to as Fast Session Setup (FSS), which is also known as AnswerFast4 and it is a bearer-based Fast Session Setup Procedure. According to embodiments of the present invention, methods and systems are provided that include the FSS procedure as an alternative procedure for establishing an audio and video communication session in H.324. The procedure transmits the preferred operation mode as the first bits transmitted on the bearer channel. Because these bits are prevented from emulating existing mobile level flags, including the base-line H.324 mode, they are ignored by existing terminals and hence maintains interoperability with existing terminals. The procedure allows significant reduction of the session setup time.

A fallback mechanism is described for the connecting terminals that do not support FSS.

Definitions:

caller: The terminal that originates the call (the calling terminal).

callee: The terminal that answers the call (the called terminal).

fallback: The procedure that is invoked when terminals abandon in the middle of the FSS procedure and proceed with session setup according to H.324 Annex C.

inferred common mode (ICM): The media mode that is determined by both terminals based on the local profile request and peer profile request (always the same for both terminals).

normal mobile level operation (NMLO): The normal operation of the H.223 multiplexer on the bearer channel. It is in Phase E of the terminal procedures with the transmission of MUX-PDUs at a given mobile level on the bearer channel. Phase D of the terminal procedures for H.245 message exchange will be started if FSS mode is not accepted.

re-proposal: The procedure to restart FSS with new request settings without a fallback to normal H.245 message exchange.

request frame: An FSS frame of the request type, specified in the Frames & Synchronization Flags section.

request message: An ASN.1 coded FSS request message contained in the FSS Request frame payload field. Alternatively other codings for the FSS request message could be used.

response frame: An FSS frame of the response type, specified in the Frames & Synchronization Flags section. Alternatively other codings for the FSS response message could be used.

response message: An ASN.1 coded FSS response message contained in the FSS Response frame payload field. Alternatively other codings for the FSS response message could be used.

session profile: A collection of specified values for all aspects of the multiplexer along with H.245 parameters for the codecs to be used and the logical channels to be opened. Profiles defining one or more aspects are also included herein, for example a session profile containing an audio profile and a multiplexer profile.

simultaneous determination: A mode for the FSS procedure in which both the connecting terminals determine the common mode for media channels (Inferred Common Mode) from their respective Fast Session Setup request messages.

Terminals implementing the FSS procedure undergo the following phases:

Phase 1: Fast Session Setup
Phase 2: Media Exchange

A terminal can interrupt the FSS phase by transmitting standard mobile level sequence flags as described in C.6\H.324. The FSS phase may be repeated if desired. In circuit-switched operation, for example 3GPP 3G-324M, the two connecting terminals should repeat the transmission of an FSS frame (Request or Response) while waiting to proceed to the next phase.

The Session Profiles can be predefined or explicitly expressed. The FSS Request and FSS Response messages are constructed according to the procedures described in the FSS Request Payloads and FSS Response Payloads sections below, respectively.

A terminal supporting FSS shall support Predefined Profiles. Support of Explicit Profiles is recommended. A tradeoff between speed and flexibility is provided by the predefined profiles included herein. As an example, standardized predefined profiles may increase session setup speed by providing a limited range of operating points. For terminals utilizing this technique, there exists a significant probability of selecting and transmitting using a predefined profile commonly shared with a peer terminal. Matching of these predefined profiles thus increases session setup speed. Explicit profiles are also included according to embodiments of the present invention and provide additional advantages including flexibility.

Predefined Profiles for FSS Procedure

Embodiments of the present invention provide a number of predefined profiles for FSS procedures. These predefined profiles include profiles for audio codecs, video codecs, multiplexer capability profiles, and multiplexer table entry profiles and may be similar to profiles and preconfigured modes disclosed throughout the present disclosure. The following particular predefined or preconfigured characteristics are provided:

| Audio Profiles |
|---|
| audioProfile 0 (0x0000)<br>// G.723.1 Audio<br>   maxAL-sduAudioFrames= 1<br>   silenceSuppression=false<br>audioProfile 1 (0x0001)<br>// G.723.1 Audio<br>   maxAL-sduAudioFrames= 1<br>   silenceSuppression=true<br>audioProfile 4096 (Ox1000)<br>// GSM-AMR Audio<br>   maxAl-sduFrames=1<br>   gsmEFRComfortNoise=false<br>   gsmIS641ComfortNoise=false<br>   gsmPdcEFRComfortNoise=false |

| Video Profiles |
|---|
| videoProfile 0 (0x0000)<br>// H.263 baseline - QCIF Video<br>   gcifMPI=2<br>   maxBitRate=240<br>   unrestrictedVector=false<br>   arithmeticCoding=false<br>   advancedPrediction=false<br>   pbFrames=false<br>   temporalSpatialTradeOffCapability=false<br>   errorCompensation=false<br>videoProfile 128 (0x0080)<br>// H.263 baseline 3G-324M<br>   gcifMPI=2<br>   maxBitRate=480<br>   unrestrictedVector=false<br>   arithmeticCoding=false<br>   advancedPrediction=false<br>   pbFrames=false |

-continued

Video Profiles

```
temporalSpatialTradeOffCapabty=false
errorCompensation=false
advancedIntraCodingMode=true
deblockingFilterMode=true
improvedPBFramesMode=false
unlimitedMotionVectors=false
fullPictureFreeze=false
partialPictureFreezeAndRelease=false
resizingPartPicFreezeAndRelease=false
fullPictureSnapshot=false
partialPictureSnapshot=false
videoSegmentTagging=false
progressiveRefinement=false
dynamicPictureResizingByFour=false
dynamicPictureResizingSixteenthPel=false
dynamicWarpingHalfeel=false
dynamicWarpingSixteenthPel=false
independentsegmentDecoding=false
sliceslnOrder-NonRect=trueslicesInOrder-Rect=false
slicesNoOrder-NonRect=false
slicesNoOrder-Rect=false
alternatelnterVLCMode=false
modifiedQuantizationMode=true
reducedResolutionUpdate=false
separateVideoBackChannel=false
videoBadMBsCap=false
dataPartitionedSlices=false
fixedPointIDCTO=false
interlacedFields=false
currentPictureHeaderRepetition=false
previousPictureHeaderRepetition=false
nextPictureHeaderRepetition=false
pictureNumber=false
spareReferencePictures=false
videoProfile 4096 (0x1000)
// MPEG4-Video
    gcifMPI=2
    maxBitRate=4 8 0
    sliceResynchronization=false
    dataPartitioning=false
    reversibleVLC=false
    shortHeader=false
```

Multiplex Capability Profiles

```
capabilityProfile 0 (0x0000)
// H.324 default
    transportWithI-frames=false
    videoWithAL1=false
    videoWithAL2=false
    videoWithAL3=true
    audioWithAL1=false
    audioWithAL2=true
    audioWithAL3=false
    dataWithAL1=false
    dataWithAL2=false
    dataWithAL3=false
    maximumAl2SDUsize=1024
    maximumAl3SDUsize=1024
    maximumDelayJitter=200
    h223MultiplexTableCapability=basic
    maxMUXPDUSizeCapability=false
    nsrpSupport=false
capabilityProfile 256 (0x0100)
// H.324/M default
    transportWithI-frames=false
    videoWithAL1=false
    videoWithAL2=false
    videoWithAL3=true
    audioWithAL1=false
    audioWithAL2=true
    audioWithAL3=false
```

-continued

Multiplex Capability Profiles

```
    dataWithAL1=false
    dataWithAL2=false
    dataWithAL3=false
    maximumAl2SDUsize=1024
    maximumAl3SDUsize=1024
    maximumDelayJitter=200
    h223MultiplexTableCapability=basic
    maxMUXPDUSizeCapability=false
    nsrpSupport=true
    modeChangeCapability=false
    h223AnnexA=true
    h223AnnexADoubleFlag=false
    h223AnnexB=true
    h223AnnexBwithHeader=false
    videoWithAL1M=false
    videoWithAL2M=false
    videoWithAL3M=true
    audioWithAL1M=false
    audioWithAL2M=true
    audioWithAL3M=false
    dataWithAL1M=false
    dataWithAL2M=false
    dataWithAL3M=false
    alpduInterleaving=false
    maximumAL1MPDUSize=1080
    maximumAL2MSDUSize=4096
    maximumAL3MSDUSize=4096
capabilityProfile 4096 (0x1000)
// 3G-324M default
    transportWithI-frames=false
    videoWithAL1=false
    videoWithAL2=true
    videoWithAL3=true
    audioWithAL1=false
    audioWithAL2=true
    audioWithAL3=false
    dataWithAL1=false
    dataWithAL2=false
    dataWithAL3=false
    maximumAl2SDUsize=1024
    maximumAl3SDUsize=1024
    maximumDelayJitter=200
    h223MultiplexTableCapability=basic
    maxMUXPDUSizeCapability=false
    nsrpSupport=true
    modeChangeCapability=false
    h223AnnexA=true
    h223AnnexADoubleFlag=false
    h223AnnexB=true
    h223AnnexBwithHeader=false
```

Multiplex Table Entries Profiles
Note Audio channels are represented as A1, A2, A3, . . . Video channels are represented as V1, V2, V3, . . .

```
multiplexProfile 0 (0x0000)
    1= (LCN A1,RC UCF}
multiplexProfile 1 (0x0001)
    1= (LCN V1,RC UCF}
multiplexProfile 16 (0x0010)
    1= (LCN A1,RC UCF},
    2= {LCN V1,RC UCF}
multiplexProfile 512 (0x0200)
    1= {LCN A1,RC UCF},
    2=(LCN V1,RC UCF},
    3={LCN A1,RC 251, {LCN V1,RC UCF}
    4={LCN A1,RC 221, (LCN V1,RC UCF}
    5={LCN A1,RC 5}, {LCN V1,RC UCF}
    6={LCN A1,RC 25}, {LCNO,RC UCF}
    7= {LCN A1,RC 22}, {LCNO,RC UCF}
    8={LCN A1,RC 5), {LCNO,RC UCF}
multiplexProfile 513 (0x0201)
```

-continued

Multiplex Table Entries Profiles
Note Audio channels are represented as A1, A2, A3, . . . Video
channels are represented as V1, V2, V3, . . .

```
    1= (LCN A1,RC UCF},
    2={LCN V1,RC UCF},
    3={LCN A1,RC 261, {LCN V1,RC UCF}
    4={LCN A1,RC 231, {LCN V1,RC UCF}
    5=(LCN A1,RC 61, {LCN V1,RC UCF}
    6={LCN A1,RC 261, {LCNO,RC UCF}
    7= {LCN A1,RC 231, {LCNO,RC UCF}
    8={LCN A1,RC 61, {LCNO,RC UCF}
multiplexProfile 528 (0x0210)
    1= (LCN A1,RC UCF},
    2= (LCN V1,RC UCF},
    3=(LCN A1,RC 321, {LCN V1,RC UCF}
    4={LCN A1,RC 201, {LCN V1,RC UCF}
    5={LCN AI,RC 191, {LCN V1,RC UCF}
    6={LCN A1,RC 17}, {LCN VI,RC UCF}
    7={LCN A1,RC 151, {LCN V1,RC UCF}
    8={LCN A1,RC 141, {LCN V1,RC UCF}
    9={LCN A1,RC 71, {LCN V1,RC UCF}
    10={LCN A1,RC 2}, {LCN V1,RC UCF}
    11={LCN A1,RC 321, {LCNO,RC UCF}
    12={LCN A1,RC 71, {LCNO,RC UCF}
    13=(LCN A1,RC 21, {LCNO,RC UCF}
multiplexProfile 529 (0x0211)
    1={LCN A1,RC UCF},
    2={LCN V1,RC UCF},
    3=(LCN A1,RC 331, {LCN V1,RC UCF}
    4={LCN A1,RC 21}, {LCN V1,RC UCF}
    5={LCN A1,RC 20}, {LCN V L,RC UCF}
    6=(LCN A1,RC 18}, {LCN V1,RC UCF}
    7={LCN A1,RC-16}, {LCN V1,RC UCF}
    8={LCN A1,RC 151, {LCN VI,RC UCF}
    9= {LCN A1,RC 8}, {LCN V1,RC UCF}
    10={LCN AI,RC 3}, {LCN VI,RC UCF}
    11= (LCN AI,RC 33}, {LCNO,RC UCF}
    12= (LCN A1,RC 8}, {LCNO,RC UCF}
    13={LCN A1,RC 3), {LCNO,RC UCF}
```

In addition to these baseline profiles, proprietary profiles providing equivalent functionality are included according to embodiments of the present invention. These proprietary profiles will provide for increased service flexibility among other benefits. One of ordinary skill in the art would recognize many variations, modifications, and alternatives.

Frames & Synchronization Flags

Figure 26:
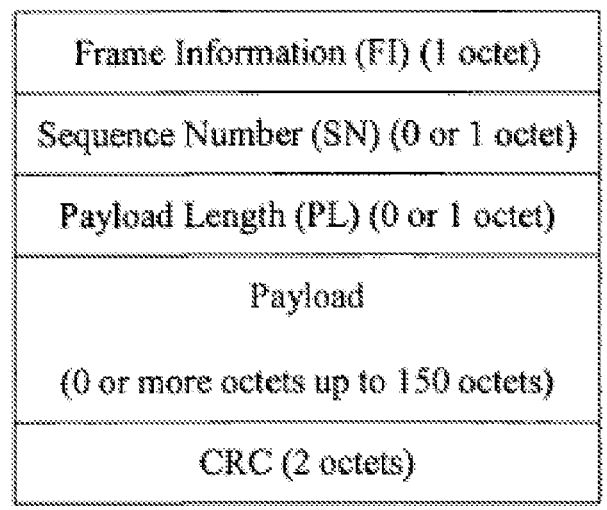
FIG. 26 illustrates the structure of the FSS frames according to an embodiment of the present invention.

The FSS Request and FSS Response frames are octet aligned and have the structure shown in FIG. 26.

Figure 27:
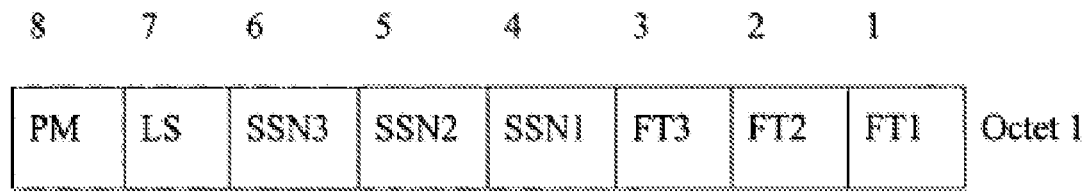
FIG. 27 illustrates the structure of the FSS Frame Information field according to an embodiment of the present invention.

The Frame Information (FI) field consists of 3-bit Frame Type (FT), followed by 3-bit Segment Sequence Number (SSN), followed by 1-bit for Last SSN (LS) flag, and followed by 1-bit Payload Marker (PM) flag. The bit allocation of the FI field is shown in FIG. 27.

The FT field has the values shown in Table 5, which provides a description of the Fast Session Setup Frame Type field.

TABLE 5

| Frame Type (FT) (3 bits) | Description |
|---|---|
| 0x0 | Request Frame Type |
| 0x1 | Response Frame Type |
| 0x2 . . . 0x7 | Reserved |

The use of the SSN and the LS fields are specified in the FSS Payload Segmentation and Reassembly section below.

Referring to FIG. 27, the PM field if set to 1 indicates the presence of the Payload Length (PL) field. If set to 0, PL is not present and PL=O.

The Sequence Number (SN) field is present when LS is set to 1. It indicates the sequence number of an FSS Request or FSS Response frame. The number shall start from 0. For FSS Request, it indicates the total number of re-proposals for a request and counter-offers for any subsequent response(s). For FSS Response, it matches the SN of the received FSS Request associated with the Response, or is an increment of the SN modulo 256 of the received FSS Response.

The Payload Length (PL) field indicates the payload size in octets before applying emulation insertion octets. The FSS frame payload or FSS-PDU shall not exceed 150 octets. The receiver shall support the overall FSS-MDU payload length of up to 1050 octets excluding any octets inserted during the Flag Emulation Avoidance procedure described in the FSS Flag Emulation Avoidance section below.

The Payload, when present, corresponds to either a FastSessionSetupRequest message, a FastSessionSetupResponse message, or a single H.223 MUX-PDU. When the payload is present, the PM field shall be set to 1. The ASN.1 definitions of the FastSessionSetupRequest and FastSessionSetupResponse messages and all other ASN.1 messages referred to in this specification are described in the ASN.1 Syntax for FSS Procedure section below, and are encoded according the Packed Encoding Rules (PER) as defined in ITU-T Rec. X.691.

The CRC (cyclic redundancy coding) field is 16 bits and is determined by applying the CRC to the entire frame excluding the FSS Synchronization Flags (see below). The CRC is as described in 8.1.1.6.1/V.42. The CRC is calculated before the FEA procedure described in the FSS Flag Emulation Avoidance section below.

On detecting a CRC error, the corresponding FSS frame shall be discarded. For some implementations, some fields in the FSS frames are not fully utilized. These fields are populated with reserved bits or hard-coded values in some embodiments, thus reducing system complexity.

Figure 28:
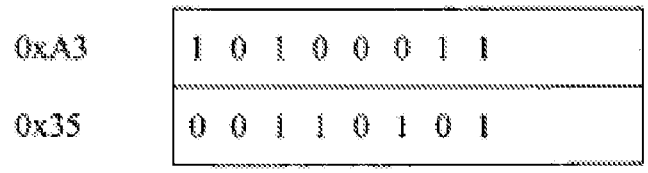
FIG. 28 illustrates the structure of the FSS Synchronization Flag according to an embodiment of the present invention.

FIG. 28 illustrates the definition of the FSS Synchronization Flag as according to an embodiment of the present invention. Other flags are utilized in other embodiments, including standard multiplexer PDU framing for non-negotiated multiplexer table entries.

One FSS Synchronization Flag shall be inserted immediately before each FSS Frame and one FSS Synchronization Flag shall be inserted immediately after each FSS Frame. Only one FSS Synchronization Flag shall exist between two consecutive FSS Frames.

FSS Request Payloads

An FSS Request payload is represented by the ASN.1 FastsessionsetupRequest message and allows a terminal to use either a predefined session profile or an explicit session profile definition. In a particular embodiment, for terminals capable of using either predefined session profiles or explicit session profiles, a selection is made between either predefined or explicit session profiles based on one or more predefined rules or one or more preferences indicating a priority of profile type. Merely by way of example, two terminals capable of using both predefined and explicit profiles may choose to use explicit profiles. The selection of a profile will depend on the particular applications. The nonStandard field is a container to allow a non-Standard based FSS Request to be specified. Examples of the additional information that may be provided in the nonStandard field include a MultiplexTableEntry, a UserInputIndication, or a GenericCapability.

The predefinedProfile field contains the detailed settings of an FSS Request using the predefined profile approach and is described in the FSS with Predefined Profiles section below. The explicitProfile field contains the detailed settings of an FSS Request using the explicit profile approach and is described in the FSS with Explicit Profiles section below.

In some embodiments of the present invention using explicitProfile no MUX-PDUs are be included as FSS Request payloads.

FSS Response Payloads

An FSS Response payload is represented by the FastSessionSetupResponse message and allows a terminal to use either a predefined session profile or an explicit session profile definition. The nonStandard field is a container to allow a non-Standard based FSS Response to be specified. The predefinedProfile field contains the detailed settings of FSS Response using the predefined profile approach and is described in the FSS with Predefined Profiles section below. The explicitProfile field contains the detailed settings of FSS Response using an explicit profile and is described in the FSS with Explicit Profiles section below.

Fast Session Setup Payload Segmentation and Reassembly (FSSPSR) Procedure

If a message data unit (FSS-MDU) size exceeds 150 octets, it shall be segmented into multiple sub-units called protocol data units (FSS-PDU). If an FSS-MDU directly maps to one FSS-PDU, without segmentation, the LS flag in the FI field of the FSS frame shall be set to 1. If an FSS-MDU maps into more than 1 segment, the LS flag shall be set to 0 except the last segment, which shall have the LS flag set to 1. The SSN shall be set to 0 for the first segment and monotonically incremented until the last segment, the maximum value of which is 6. The value 7 is reserved. All segments shall be sent at least once.

On receiving and reassembling an FSS-MDU, if one or more corresponding FSS-PDUs are received with error, the reassembling process should wait for the next repeated cycle of the FSS frame delivery before processing the reassembled FSS-MDU.

FSS Flag Emulation Avoidance

Before transmitting the FSS frames onto the bearer, a flag emulation avoidance (FEA) procedure shall be performed against synchronization flags for all mobile levels of H.324 (flags of mobile levels 0-3). The fields with Frame Information, Payload Length, Payload and CRC are included in the FEA procedure. All octets with values OxA3, 0x35, OxE1, Ox4D, 0x19, OxBI and Ox7E shall be duplicated by inserting adjacently an octet with the same value.

FSS with Predefined Profiles

According to embodiments of the present invention, methods and techniques are provided that include FSS with predefined profiles. For example, a predefined profile request payload is represented by the ASN.1 message FastSessionSetupPredefinedRequest which has the following fields:

version indicates the version number of the FSS Predefined Profile being used by the terminal transmitting the message. It shall be set to 1 for this release of the recommendation.

h245version indicates the version number of 1-1.245 being used by the terminal transmitting the message.

vendorId indicates the unique vendor identifier as adopted by ITU-T Rec. H.245 for the terminal transmitting the message.

terminalType indicates the terminal type number as specified in ITU-T Rec. H.324. It has the same value as the one used in H.245 master-slave determination signaling.entity.

initialMobileLevel indicates the starting maximum mobile level the originating terminal can support.

h223Info indicates H.223 specific settings supported. This includes h223AnnexADoubleFlag, h223AnnexBOptionalHeader and multiplexProfiles. h223AnnexADoubleFlag indicates the use of H.223 Annex A double flag mode for mobile level 1 either as an initial mobile level or the final mobile level. h223AnnexBOptionalHeader indicates the use of H.223 Annex B optional header mode for mobile level 2 or 3 either as an initial mobile level or the final mobile level. multiplexProfile indicates which predefined multiplex table profile is used by the terminal transmitting the message.

capabilityProfile indicates which predefined multiplex capability profile is used by the terminal transmitting the message audioProfiles contains a list of predefined audio profiles ordered in the preference of use. In other embodiments, the list of predefined audio profiles are unordered and are used to express capabilities rather than preference of use.

videoProfiles contains a list of predefined video profiles ordered in the preference of use. In other embodiments, the list of predefined video profiles are unordered and are used to express capabilities rather than preference of use.

dataApplicationProfiles indicates a list of predefined data application profiles ordered in the preference of use. This parameter is reserved and shall not be used. On receiving this parameter, it shall be ignored.

encryptionProfiles contains a list of predefined encryption profiles ordered in the preference of use. This parameter is reserved and shall not be used. On receiving this parameter, it shall be ignored. In other embodiments, the list of predefined encryption profiles are unordered and are used to express capabilities rather than preference of use.

additionalParameters contains a list of predefined miscellaneous profiles including non-standard profiles ordered in the preference of use. This parameter is reserved and shall not be used. On receiving this parameter, it shall be ignored.

mediaTunnel, when set to TRUE, indicates that the terminal may accept media tunneled as payload of any FSS Response. When set to FALSE, the terminal does not support media payload in any FSS Response. In an embodiment in which mediaTunnel is set to TRUE, a terminal is preferably adapted to immediately receive media. Buffering of media, for example, in a receiving terminal may be performed to accommodate either message processing time or message corruption/loss of a capability set preference, or response, if sent, and the like. Accordingly, in the event of loss of, for example, a capability set preference, or response, sent by a peer terminal, a terminal receiving media will buffer the media until a repeated capability set preference, or response, message is received from the peer terminal.

modeDetermination, when set to byCallee, the answering terminal decides the mode of operation and transmits the information of the mode in its FSS Response frame to the caller. When set to simultaneous, the session profile is determined by both terminals as the inferred common mode.

Predefined Profile Response Payload

For FSS simultaneous determination, a predefined profile response should not contain any message payload. If it does, the message payload may be ignored.

For FSS non-simultaneous determination mechanism, the predefined profile response consists of the FastSessionSetup-PredefinedResponse ASN.1 message payload which has the following fields:

version, h245version, vendorId, terminalType and capabilityProfile have the same meaning as described above.

mobileLevel indicates the final selected common mobile level between the two connecting terminals. The selection is identical to C.6.2 except the transmission of stuffing flags does not apply.

h223Info indicates H.223 specific settings supported. This includes h223AnnexADoubleFlag, h223AnnexBOptionalHeader, and multiplexProfile. h223AnnexADoubleFlag indicates the use of H.223 Annex A double flag mode for mobile level 1 as the final mobile level. h223AnnexBOptionalHeader indicates the use of H.223 Annex B optional header mode for mobile level 2 or 3 as the final mobile level. multiplexProfile indicates which predefined multiplex table profile is used by the terminal transmitting the message.

audioProfiles contains a list of predefined audio profiles for both media directions. The list should contain at least one audio channel path for outgoing direction and one for incoming direction, which is indicated by the MDI in a PPI. For example, for a bidirectional audio channel, at least one audio profile should be specified. If the list consists of unidirectional audio channels, one in each media direction, then at least two audio profiles should be specified.

videoProfiles contains a list of predefined video profiles for both media directions. The list should contain at least one video channel path for outgoing direction and one for incoming direction, which is indicated by the MDI in a PPI. For example, for a bidirectional video channel, at least one video profile should be specified. If the list consists of unidirectional video channels, one in each media direction, then at least two video profiles should be specified.

dataApplicationProfiles contains a list of predefined data application profiles for both media directions. The list should contain at least one data application channel path for outgoing direction and one for incoming direction, which is indicated by the MDI in a PPI. For example, for a bidirectional data application channel, at least one data application profile should be specified. If the list consists of unidirectional data application channels, one in each media direction, then at least two data application profiles should be specified. This parameter is reserved and shall not be used. On receiving this parameter, it shall be ignored.

encryptionProfiles contains a list of predefined encryption profiles for both media directions. The list should contain at least one encryption channel path for outgoing direction and one for incoming direction, which is indicated by the MDI in a PPI. For example, for a bidirectional encryption channel, at least one encryption profile should be specified. If it consists of unidirectional encryption channels, one in each media direction, then at least two encryption profiles should be specified. This parameter is reserved and shall not be used. On receiving this parameter, it shall be ignored.

additionalParameters contains a list of predefined miscellaneous profiles including non-standard profiles. This parameter is reserved and shall not be used. On receiving this parameter, it shall be ignored.

Predefined Profiles and Indices

A predefined profile makes use of a single index, called predefined profile index (PPI) to represent a whole set of predefined parameters for audio codec, video codec, multiplex capability, and multiplex entry table. It also includes a media direction index (MDI) for each media type. In other embodiments, subsets of these profiles are utilized as appropriate to the particular application. For example, a predefined profile may represent an audio codec of a specific configuration or an entire channel state pertaining to a logical channel.

Baseline profiles for audio codec, video codec, multiplex capability, and multiplex entry table are defined in this recommendation. These baseline profiles are specified in the Predefined Profiles for FSS Procedure section above. Additional profiles can be added through normal standardization procedures.

Figures 29, 30, 31:
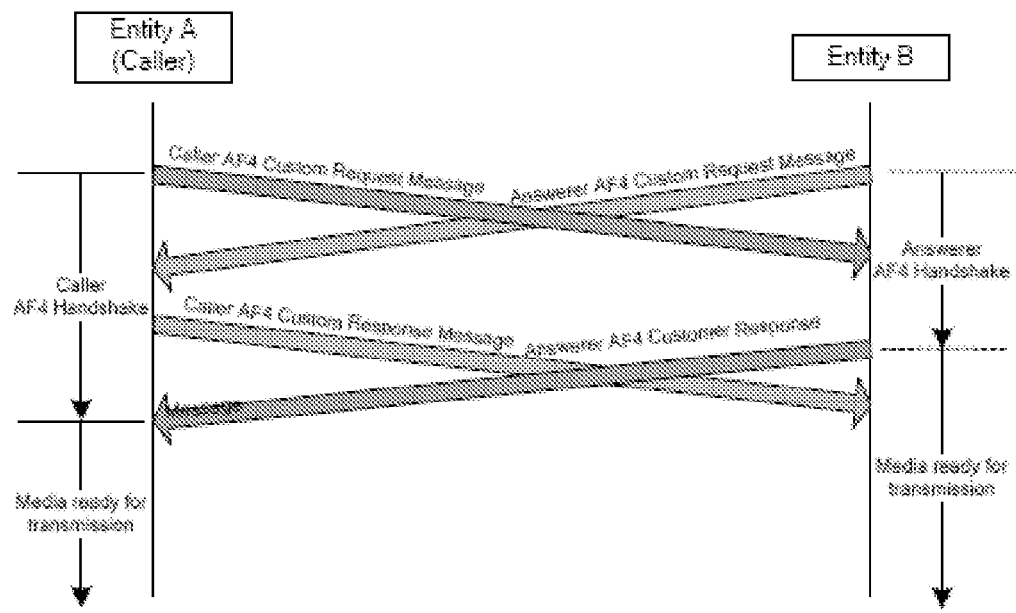
FIG. 29 illustrates the structure of the Predefined Profile Index according to an embodiment of the present invention.
FIG. 30 illustrates the structure of the Detailed Profile Index in the Predefined Profile Index according to an embodiment of the present invention.
FIG. 31 illustrates communication of Request and Response messages according to an embodiment of the present invention.

FIG. 29 illustrates the structure of the PPI according to an embodiment of the present invention. As shown in FIG. 29, a PPI is represented by a 16-bit value. The 3 most significant bits (MSBs) (bit 16 to bit 14), represent the Media Direction Index (MDI) as described in the Media Channels with Different Media Directions and Adaptation Layer Types section. The remaining 13 least significant bits (LSBs) (bit 13 to bit 1) represent the Detailed Profile Index (DPI). The values PPI with the pattern Ox [3,5,7,9,B,D,F]FFF are reserved.

In the DPI, the 5 MSBs (bit 13 to bit 9) represent the DPI profile category index (DPI-CI) which has either the media type for the case of media, the multiplex capability category for the case of multiplex capability, or the multiplexing category for the case of multiplex entry table. The 8 LSBs (bit 8 to bit 1) are the unique identifier for a profile of the particular media, multiplex capability or multiplex entry table, called profile identifier (DPI-PID).

Table 6 illustrates the ranges of the DPI-CI according to an embodiment of the present invention.

TABLE 6

H.324 - Ranges of Category Index (DPI-CI) in a DPI.

| DPI-CI Values (bit 13 to bit 9) | Description |
| --- | --- |
| 0~15 | Baseline media for media covered by ITU-T Rec. H.324. |
| 16~19 | Baseline media for media covered by Recommendations other |
| 20~29 | Media registered with profile index assignment authority. |
| 30 | Reserved |
| 31 | Reserved |

Table 7 illustrates the ranges of the DPI-PID for the DPI-CI with values smaller than 20 according to an embodiment of the present invention.

TABLE 7

H.324 - Ranges of Category Index (DPI-CI) in a DPI.

| DPI-PID Values (bit 8 to bit 1) | Description |
| --- | --- |
| 0~31 | Baseline media profile settings targeting to ITU-T Rec. H.324. |
| 32~126 | Media profiles targeting to ITU-T Rec. H.324, registered with profile index assignment authority. |
| 127 | Reserved |
| 128~159 | Baseline media profile settings targeting to Recommendations other than ITU-T Rec. H.324. |

TABLE 7-continued

H.324 - Ranges of Category Index (DPI-CI) in a DPI.

| DPI-PID Values (bit 8 to bit 1) | Description |
|---|---|
| 160~253 | Media profiles targeting to Recommendation other than ITU-T Rec. H.324, registered with profile index assignment authority. |
| 254 | Reserved |
| 255 | Reserved |

FIG. 30 illustrates a structure of the DPI in the PPI according to an embodiment of the present invention. The definition of the ITU-T Rec. H.324 and 3GPP 3G-324M session profiles may be extended in separate documents from time to time. The defined baseline profiles are described in the Predefined Profiles for FSS Procedure section above.

Multiple media channels of the same and different media types can be supported by the use of the PPI separator with the value of OxIFFF as one capability descriptor. By itself, a PPI separator indicates to use the same set of media preference specified immediately before. Otherwise, an additional set of media preference may follow the PPI.

Predefined Audio Profiles

The 5-bit DPI-CI for the audio codec type defines the codecs as shown in Table 8.

TABLE 8

H.324 - Definitions of predefined audio codec types.

| Values | Media Type |
|---|---|
| 0 | G.723.1 |
| 1 | G.711 |
| 16 | AMR (AMR-NB) |
| 17 | AMR-WB |

Details of baseline predefined audio profiles are defined in the Predefined Profiles for FSS Procedure section above.

Predefined Video Profiles

Table 9 illustrates definitions of predefined video codec types according to an embodiment of the present invention. A 5-bit DPI-CI for the video codec type is utilized in a particular embodiment.

TABLE 9

Definitions of predefined video codec types.

| Values | Media Type |
|---|---|
| 0 | H.263 |
| 1 | H.261 |
| 16 | MPEG4-Video |
| 17 | H.264 |

Details of baseline predefined video profiles are defined in the Predefined Profiles for FSS Procedure section above.

Multiplex Capability Profiles

The 5-bit DPI-CI for the multiplex capability defines the multiplex capability profiles shown in Table 10.

TABLE 10

H.324 - Definitions of predefined multiplex capability profiles.

| Values | Multiplex Capability Category |
|---|---|
| 0 | Baseline H.324 settings |
| 1 | H.324/M settings |
| 16 | Settings for systems other than ITU-T H.324, such as 3G-324M. |

Details of baseline predefined multiplex capability profiles are defined in the Predefined Profiles for FSS Procedure section above.

Multiplex Table Entries Profiles

The 5-bit DPI-CI for the multiplex entry table type defines the multiplex table profiles shown in Table 11.

TABLE 11

H.324 - Definitions of predefined multiplex table profiles.

| Values | Multiplex Table Profile |
|---|---|
| 0 | For logical channels without multiplexing. |
| n (=1-14) | For n logical channels plus logical channel 0 with multiplexing. |

Logical channels are pre-assigned. For one or more audio channels, the logical channel numbers are 1 (A1), 17 (A2), 33 (A3), . . . . For one or more video channels, the logical channel numbers are 2 (V 1), 18 (V2), 34 (V3), . . . . For one or more data application channels, the logical channel numbers are 3 (D1), 19 (D2), 35 (D3), . . . . For one or more non-standard channels, the logical channel numbers are 4 (01), 20 (02), 36 (03), . . . . The maximum number of predefined entries for any multiplex table PPI is 13. Details of baseline predefined multiplex table profiles are defined in Appendix IV.2.4/H.324.

FSS Predefined Profiles Exchange Procedure

Once the bearer is established, if a terminal supports FSS, it shall immediately send an FSS Request frame. The frame should be repeated until one of the following conditions occurs, depending on whether simultaneous determination is invoked:

An FSS Request frame is detected at the callee for non-simultaneous determination; an FSS Request frame is detected for simultaneous determination;

An FSS Response frame is detected;

A valid mobile level stuffing flag is detected, as described in C.6\H324;

Timer T401 expiry.

In some embodiments of the present invention, the FSS Response frame is used as an Ack only and not to define operating conditions. In this case, it is not necessary for the receiving terminal to send further FSS frames. When valid mobile level stuffing flags are detected or when timer T401 expires before detecting a valid FSS frame, normal H.324 session procedure shall be used according to Annex C. This is also referred to as FSS fallback.

When an FSS Request is detected, the payload is processed. If the payload is decoded successfully, the terminal accepts it by sending an FSS Response frame. An FSS Response itself may incorporate message payload data or media payload data depending on the modeDetermination and mediaTunnel flags in the FSS Request defined in the modeDetermination section and the mediaTunnel Mode section. The frame may be immediately repeated, except the payload field for the media payload data, until one of the following situations occurs:

An FSS Response with the same SN is detected;

An FSS Request frame with a new monotonically incremented SN modulo 256 is detected;

An FSS Response frame with a new monotonically incremented SN modulo 256 is detected during FSS re-proposal;

Standard mobile level sequence flags are detected, as described in C.6\H.324;

Timer T401 expiry.

For the master-slave determination, the caller shall be the master when the terminalType fields in the FSS Request frames of the two terminals are identical. When the terminalType fields differ, the terminal which has higher terminalType value shall be the master. A terminal indicates its capability to accept media tunneled in any FSS Response by setting the mediaTunnel to TRUE, according to the mediaTunnel Mode section below.

After an FSS Response has been sent, and a non-counter-offered FSS Response (Response Counter-Offer Procedure) has been detected and accepted, the terminal shall begin NMLO using the agreed mobile level. Audio and video exchange as determined by the ICM or from the accepted FastSessionSetupPredefinedResponse shall also start immediately if they have not already started during the FSS Response phase. Audio and video exchange shall continue seamlessly if they have been started during the FSS Response phase. After the receipt, and acceptance of a peer's preferences the transition to normal media transmissions in the inferred mode occurs. The encapsulation of the media inside the special FSS framing is no longer necessary and it is transmitted directly on the bearer.

After an FSS Request has been detected, the terminal may decide not to proceed with the FSS procedure. It shall follow the procedure described in the Fast Session Setup Fallback Procedure Specification Section. After an FSS Request has been sent and an FSS Request has been detected, if the terminal does not detect an FSS Response frame, but detects valid mobile level stuffing flags, the terminal shall follow the procedure described in the Fast Session Setup Fallback Procedure Specification Section.

After receiving a FastSessionSetupPredefinedResponse, if the terminal does not accept the response but prefers to perform a modified request, it may follow Request Re-Proposal Procedure described in the Request Re-Proposal Procedure section. If the terminal does not accept the response but prefers to offer a counter-response, it may follow the procedure described in the Response Counter-Offer Procedure Section.

On receiving FSS Response without message payload before receiving FSS Request at the beginning of the FSS procedure, the FSS Response to be transmitted shall have the SSN set to 7. On receiving an FSS Response without message payload and with SSN set to 7, the terminal shall reset to restart the media bitstream generation what NMLO begins. Transmission of media tunneled in the FSS Response frames may be ignored. On receiving unexpected FSS frames, they shall be ignored.

modeDetermination

When the modeDetermination field in FastSessionSetupPredefinedRequest is set to byCallee by either or both terminals, the callee transmits in its FastSessionSetupPredefinedResponse the selected logical channels in the form of PPIs for both directions within the capabilities of both terminals. The caller shall send an FSS Response frame without message payload only after receiving FastSessionSetupPredefinedResponse from the callee.

When the modeDetermination fields in FastSessionSetupPredefinedRequest from both terminals are set to simultaneous, the ICM is determined by both terminals according to logical channel selection in C.4.1.3/H.245 and C.5.1.3/H.245 with the information described in the Media Channels With Different Media Directions And Adaptation Layer Types section below. The FSS Response frames of both terminals shall not include any message payload on accepting the ICM. In another embodiment, the FSS Response frames are not transmitted and media sent using the ICM is interpreted as an acknowledgement of successful session setup.

mediaTunnel Mode

The mediaTunnel flag in FastSessionSetupPredefinedRequest is set by a terminal to indicate its capability in receiving media tunneled in FSS Response frames. If a terminal is not operating in the mediaTunnel mode, the terminal will preferably wait to receive an FSS Response message before transmitting media.

When mediaTunnel from a terminal is set to TRUE, the peer terminal may tunnel media data in its FSS Response frames which do not require message payload. The terminal tunneling the media shall transmit one H.223 MUX-PDU in accordance with the ITU-T Rec. H.223 using the finally agreed mobile level as the payload of an FSS Response frame without any mobile flags. FSSPSR does not need to be applied to the media payload. MUX-PDUs shall be sent in sequence, until the completion of the FSS Response phase and the start of the normal media transmission phase (NMLO). When a terminal sets mediaTunnel in its FastSessionSetupPredefinedRequest to FALSE, the peer terminal shall not tunnel any media in its FSS Response frames. Waiting for a message before transmitting media has substantial benefits in allowing for a more simple implementation especially with regards to gateways and simple terminals.

Request Re-Proposal Procedure

A terminal may choose to re-propose a new FSS Request instead of a fallback as described in the Fast Session Setup Fallback Procedure Specification Section. When the modeDetermination field in FastSessionSetupPredefinedRequest of both terminals is set to simultaneous, and a terminal does not accept the FSS Request from the peer terminal, it may re-propose a new FSS Request by incrementing the SN in the FSS Request frame by 1 modulo 256 with the new request settings. If both terminals re-propose a new FSS Request simultaneously, simultaneous determination mode continues to be adopted provided that modeDetermination is set simultaneous by both terminals. If both terminals re-propose a new FSS Request simultaneously and either terminal set modeDetermination to byCallee, non-simultaneous determination shall be adopted.

A simultaneous determination re-proposal mode may be repeated until an ICM can be determined by both terminals, or until a terminal decides to follow the fallback procedure described in the FSS Setup Fallback Procedure Specification Section. A simultaneous determination re-proposal mode may be followed by a non-simultaneous determination mode but not vice versa.

When at least one terminal sets the modeDetermination to byCallee in FastSessionSetupPredefinedRequest, and the answering terminal does not accept the FSS Request from the caller for the first attempt, the answering terminal may re-propose its request by incrementing the SN in the FSS Request frame by 1 modulo 256 with the new request settings. When the caller accepts the FSS Request by the answering terminal, it shall respond to the answering terminal by sending the FSS Response with the SN in the FSS Response frame matching that of the FSS Request frame with the final selection. When the caller does not accept the FSS Request by the answering terminal, the caller may re-propose its request by incrementing the SN in the FSS Request frame by 1 modulo 256 with the new request settings.

If a terminal does not accept an FSS Response, it may re-propose a new FSS Request as described above, or counter propose a new FSS Response as described in the Response Counter-Offer Procedure Section. The non-simultaneous determination mode may be repeated until both terminals can accept a common mode initially selected by the callee, or subsequently selected by one of the terminals, or until a terminal decides to follow the fallback procedure described in the Fast Session Setup Fallback Procedure Specification Section.

Response Counter-Offer Procedure

This procedure applies to non-simultaneous determination only. A terminal may choose to counter-offer with a new FastSessionSetupPredefinedResponse after receiving an FastSessionSetupPredefinedResponse from the peer terminal instead of re-proposing a new FastSessionSetupPredefinedRequest as described in the Request Re-Proposal Procedure section or fallback as described in the Fast Session Setup Fallback Procedure Specification section.

The new counter proposed FastSessionSetupPredefinedResponse shall be set with the SN in the FSS Response frame incrementing by 1 modulo 256 from the SN in the last FSS Request frame received. The determination of the FastSessionSetupPredefinedResponse shall be based on the message content of the received FastSessionSetupPredefinedResponse with the adjustment of the media channel directions from all currently proposed channel profiles. The received FastSessionSetupPredefinedResponse is modified by the removal of the channels that it cannot accept and the addition of the channels that it can support.

FSS with Explicit Profiles

FSS Explicit Profile Request

The explicit profile request is represented by the FastSessionSetupExplicitRequest ASN.1 message which has the following fields:

version indicates the version number of the FSS Explicit Profile being used by the terminal transmitting the message.

h245version, vendorId, terminalType, initialMobileLevel, mediaTunnel and modeDetermination have the same meaning as in the Predefined Profile Request Payload section.

h223Info indicates H.223 specific settings support. This includes h223AnnexADoubleFlag, h223AnnexBOptionalHeader, and multiplexEntrySend. h223AnnexADoubleFlag and h223AnnexBOptionalHeader have the same meaning as in the Predefined Profile Request Payload section. multiplexEntrySend indicates the multiplex entry table to be used by the terminal transmitting the message and is specified according to H.245.

multiplexCapability indicates the multiplex capability to be used by the terminal transmitting the message and is specified according to H.245.

openLogicalChannels contains a list of media channels in both directions to be used ordered by preference and are specified according to H.245. Media include audio, video, data application and encryption.

additionalParameters contains a list of H.245 messages encoded in ASN.1 according to H.245. The list may include additional information, requests and non-standard H.245 messages ordered in the preference of use.

FSS Explicit Profile Response

For FSS simultaneous determination mechanism, the explicit profile response does not contain any payload.

For FSS non-simultaneous determination mechanism, the explicit profile response is represented by the FastSessionSetupExplicitResponse ASN.1 message which has the following fields:

version, h245version, vendorId and terminalType have the same meaning as in the Predefined Profile Request Payload section.

mobileLevel has the same meaning as in the Predefined Profile Response Payload section.

h223Info indicates H.223 specific settings support. This includes h223AnnexADoubleFlag, h223AnnexBOptionalHeader and multiplexEntrySend. h223AnnexADoubleFlag and h223AnnexBOptionalHeader have the same meaning as in the Predefined Profile Response Payload section. multiplexEntrySend has the same meaning as in the FSS Explicit Profile Request section.

multiplexCapability and additionalParameters have the same meaning as in the FSS Explicit Profile Request section.

openLogicalChannels contains a list of media channels selected for both media directions and are specified according to H.245. Media include audio, video, data application and encryption.

additionalParameters contains a list of H.245 messages encoded in ASN.1 according to H.245. The list may include additional information, responses to requests indicated in the additionalParameters in the corresponding FastSessionSetupExplicitRequest message, and non-standard H.245 messages ordered in the preference of use.

FSS Explicit Profile Request and Response Exchange Procedure

When two connecting terminals utilize FSS Explicit Profiles, the FSS Explicit Profile Request and Response procedure is identical to the procedure described in the FSS Predefined Profiles Exchange Procedure section with all occurrences of predefined profile and FastSessionSetupPredefinedResponse to be replaced by explicit profile and FastSessionSetupExplicitResponse respectively. The interworking of predefined and explicit profiles is described in the Interworking between FSS Predefined Profiles and FSS Explicit Profiles section.

Logical Channel Numbers

Logical channel numbers are assigned by the message originator in H.245 OpenLogicalChannel request messages. For the case of bidirectional logical channels, only the forward logical channel number can be specified. The reverse logical channel number shall be the same as the forward logical channel number. In an embodiment, if a reverse logical channel number is already assigned, the next available logical channel number will be assigned. The highest logical channel number will be 14, and any OpenLogicalChannel number requests that lead to a logical channel number exceeding 14 will be ignored. The multiplex table entries as defined in H.245 MultiplexEntrySend request message should match with the assigned logical channel numbers.

modeDetermination Mode

The procedure is identical to modeDetermination with all occurrences of FastSessionSetupPredefinedRequest and FastSessionSetupPredefinedResponse to be replaced by FastSessionSetupExplicitRequest and FastSessionSetupExplicitResponse respectively, and PPI by H.245 OpenLogicalChannels.

mediaTunnel Mode

The procedure is identical to mediaTunnel Mode with all occurrences of FastSessionSetupPredefinedRequest to be replaced by FastSessionSetupExplicitRequest.

Request Re-Proposal Procedure

The procedure is identical to using predefined profiles with all occurrences of FastSessionSetupPredefinedRequest to be replaced by FastSessionSetupExplicitRequest.

Response Counter-Offer Procedure

The procedure is identical to the Response Counter-Offer Procedure with all occurrences of FastSessionSetupPredefinedRequest and FastSessionSetupPredefinedResponse to be replaced by FastSessionSetupExplicitRequest and FastSessionSetupExplicitResponse respectively.

Interworking between FSS Predefined Profiles and FSS Explicit Profiles

When two terminals use different profile exchange modes (Predefined and Explicit) and only one terminal supports both Predefined and Explicit Profiles exchange procedures, a terminal that decodes and supports the received profile type should resend the FSS Request with modeDetermination set to byCallee using the same profile type as that it received and follow the procedure described in the FSS Predefined Profiles Exchange Procedure or the FSS Explicit Profile Request and Response Exchange Procedure sections. If the callee understands both Predefined and Explicit Profiles, it may skip to send the FSS Request and send the FSS Response. Alternatively, if the callee understands both profiles, a selection may be made to select a preferred profile exchange mode. The preferred profile exchange mode process may select a mode that is the same as or different than the mode originally transmitted by the callee. Additionally, in an alternative embodiment, the callee selects both Predefined and Explicit Profiles for initial transmission. Merely by way of example, if the callee originally transmitted Predefined profiles and then determined that the caller preferred Explicit Profiles, the callee may select to switch modes from Predefined Profiles to Explicit Profiles. A terminal that cannot decode or support the profile type it received, should continue to repeat sending the same FSS Request. The procedures specified in the FSS Predefined Profiles Exchange Procedure or the FSS Explicit Profile Request and Response Exchange Procedure sections should be followed accordingly. Only non-simultaneous determination shall be used.

When two terminals use different profile exchange modes and both terminals support both the FSS Predefined Profiles and FSS Explicit Profiles, a terminal that decodes and supports the received profile type should either send an FSS Response with a message payload (non-simultaneous determination) or resend the FSS Request with modeDetermination set to byCallee using the same profile type as that it received and follow the procedure described in the FSS Predefined Profiles Exchange Procedure or FSS Explicit Profile Request and Response Exchange Procedure sections.

Since both terminals can decode both profile modes, the callee shall ignore the FSS Response it received. If the callee sent the FSS Response and receives the resent FSS Request frames, it shall ignore the FSS Request it received. If the callee sent the FSS Request and receives the resent FSS Request frames, it shall decide which mode of profile it will use and follow the procedure described in the FSS Predefined Profiles Exchange Procedure or FSS Explicit Profile Request and Response Exchange Procedure sections. If the caller receives the FSS Response frames, it shall handle the FSS Response frame according to the FSS Predefined Profiles Exchange Procedure or FSS Explicit Profile Request and Response Exchange Procedure sections.

Interworking Request Re-proposal Procedure

A terminal may choose to re-propose a new FSS Request instead of fallback as described in the Fast Session Setup Fallback Procedure Specification section. When at least one of the two terminals using different profile types can interpret the received request, but does not accept the FSS Request from the peer terminal, the terminal may send a new FSS Request using the same profile type as the peer terminal according to FSS Predefined Profiles Exchange Procedure or FSS Explicit Profile Request and Response Exchange Procedure and with the SN in the FSS Request frame incremented by 1 modulo 256. The procedures as described in the Interworking between FSS Predefined Profiles and FSS Explicit Profiles section should be followed.

Fast Session Setup Fallback Procedure Specification

An H.324 entity which supports FSS shall support the fallback procedure when the peer H.324 entity does not support FSS or transmits the mobile level flags before the completion of the FSS procedure. If a terminal does not receive an FSS Request but has detected a normal start up procedure with a normal H.245 TerminalCapabilitySet message at an agreed initial mobile level, it shall assume that the peer terminal does not support FSS, or has not accepted any of the specified FSS profiles. In this case, the terminal shall stop transmitting FSS frames and continue to use the conventional TerminalCapabilitySet, MasterSlaveDetermination, MultiplexEntrySend and OpenLogicalChannel procedures to establish the session.

If a terminal detects a normal start up procedure with a normal H.245 TerminalCapabilitySet message at an agreed initial mobile level, no matter if the terminal has completed the FSS procedure, it shall consider the peer terminal has proceeded the FSS fallback. In this case, the terminal shall ignore the FSS outcome and start the conventional TerminalCapabilitySet, MasterSlaveDetermination, MultiplexEntrySend and OpenLogicalChannel procedures to establish the session.

If a terminal does not detect a valid FSS frame or normal start up procedure within the timer T401, it should assume that the peer terminal does not support FSS and fallback to continue normal H.324 session procedure according to Annex C. If a terminal receives an FSS Request or Response without the PPI being understood, it shall initiate the FSS fallback procedure according to the descriptions in this section. If audio and video coding processes were started during transmission of the FSS Response frames, they should be reset to restart their bitstream generation.

Terminal Procedures

The steps for provision of communication are as listed in clause C.5/H.324 with the following modifications: Phase D: Fast Session Setup phase, as specified in this specification, is inserted before the level setup procedure. If FSS is completed successfully, H.245 message exchange is skipped and logical channels operate immediately. If FSS fallback occurs, the connection continues from initial mobile level setup phase.

Media Channels with Different Media Directions and Adaptation Layer Types

This clause applies to predefined profile approach only. Media channel types are governed by the following fields:

1. Adaptation layer support per data type. The field is already covered within multiplex capability profile.
2. Media direction capability.
3. Media direction mode.

For adaptation layer support, the settings are used to influence the final logical channels to be opened between two connecting terminals. The adaptation layer support follows the following order of preference for each media type:

1. Media over AL 1
2. Media over AL2
3. Media over AL3

For example, if Video over AL2 and Video over AL3 are both supported, then Video over AL2 is the preference, and is selected if the peer terminal can also support it.

In FSS, adaptation layers always use the setting as specified below:

AL 1: framed or unframed depending on the media type. For all audio and video data types over AL 1, AL 1 shall be set to use framed mode.

AL2: with sequence number.

AL3: with 7-bit sequence number. Send buffer size is set to the recommended value as specified by the appropriate recommendation. Use of optional retransmission mode is left to the implementers.

Determination of the final logical channels to be opened follows normal open logical channel request, which could involve one or more request re-proposals and/or response counter-offers. The final decision is the outcome for the predefined profile approach.

The decision is calculated from the media direction capability with adaptation layer support and further information on the media direction mode to determine the final media mode settings. In normal situations, the predicted media modes determined from all combinations of requests should be unique. In case of discrepancy, either one or more re-proposals of the request may be performed as described in the Request Re-Proposal Procedure sections or the Interworking Request Re-Proposal Procedure section, or FSS fallback is used, as described in the Fast Session Setup Fallback Procedure Specification Section. It will be noted that when a predictable conflict occurs, the master terminal looks at its preferred media list first to work out the final media to open.

Media Direction Index (MDI) is primarily used in FSS predefined profile approach. In addition, note also that the following logical channel settings are invalid:

1. Bidirectional AL2 channel with reverse nullData.
2. AL3 without specifying reverse parameter when the number of control field octets is greater than 0.

Note however that the following logical channel setting is valid:

1 Bidirectional AL2 channel with forward nullData.

All valid combinations of media direction capability and mode forming the MDI are listed in Table 12.

TABLE 12

H.324 - Definitions of Media Direction Index (MDI).

| Media direction capability | Media direction mode | Media Direction Index (MDI) |
|---|---|---|
| receiveCapability | transmitMode | 0 |
|  | transmitAndReceiveMode | 1 |
|  | noTransmitMode | 2 |
| transmitCapability | transmitMode | 3 |
|  | noTransmitMode | 4 |
| receiveAndTransmitCapability (Symmetric) | transmitMode | 5 |
|  | transmitAndReceiveMode | 6 |
|  | noTransmitMode | 7 | transmitMode refers to the use of unidirectional logical channel. For the case of using adaptation layer 3 (AL3), this refers to the use of bidirectional logical channel with reversed logical channel parameter set as NULL.

transmitAndReceiveMode refers to the use of bidirectional logical channel. This is independent of the adaptation layer type to be used.

noTransmitMode refers to the possible use of unidirectional logical channel for incoming media direction. It will not start any logical channel for any direction unless signaled by the remote.

As shown in Table 12, a terminal may operate in one or more modes of operation for a given channel. According to embodiments of the present invention, a channel may operate in different modes for transmit and receive. That is, a channel may transmit media in a first mode and receive media in a second mode (i.e., noTransmitMode). In another embodiment, the modes are symmetric, being the same for both transmit and receive. Thus, merely by way of example, sending a FSS Request with video profile of H.263 with receiveCapability of notransmitMode (MDI=2) and video profile of MPEG-4 with transmitCapability of transmitMode MDI=3). Thus, this exemplary terminal would result in an asymmetric session transmitting MPEG-4 media and receiving H.263 media. Accordingly, the peer terminal would provide matching video profiles in its FSS Request: transmit H.263 and receive MPEG-4.

An embodiment of the present invention is illustrated in FIG. 31, where the Equipment Preferred modes (Custom Request and Response messages shown in FIG. 31) are transmitted on the bearer channel. The Equipment Preferred modes can be similar to that described in the AnswerFast3 embodiment section above and can be an explicit description of preferred modes or a coded (index for look-up in a table of common modes).

FIG. 23 is a simplified diagram illustrating AnswerFast4 according to another embodiment of the present invention. In this case, inference or a preference rule set is used at each terminal and the optional response message is not required to be sent before media transmission may begin. FIG. 25 is a simplified diagram illustrating a method of AnswerFast4 according to an embodiment of the present invention with media transmitted in AnswerFast4 frames.

After sending an AnswerFast4 Request and optionally detecting an AnswerFast4 Response, the terminal will begin a normal session using the agreed mobile level. Audio and video exchange will also start immediately if they have not been started during the AnswerFast4 Response stage if in use. Utilizing embodiments of the present invention, audio and video exchange are enabled to continue seamlessly if they have been started during the AnswerFast4 Response stage whether used or not.

Although embodiments of the present invention have been described in the context of an AnswerFast4 implementation, it is understood that the methods and systems provided according to embodiments of the present invention are also applicable to AnswerFast2 and AnswerFast3 implementations.

ASN.1 Syntax for Fast Session Setup Procedure

Embodiments of the present invention provide the complete ASN.1 syntax script used for Fast Session Setup Procedure used in embodiments of the present invention.

Fast Session Setup ASN.1 Syntax

```
FASTSESSIONSETUP DEFINITIONS AUTOMATIC TAGS    ::=
BEGIN
IMPORTS
    NonStandardIdentifier,
    NonStandardParameter,
```

-continued

```
    MultiplexCapability,
    MultiplexEntrySend,
    OpenLogicalChannel
    FROM MULTIMEDIA-SYSTEM-CONTROL;
FastSessionSetupRequest   ::=  CHOICE
{
    nonStandard        NonStandardParameter,
    predefinedProfile  FastSessionSetupPredefinedRequest,
    explicitProfile    FastSessionSetupExplicitRequest,
}
FastSessionSetupResponse  ::= CHOICE
{
    nonStandard        NonStandardParameter,
    predefinedProfile  FastSessionSetupPredefinedResponse,
    explicitProfile    FastSessionSetupExplicitResponse,
    ...
}
FastSessionSetupPredefinedRequest        ::= SEQUENCE
(
    version            INTEGER (1 ... 7),
    h245version        INTEGER (1 ... 31),
    vendorId           NonStandardIdentifier OPTIONAL,
    terminalType       INTEGER (0 ... 255), -- For
    MasterSlaveDetermination
    initialMobileLevel INTEGER (0 ... 7), -- [4,7] are
    reserved
    h223Info           SEQUENCE
    {
        h223AnnexADoubleFlag      BOOLEAN,
        h223AnnexBOptionalHeader      BOOLEAN,
        multiplexProfile INTEGER   (0 ... 65535) OPTIONAL,
    } OPTIONAL,
    capabilityProfile INTEGER (0 ... 65535) OPTIONAL,
    audioProfiles SET SIZE (1 ... 65535) OF INTEGER (0 ... 65535)
OPTIONAL,
    videoProfiles SET SIZE (1 ... 65535) OF INTEGER (0_.65535)
OPTIONAL,
    dataApplicationProfiles SET SIZE (1 ... 65535) OF INTEGER
(0 ... 65535) OPTIONAL,
    encryptionProfiles       SET SIZE (1 ... 65535) OF INTEGER
(0 ... 65535) OPTIONAL,
    additionalParameters     OCTET STRING OPTIONAL,
    mediaTunnel BOOLEAN,
    modeDetermination CHOICE
    {
        simultaneous     NULL,
        byCallee         NULL,
    }
FastSessionSetupPredefinedResponse          ::= SEQUENCE
{
    version            INTEGER (1 ... 7),
    h245version        INTEGER (1 ... 31),
    vendorId           NonStandardIdentifier OPTIONAL,
    terminalType       INTEGER (0 ... 255), -- For
    MasterSlaveDetermination
    mobileLevel        INTEGER (0 ... 7), -- [4,7] are reserved
    h223Info           SEQUENCE
    {
        h223AnnexADoubleFlag      BOOLEAN,
        h223AnnexBOptionalHeader      BOOLEAN,
        multiplexProfile INTEGER   (0 ... 65535)
        OPTIONAL,
    ...
    } OPTIONAL,
    capabilityProfile        INTEGER (0 ... 65535) OPTIONAL,
    audioProfiles            SET SIZE (1 ... 65535) OF INTEGER
(0 ... 65535) OPTIONAL,
    videoProfiles            SET SIZE (1 ... 65535) OF INTEGER (0 ...
                             65535)
OPTIONAL,
    dataApplicationProfiles   SET SIZE (1 ... 65535) OF INTEGER
(0 ... 65535) OPTIONAL,
    encryptionProfiles        SET SIZE (1 ... 65535) OF INTEGER
(0 ... 65535) OPTIONAL,
    additionalParameters      OCTET STRING OPTIONAL,
    ...
}
FastSessionSetupExplicitRequest          ::= SEQUENCE
{
```

-continued

```
    version            INTEGER (1 ... 7),
    h245version        INTEGER (1 ... 31),
    vendorId           NonStandardIdentifier OPTIONAL,
    terminalType       INTEGER (0 ... 255), -- For
    MasterSlaveDetermination
    initialMobileLevel INTEGER (0 ... 7), -- [4,7] are
    reserved
    h223Info           SEQUENCE
    {
        h223AnnexADoubleFlag      BOOLEAN,
        h223AnnexBOptionalHeader      BOOLEAN,
        multiplexEntrySend        MultiplexEntrySend OPTIONAL,
    ...
    } OPTIONAL,
    multiplexCapability      MultiplexCapability OPTIONAL,
    openLogicalChannels      SET SIZE (1 ... 65535) OF
    OpenLogicalChannel OPTIONAL,
    additionalParameters     OCTET STRING OPTIONAL,
    mediaTunnel BOOLEAN,
    modeDetermination CHOICE
    {
        simultaneous     NULL,
        byCallee         NULL,
        ...
    },
    ...
}
FastSessionSetupExplicitResponse          ::= SEQUENCE
{
    version            INTEGER (1 ... 7),
    h245version        INTEGER (1 ... 31),
    vendorId           NonStandardIdentifier OPTIONAL,
    terminalType       INTEGER (0 ... 255), -- For
    MasterSlaveDetermination
    mobileLevel        INTEGER (0 ... 7), -- [4,7] are reserved
    h223Info           SEQUENCE
    {
        h223AnnexADoubleFlag      BOOLEAN,
        h223AnnexBOptionalHeader      BOOLEAN,
        multiplexEntrySend        MultiplexEntrySend OPTIONAL,
    } OPTIONAL,
    multiplexCapability      MultiplexCapability OPTIONAL,
    openLogicalChannels      SET SIZE (1 ... 65535) OF
    OpenLogicalChannel OPTIONAL,
    additionalParameters     OCTET STRING OPTIONAL,
    ...
}
END
```

AnswerFast4 Example Embodiment Using Interleaving Conventional Flags and Media:

A conventional method for establishing communications between two terminals is provided below.

1. Entity A (or terminal) transmits mobile level flags only; repeated until detection occurs;
2. Entity B (or terminal) transmits mobile level flags only; repeated until detection occurs;
3. Entity A detects mobile level flags from Entity B; (Entity A knows both its mobile level ("ML") and Entity B's mobile level ("ML"), completing the IMLS—Initial Mobile Level Setup) [Time at 0.5 round trip delay "RTD"];
4. Entity B detects mobile level flags from Entity A; (Entity B knows both its ML and Entity A's ML, completing IMLS) [Time at 0.5 RTD];
5. Negotiations to establish a communication connection take place after the IMLS is completed; and
6. Overall delay to seeing media is worst of the two entities IMLS point. [0.5 RTD+Conventional setup after IMLS]".

Figure 32:
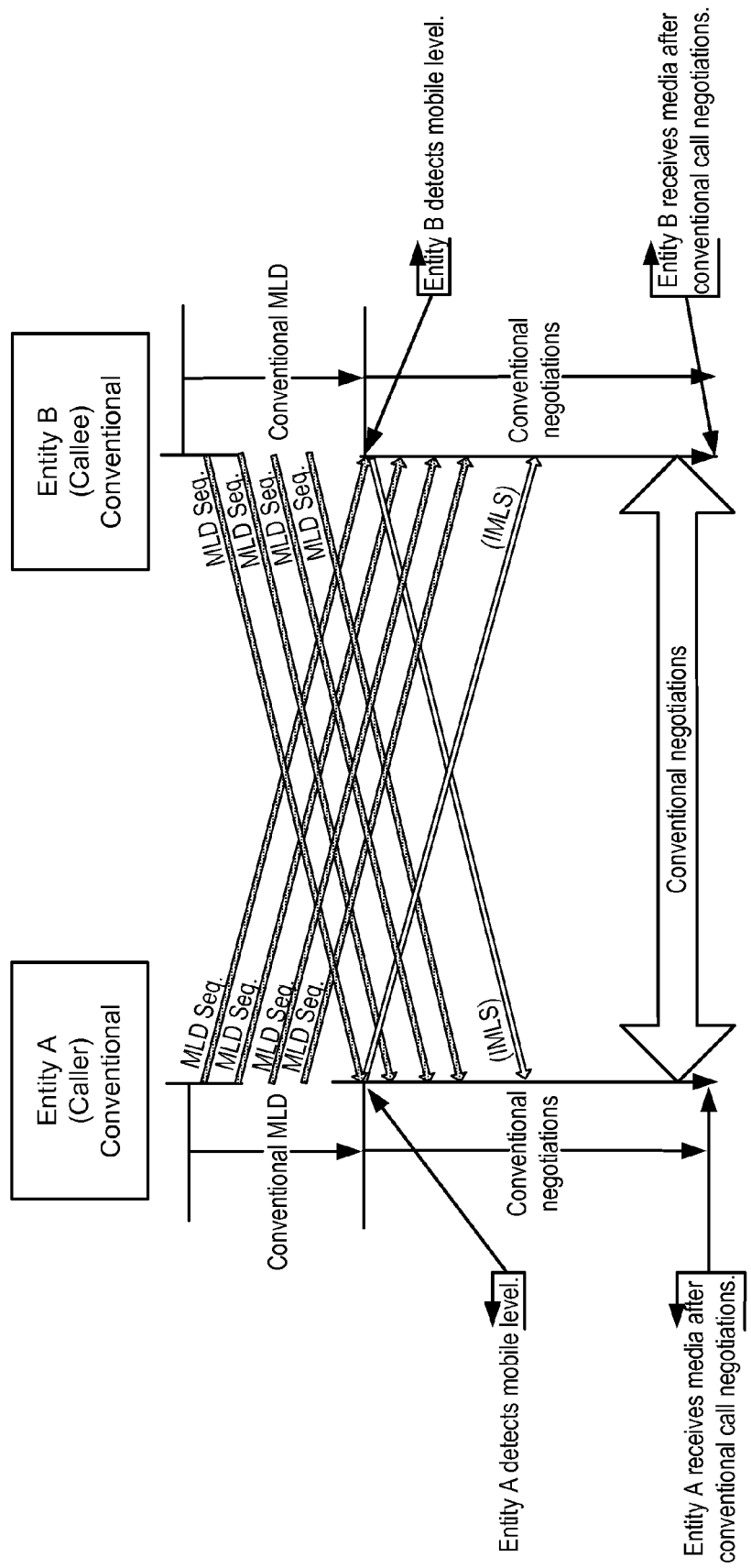
FIG. 32 illustrates an example of a conventional communication flow using mobile level detect sequences between two terminals.

Further details of the above method can be found in reference to FIG. 32 which illustrates an example of a conventional communication flow using mobile level detect sequences between two terminals. This diagram is an example and one of ordinary skill in the art would recognize slight variations. As shown, the example includes a caller and receiver, which is termed callee in this example. The method illustrates entity A and entity B, which are conventional. A time line is illustrated in the vertical lines from an upper region of the illustration to a lower region of the illustration. As shown, entity A (or terminal) transmits mobile level flags only; repeated until detection occurs. Entity B (or terminal) transmits mobile level flags only; repeated until detection occurs.

In the conventional method, entity A detects mobile level flags from Entity B. In the present method, entity A knows both its mobile level ("ML") and Entity B's mobile level ("ML"), completing the IMLS—Initial Mobile Level Setup. Timing for round trip delay in the method is about 0.5 RTD. As shown, entity B detects mobile level flags from Entity A. Here, entity B knows both its ML and Entity A's ML, completing IMLS, which has a RTD of about 0.5. Next, the two entities begin negotiations to establish a communication connection after the IMLS is completed. An overall delay to seeing media is often worst of the two entities IMLS point. We calculate the delay to be about 0.5 RTD+Conventional setup after IMLS, as shown. These and other limitations can be improved in part using methods and systems according to embodiments of the present invention.

Another method for establishing communications between two terminals is briefly outlined below.
1. Entity A transmits one (or more) AnswerFast4 frames;
2. Entity B transmits mobile level flags only; repeated until detection occurs;
3. Entity A detects mobile level flags from entity B [Time at 0.5 RTD];
4. Entity B ignores (i.e., assumed noise/corruption) the AnswerFast4 frames from entity A;
5. Entity A performs fallback, and begins sending mobile level flags to entity B; (Entity A knows both its ML and Entity B's ML, completing IMLS—Initial Mobile Level Setup) [Time at 0.5 RTD];
6. Entity B detects mobile level flags from entity A (Entity B knows both its ML and Entity A's ML, completing IMLS) [Time at 1.0 RTD];
7. Negotiations take place after IMLS completed; and
8. Overall delay to seeing media is worst of the two entities IMLS point. [1.0 RTD+Conventional setup after IMLS].

Figure 33:
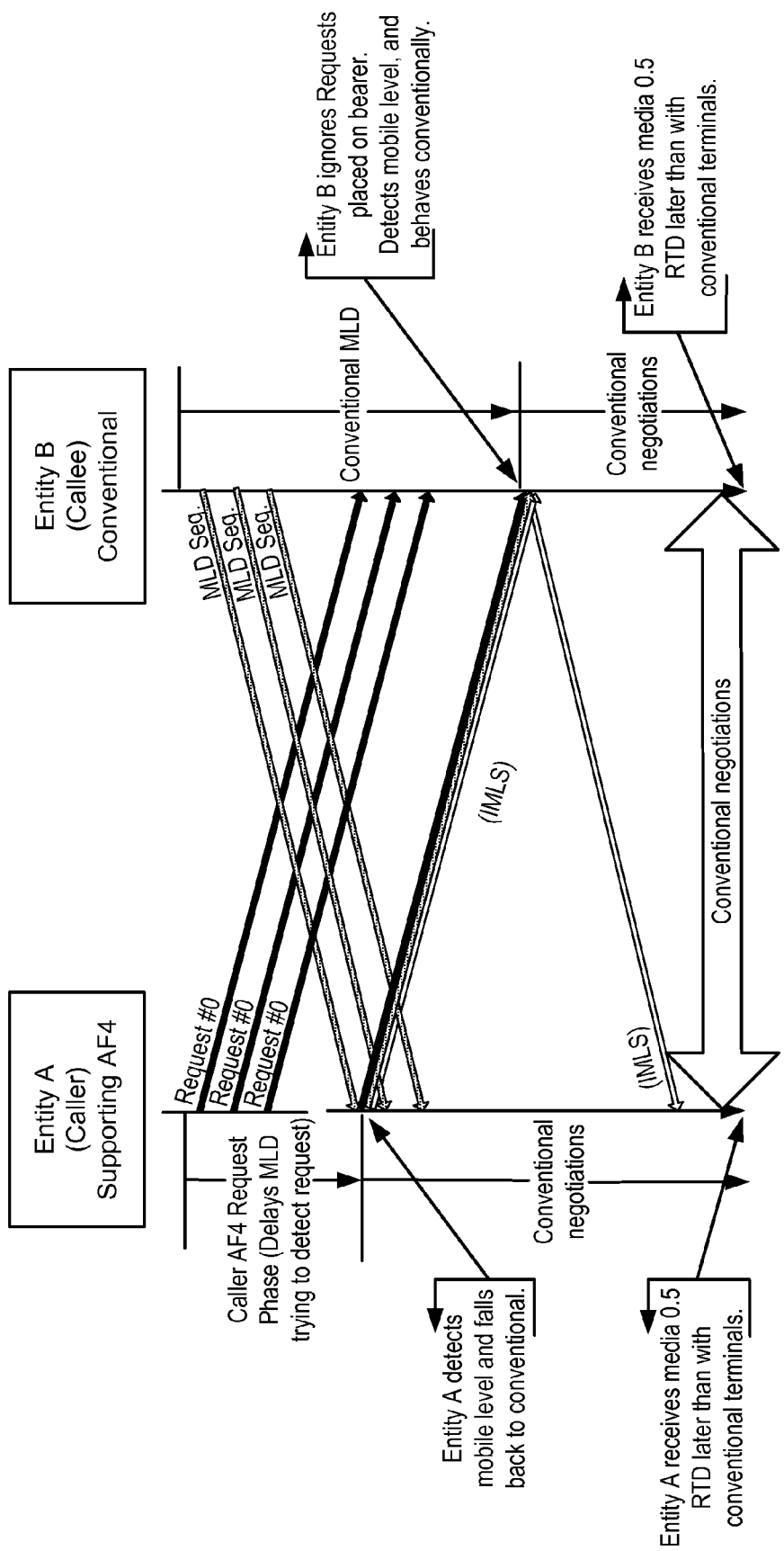
FIG. 33 illustrates an example of a communication flow using the AnswerFast4 technique to establish a connection between two terminals.

Further details of the above method can be found throughout the present specification and more particularly in reference to FIG. 33 which illustrates an example of a communication flow using the AnswerFast4 technique to establish a connection between two terminals. This diagram is merely an example, which should not unduly limit the scope of the claims herein. One of ordinary skill in the art would recognize many variations, modifications, and alternatives. As shown, the example includes a caller and receiver, which is termed callee in this example. The method illustrates entity A, which supports the AnswerFast4 call. A time line is illustrated in the vertical lines from an upper region of the illustration to a lower region of the illustration. As shown, entity A transmits one (or more) AnswerFast4 frames. Entity B transmits mobile level flags only; repeated until detection occurs. As also shown, entity A detects mobile level flags from entity B. A round time delay is about 0.5 RTD. Entity B ignores the AnswerFast4 frames from entity A, which entity B assumes is noise/corruption and/or other artifact. Of course, depending upon the embodiment, there can be other flags inserted, combined, and removed with the AnswerFast4 frames or the like.

Once entity A detects mobile level sequences from entity B, entity A performs a fallback process. Entity A begins sending mobile level flags to entity B. Here, entity A knows both its ML and Entity B's ML, which completes the IMLS—Initial Mobile Level Setup. The round trip delay is about 0.5 RTD. As also shown, entity B detects mobile level flags from entity A. Entity B knows both its ML and Entity A's ML, which completes the IMLS. The time associated with the process is 1.0 RTD. Thereafter, the method initiates negotiations to take place after IMLS has been completed. An overall delay to seeing media is worst of the two entities IMLS point. The delay is about 1.0 RTD+Conventional setup after IMLS. These and other limitations may be overcome with the present method and system, which will be described in more detail below.

A method for communicating between two terminals using an interleaved mobile level flag sequence according to an embodiment of the present invention is provided below.
1. Entity A transmits one (or more) AnswerFast4 frames to entity B;
2. Entity B transmits mobile level flags only to entity A and is often repeated until detection occurs;
3. Entity A transmits a block of mobile level flags to entity B;
4. Entity A detects mobile level flags from entity B [Time at 0.5 RTD];
5. Entity B ignores (e.g., assumed noise/corruption) the AnswerFast4 frames from entity A;
6. Entity B detects mobile level flags from entity A (Entity B knows both its ML and entity A's ML, completing IMLS—Initial Mobile Level Setup) [Time at 0.5 RTD+transmission time for custom message (could be zero for null message)];
7. Entity A detects more mobile level flags from entity B, and decides to fallback assuming other end does not support the AnswerFast4 frames (A knows both its ML and B's ML, completing IMLS) [Time at 0.5 RTD+decision time (which is implementation dependent) ];
8. Negotiations take place after IMLS completed;
9. Overall delay to seeing media is worst of the two entities IMLS point. [0.5 RTD+max( AnswerFast4 transmit time, AnswerFast4 fallback detect time )+Conventional setup after IMLS]; and
10. Perform other steps as desired.

It should be noted that the interleaving mobile level need not be the same as the mobile level expressed in AnswerFast4 frames, however in some embodiments they may be the same in order to simplify the logic in that implementation.

The above sequence of steps provides method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 34:
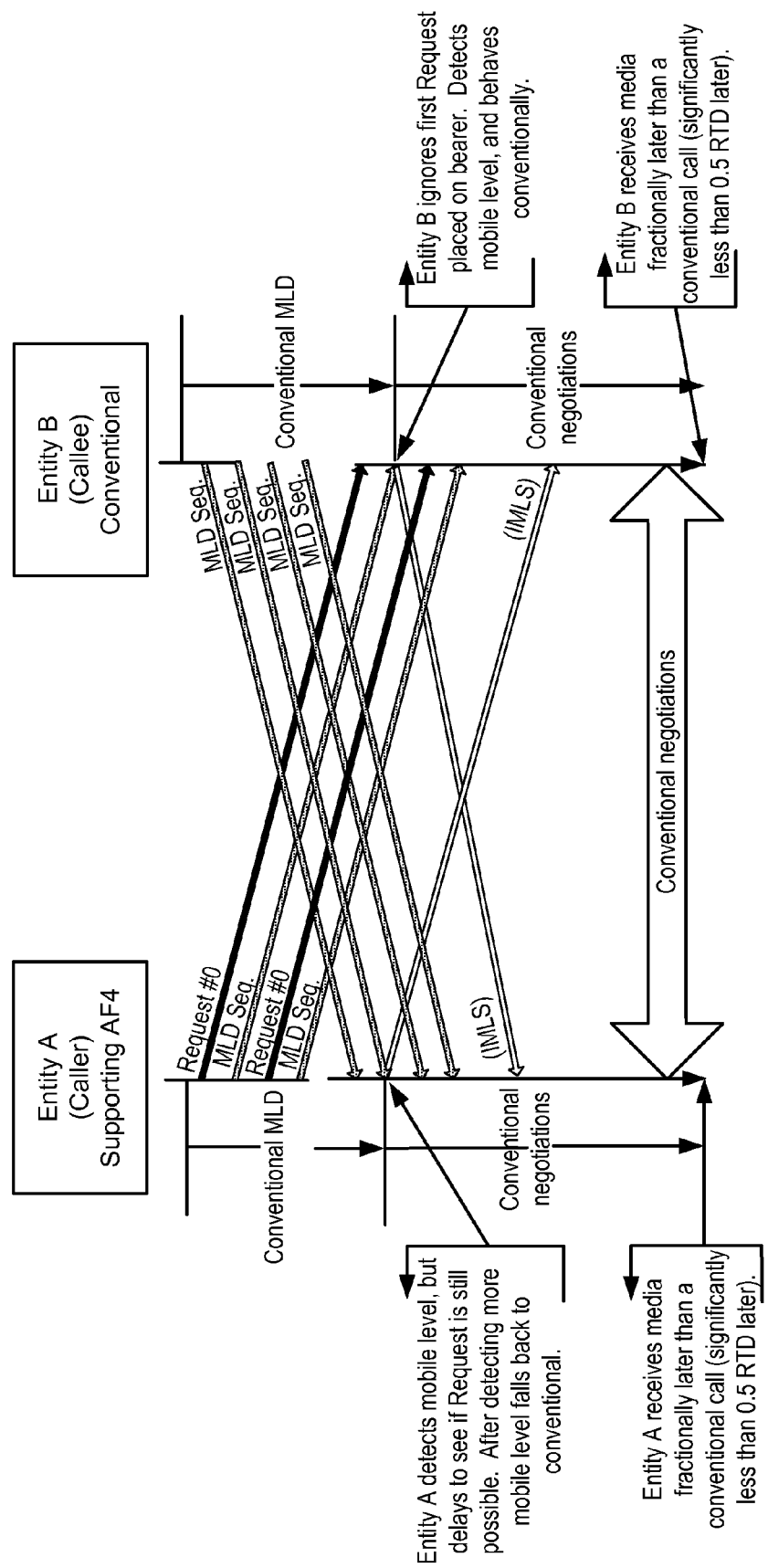
FIG. 34 illustrates an example of a communication flow using an interleaved sequence using mobile level stuffing sequences according to an embodiment of the present invention.

FIG. 34 illustrates an example of a communication flow using an interleaved sequence using mobile level stuffing sequences according to an embodiment of the present invention. This diagram is merely an example, which should not unduly limit the scope of the claims herein. One of ordinary skill in the art would recognize many variations, modifications, and alternatives. As shown, AnswerFast4 request messages and mobile level flags have been interleaved according to a specific embodiment. As also shown, entity A transmits one (or more) AnswerFast4 frames to entity B. Entity B transmits mobile level flags only to entity A and is often repeated until detection occurs. Entity A transmits a block of mobile level flags to entity B. Entity A detects mobile level flags from entity B. A time associated with the detection of the mobile level flags from entity B to detection by entity A is about 0.5 RTD.

In a specific embodiment, entity B ignores (e.g., assumed noise/corruption) the AnswerFast4 frames from entity A since entity B cannot support the preference mode associated with the AnswerFast4 requests. Entity detects mobile level flags from entity A (since Entity B knows both its ML and entity A's ML, which completes the IMLS—Initial Mobile Level Setup). In a specific embodiment, a round trip delay is 0.5 RTD+transmission time for custom message (could be zero for null message).

Entity A detects more mobile level flags from entity B, and decides to fallback assuming other end does not support AnswerFast4. Here, entity A knows both its ML and entity B's ML, which completes the IMLS. A round trip delay is 0.5 RTD+decision time (implementation dependent) according to a specific embodiment. As shown, the method initiates negotiations to take place after IMLS completed. An overall delay to seeing media is worst of the two entities IMLS point. That is, the delay is 0.5 RTD+max (AnswerFast4 Transmit time, AnswerFast4 fallback detect time )+Conventional setup after IMLS. Of course, there can be other variations, modifications, and alternatives.

Depending upon the specific embodiment, certain delay time may be reduced. That is, the present method and system provides for a reduced fallback time, which is often significantly less than 0.5 RTD. Of course, there can be other variations, modifications, and alternatives.

The above sequence of steps provides method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

An alternative method for communicating between two terminals using an interleaved mobile level flag sequence is provided below.
1. Entity A transmits one (or more) AnswerFast4 frames to entity B;
2. Entity B transmits one (or more) AnswerFast4 frames to entity A;
3. Entity A transmits a block of mobile level flags to entity B;
4. Entity B transmits a block of mobile level flags to entity A;
5. Entity A detects the AnswerFast4 frames from entity B (while mobile level flags are ignored) [Time at 0.5 RTD];
6. Entity B detects the AnswerFast4 frames from entity A (while the mobile level flags are ignored) [Time at 0.5 RTD];
7. Each entity acts on the AnswerFast4 preferences (No conventional negotiations take place);
8. An overall delay to seeing media is worst of the two entities IMLS point [0.5 RTD with tunneled media, 1.0 RTD without tunneled media]; and
9. Perform other steps, as desired.

The above sequence of steps provides method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

The media transmitted before receiving an indication from the other side in a tunneled fashion arriving at a time around 0.5 RTD would preferably be selected from a profile of expected configurations/pre-configurations. Media sent on these configured/preconfigured profiles/channels could then be of several limited types that are expected and more likely to result in an established session and a very fast channel set up. The media need to be tunneled, but by tunneling/encapsulating the media with certain preference information the media upon reception is known to be decodable (by the receiver, if it is acceptable) and also if it is the only acceptable type coming in (so that if more than one type is to be received then a best can then be selected if the preferences are known). Also, concurrency of preference information and preferences removes the need to have buffering at the receiver on a channel whilst the preference information arrives.

The media transmitted in the tunneled fashion may also not be in a profile, and instead just be transmitted in a most preferred mode by the transmitter, this allows for greater feature expression by the transmitter but may result in a higher chance of failure. Feature removal based on the preferences of a peer may be applied to bring the transmissions into line with the acceptable transmissions, however if the receiver could not decode its initial pre-negotiation media then the benefit of sending the pre-negotiation media is not achieved.

Figure 35:
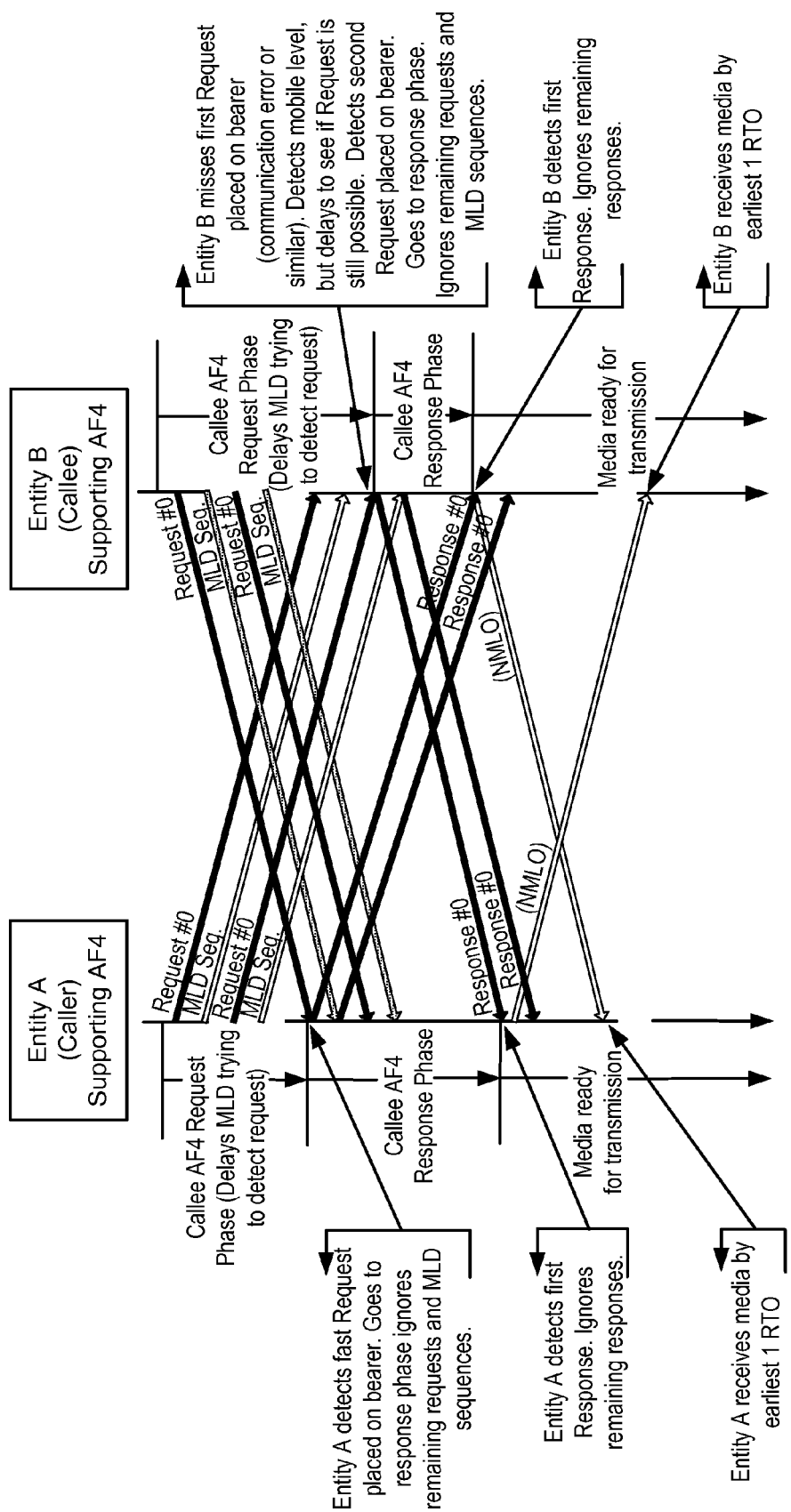
FIG. 35 illustrates an example of an alternative example of a communication flow using an interleaved sequence using mobile level stuffing sequences according to an alternative embodiment of the present invention.

FIG. 35 illustrates an example of an alternative example of a communication flow using an interleaved sequence using mobile level stuffing sequences according to an alternative embodiment of the present invention. This diagram is merely an example, which should not unduly limit the scope of the claims herein. One of ordinary skill in the art would recognize many variations, modifications, and alternatives. An alternative method for communicating between two terminals using an interleaved mobile level flag sequence is provided below. As shown, entity A transmits one (or more) AnswerFast4 frames to entity B. Entity B transmits one (or more) AnswerFast4 frames to entity A.

Next, certain mobile level flags are interleaved into the sequence. That is, entity A transmits a block of mobile level flags to entity B and entity B transmits a block of mobile level flags to entity A. Depending upon the embodiment, there can also be other blocks of flags that are inserted or combined with any of the above flags and AnswerFast4 frames. Of course, there can be other variations, modifications, and alternatives.

In a specific embodiment, each of the entities can support the AnswerFast4 frames. Entity A detects the AnswerFast4 frames from entity B (while mobile level flags are ignored) [Time at 0.5 RTD]. Entity B detects the AnswerFast4 frames from entity A (while the mobile level flags are ignored) [Time at 0.5 RTD]. Each entity acts on the AnswerFast4 preferences using the AnswerFast4 preferences to establish an initial mode of operations for each of the entities. Here, no conventional negotiations take place according to a specific embodiment. As shown, an overall delay to seeing media is worst of the two entities IMLS point. That is, round trip delay is 0.5 RTD with media sent in the AnswerFast4 message and 1.0 RTD with media not sent until after mode determination. Of course, there can be other variations, modifications, and alternatives.

The above sequence of steps provides a method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

An alternative method for communicating between two terminals using an interleaved mobile level flag sequence is provided below.
1. Entity A transmits one (or more) AnswerFast4 frames to entity B comprising media;
2. Entity B transmits one (or more) AnswerFast4 frames to entity A comprising media;
3. Entity A transmits a block of mobile level flags to entity B;
4. Entity B transmits a block of mobile level flags to entity A;
5. Entity A detects the AnswerFast4 frames from entity B and the media (while mobile level flags are ignored) [Time at 0.5 RTD];
6. Entity B detects the AnswerFast4 frames from entity A and the media (while the mobile level flags are ignored) [Time at 0.5 RTD];
7. Each entity acts on the AnswerFast4 preferences and possibly on the media if it is acceptable to the receiver (In this embodiment, no conventional negotiations take place);
8. An overall delay to seeing acceptable media is the worst of the two entities IMLS point [0.5 RTD if tunneled media is acceptable to receiver, 1.0 RTD if tunneled media is not acceptable to the receiver]; and
9. Perform other steps, as desired.

The above sequence of steps provides a method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 36:
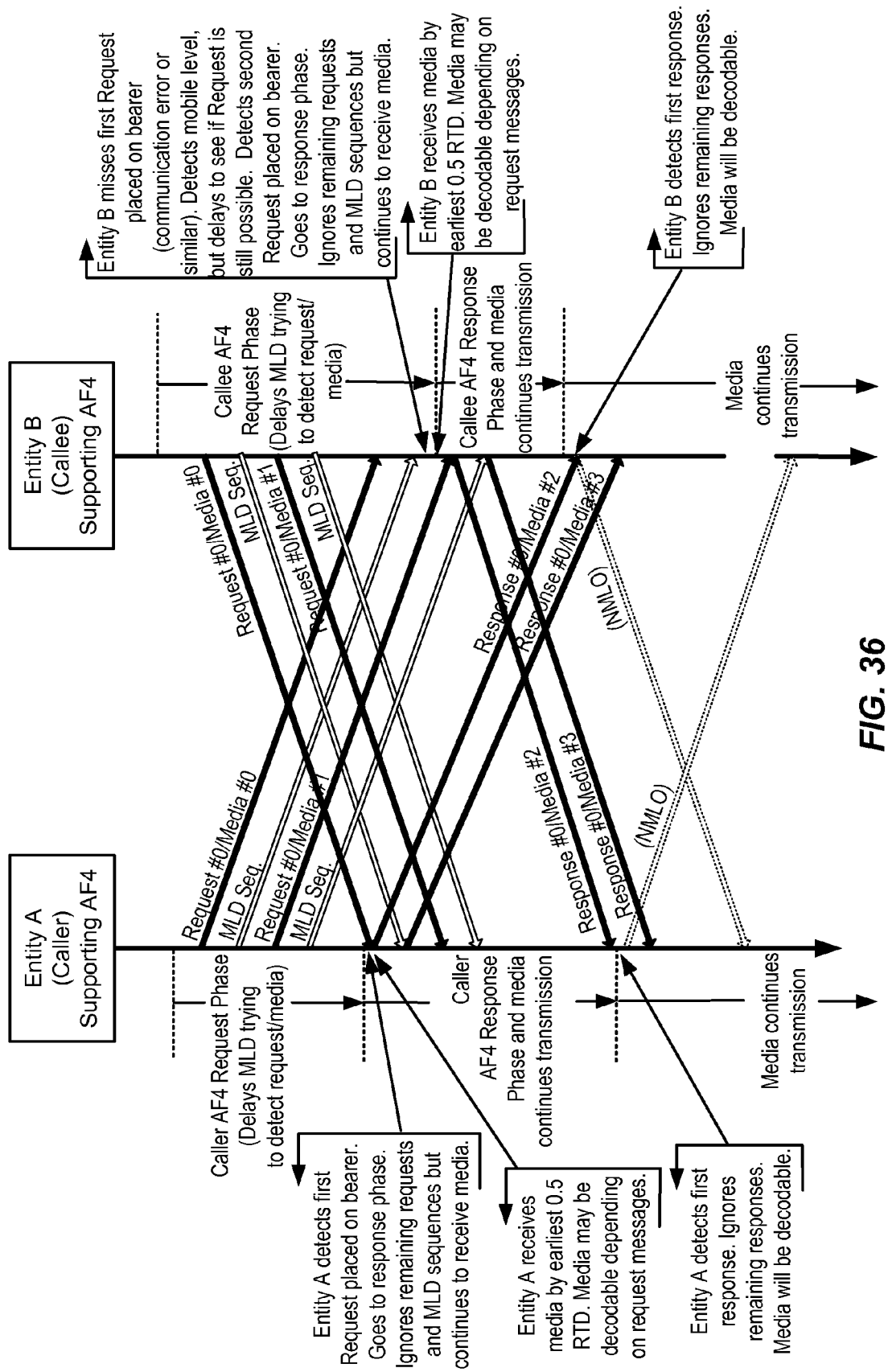
FIG. 36 illustrates an example of a further alternative example of a communication flow using an interleaved sequence with media using mobile level stuffing sequences according to an alternative embodiment of the present invention.

FIG. 36 illustrates an example of an alternative example of a communication flow using an interleaved sequence including media using mobile level stuffing sequences according to an alternative embodiment of the present invention. This diagram is merely an example, which should not unduly limit the scope of the claims herein. One of ordinary skill in the art would recognize many variations, modifications, and alternatives. An alternative method for communicating between two terminals using an interleaved mobile level flag sequence is provided below. As shown, entity A transmits one (or more) AnswerFast4 frames to entity B comprising media. Entity B transmits one (or more) AnswerFast4 frames to entity A comprising media.

Next, certain mobile level flags are interleaved into the sequence. That is, entity A transmits a block of mobile level flags to entity B and entity B transmits a block of mobile level flags to entity A. Depending upon the embodiment, there can also be other blocks of flags that are inserted or combined with any of the above flags and AnswerFast4 frames. Of course, there can be other variations, modifications, and alternatives.

In a specific embodiment, each of the entities can support the AnswerFast4 frames with media. Entity A detects the AnswerFast4 frames from entity B (while mobile level flags are ignored) [Time at 0.5 RTD]. Entity B detects the AnswerFast4 frames from entity A (while the mobile level flags are ignored) [Time at 0.5 RTD]. Each entity acts on the AnswerFast4 preferences using the AnswerFast4 preferences and the media, if it is acceptable to the receiver, to establish an initial mode of operations for each of the entities. Here, no conventional negotiations take place according to a specific embodiment. As shown, an overall delay to seeing media is worst of the two entities IMLS point. That is, round trip delay is 0.5 RTD. Of course, there can be other variations, modifications, and alternatives.

The above sequence of steps provides a method according to an embodiment of the present invention. As shown, the method uses a combination of steps including a way of establishing communications between two terminals using an interleaved mobile level detection technique according to a specific embodiment. Preferably, the present method establishes communications using a desired preference mode of operation in a faster manner than conventional techniques. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Additionally, although certain methods and systems of the above description has been provided in terms of the AnswerFast4 communication format, there can be various modifications, alternatives, and variations. That is, other types of communication formats may be used, depending upon the specific embodiment. Additionally, the present method and system for interleaving the mobile levels can be used at any time during the communication session and are not limited to a time period associated with establishing the communication session. Of course, one of ordinary skill in the art would recognize other variations, modifications, and alternatives.

According to embodiments of the present invention, the FSS procedure for reducing session setup time is simplified, retaining the ability to expand it in the future. For example, the establishment of a typical videotelephony session between two H.324M terminals requires the completion of several procedures such as mobile level detection and H.245 messaging. The introduction of faster session setup techniques into H.324 will make setup times consistent with similar protocols (H.323 and SIP) and will significantly enhance the user experience.

In an embodiment, a Bearer-based FSS procedure is provided. Embodiments of the present invention provide the FSS procedure as an alternative procedure for establishing an audio and video communication session in H.324. Following this procedure, a terminal transmits the preferred operation mode as the first bits on the bearer channel. These bits are prevented from emulating existing mobile level flags, including the base-line H.324 mode, so they are ignored by existing terminals, maintaining interoperability. The procedure allows significant reduction of the session setup time.

Throughout the present specification, a number of terms of art are utilized. Some of these terms of art are defined as follows: inferred common mode (ICM): The media mode determined by both terminals based on the local profile request and peer profile request (always the same for both terminals); normal mobile level operation (NMLO): The normal operation of the H.223 multiplexer on the bearer channel. This is Phase E of H.324; and simultaneous determination: An FSS procedure mode whereby both terminals determine the common mode for media channels (ICM) from their respective request messages.

Format Conventions

The numbering, field mapping and bit transmission conventions used herein are consistent with those used in ITU-T V.42 and 3.2/H.223.

| Symbols and Abbreviations | |
|---|---|
| FEA | Frame Emulation Avoidance procedure |
| FI | Frame Information |
| FSS | Fast Session Setup |
| PSR | FSS Payload Segmentation and Reassembly |
| MDU | Message Data Unit |
| PDU | Protocol Data Unit |

The FSS procedure is made in the following steps: (1) FSS Phase; (2) Media Exchange Phase. A terminal may interrupt the FSS Phase by transmitting standard mobile level sequence flags and continue with normal level setup procedure.

Frames & Synchronization Flags

The FSS frames are octet aligned and have the structure shown in Table 13.

TABLE 13

H.324 - Structure of the Fast Session Setup frames.

Frame Information (FI) (1 octet)
Reserved (Always 0x00) (1 octet)
Payload Length (PL) (0 or 1 octet)
Payload
(0 or more octets up to 150 octets)
CRC (2 octets)

The Frame Information (FI) bit allocation is shown in Table 14. Bit 8 is reserved and shall be set to 1. Bit 7 represents the Last Segment (LS) flag, and the three following bits represent the Segment Sequence Number (SSN). The three least significant bits are reserved and shall be set to 0. The use of LS and SSN are specified in the PSR procedure.

TABLE 14

H.324 - Structure of the Fast Session Setup Frame Information (FI) field.

| 8 | 7 | 6 | 5 | 4 | 3 | 2 | 1 | |
|---|---|---|---|---|---|---|---|---|
| 1 | LS | SSN3 | SSN2 | SSN1 | 0 | 0 | 0 | Octet 1 |

The Payload Length (PL) field indicates the payload size in octets before the application of the Frame Emulation Avoidance (FEA) procedure. The FSS frame payload (FSS-PDU) shall not exceed 150 octets. The receiver shall support overall FSS-MDU payload length of up to 1050 octets excluding octets inserted during FEA.

The Payload corresponds to an H.245 genericRequest message as defined in "Object Identifier Assignment for Fast Session Setup Procedure," which is encoded according to Packed Encoding Rules (PER) as defined in ITU-T Rec. X.691.

The CRC (cyclic redundancy check) field is 16 bits and is determined by applying the CRC described in 8.1.1.6.1/V42 to the entire frame, excluding the FSS Synchronization Flags and before FEA. On detecting a CRC error, the corresponding FSS frame shall be discarded.

The FSS Synchronization Flag is defined as shown in Table 15.

TABLE 15

H.324 - Structure of the FSS Synchronization Flag.

| 0xA3 | 1 0 1 0 | 0 0 1 1 |
| 0x35 | 0 0 1 1 | 0 1 0 1 |

One FSS Synchronization Flag shall be inserted immediately before and after each FSS Frame. Only one FSS Synchronization Flag shall exist between two consecutive FSS Frames.

Payload Segmentation and Reassembly (PSR) Procedure

This procedure is identical to CCSRL procedure in C.8.1/H.324 with the following modifications:

FSS LS flag shall be used in place of CCSRL LS. LS shall be set to 1 on the FSS-PDU containing the last segment of an FSS-MDU. It shall be set to 0 otherwise.

The SSN shall be set to 0 for the first segment and monotonically incremented for each segment, the maximum value of SSN shall be 6. The value 7 is reserved.

Flag Emulation Avoidance

Before transmitting an FSS frame onto the bearer, an FEA procedure shall be performed against synchronization flags for all mobile levels of H.324. Frame Information, Sequence Number, Payload Length, Payload and CRC are included in the FEA procedure. All octets with values 0xA3, 0x35, 0xE1, 0x4D, 0x1E, 0xB2, 0x19, 0xB1 and 0xC5 shall be duplicated by inserting adjacently an octet with the same value. The value 0x7E shall have inserted adjacently an octet with the value 0xC5.

Mobile Flags Interleaving

A terminal may transmit up to 10 stuffing sequences of its highest supported mobile level, as described in C.6.1H.324, between FSS Frames. For mobile level 0, up to 20 flags may be inserted.

FSS Profile Exchange

Once the bearer is established, if a terminal supports FSS, it shall immediately send an FSS Request frame. The frame should be repeated until an FSS Request frame is detected, or one of the conditions in "Fast Session Setup Fallback Procedure Specification" is fulfilled. For the latter case, the procedure in the "Fast Session Setup Fallback Procedure Specification" shall be followed. When an FSS Request is detected and the payload is decoded successfully, the terminal accepts it by beginning the exchange and processing of media data as determined by the ICM at NMLO using the agreed mobile level.

For the master-slave determination, when the terminalType fields in the FSS Request frames of the two terminals are identical the caller shall be the master. When the terminalType fields differ, the terminal which has higher terminalType value shall be the master. Unexpected FSS frames shall be ignored.

Logical Channel Numbers

Logical channel numbers are assigned by the message originator in H.245 OpenLogicalChannel request messages contained in mediaProfile. For the case of bidirectional logical channels, the reverse logical channel number shall be the same as the forward logical channel number.

Symmetric Logical Channel Operation

Logical channels having symmetric codec capability shall include H.245 OpenLogicalChannel request message with reverseLogicalChannelParameters of the same dataType with the same logical channel number.

Multiplex Table Entries

The logical channel number shall be mapped to H.223 multiplex entry index. For example, if logical channel 1 is opened, multiplex entry index 1 will be associated to this logical channel as "{LCN1, RC UCF}". For reverse logical channels, the logical channel number shall be mapped to multiplex entry index at the H.223 demultiplexer.

Fast Session Setup Fallback Procedure Specification

A fallback procedure shall be used by a FSS terminal to switch to normal operation mode. During fallback, a terminal shall stop transmitting FSS frames, ignore the FSS outcome and continue using normal start up procedures. The following conditions shall initiate fallback:

More than 10 valid consecutive mobile level stuffing flags are detected, as described in C.6/H.324. At mobile level 0, the number of consecutive flags shall be more than 20.

A normal start up procedure with a normal H.245 TerminalCapabilitySet message as the first non-empty H.223 MUX-PDU at an agreed initial mobile level is detected, regardless of whether the terminal has completed the FSS procedure.

If a terminal does not detect a valid FSS frame or normal start up procedure within a multiple of the timer T401.

Terminal Procedures

The steps for provision of communication are as listed in clause C.5/H.324 with the following modifications:

Phase D: Fast Session Setup phase, as specified herein, is inserted before the level setup procedure. If FSS is completed successfully, H.245 message exchange is skipped and opened logical channels operate immediately. If FSS fallback occurs, the connection continues from initial mobile level setup phase.

Object Identifier Assignment for Fast Session Setup Procedure

| Object Identifier Value | Clause Reference |
|---|---|
| {itu-t(0) recommendation(0) h(8) 324 generic-capabilities(1) fastSessionSetup(0) explicit profile (2)} | |

| | |
|---|---|
| Parameter name: | profileVersion |
| Parameter description: | Version number. |
| Parameter identifier value: | 1 |
| Parameter status: | Mandatory |
| Parameter type: | unsignedMin |
| Supersedes: | — |

| | |
|---|---|
| Parameter name: | terminalType |
| Parameter description: | Terminal type as defined in 7.4/H.324. |
| Parameter identifier value: | 2 |
| Parameter status: | Mandatory |
| Parameter type: | unsignedMax |
| Supersedes: | — |

| | |
|---|---|
| Parameter name: | mobileLevel |
| Parameter description: | First octet indicates initial mobile level. Second octet: MSB indicates using H.223 Annex A double flag mode; next bit indicates using H.223 Annex B optional header mode; other bits are reserved and shall be set to 0. Other octets shall be ignored. |
| Parameter identifier value: | 3 |
| Parameter status: | Mandatory |
| Parameter type: | octetString |
| Supersedes: | — |

| | |
|---|---|
| Parameter name: | mediaProfile |
| Parameter description: | One or more H.245 OpenLogicalChannels specifying media channel preferences. Other H.245 ASN.1 structures may be appended such as UserInputIndication. |
| Parameter identifier value: | 4 |
| Parameter status: | Optional |
| Parameter type: | octetString |
| Supersedes: | — |

Additional AnswerFast Variant Example Embodiment

Embodiments of the present invention provide methods and systems that serve as additions to existing standards. As described more fully throughout the present specification, FSS/MOS procedures are inserted before, or concurrently with, the conventional level setup procedure. If the FSS/MOS procedure is completed successfully, H.245 message exchange may be skipped and opened logical channels operate immediately. If FSS fallback occurs, the connection continues from the level setup procedure.

FSS Profile Exchange

According to one embodiment, a procedure for establishing a call includes, once the bearer is established, if a terminal supports FSS, sometimes referred to as the Signaling Preconfigured Channel (SPC), the terminal will send its FSS Request. In some applications, the FSS Request, which may also be referred to as a Media Oriented Setup (MOS) request, is sent immediately. Then Request transmissions will typically be repeated until an FSS Request is detected, or one of the conditions for fallback is fulfilled (where the fallback procedures are followed).

According to an embodiment of the present invention, the FSS (or MOS) Capability Identifier is defined as shown in Table 16.

TABLE 16

| | |
|---|---|
| Capability name: | mos |
| Capability class: | Control capability. |
| Capability identifier type: | Standard. |
| Capability identifier value: | {itu-t(0) recommendation(0) h(8) 324 generic-capabilities(1) mona(2) mos(1)} |

When an FSS Request is detected and decoded successfully, the terminal accepts it by beginning the transmission and processing of media data as determined by the ICM at NMLO using the agreed mobile level. In an embodiment, a MOS requestAck shall be sent on receiving every MOS Request.

For the master-slave determination, when the terminalType fields in the FSS Request of the two terminals are identical, the caller shall be the master. When the terminalType fields differ, the terminal which has higher terminalType value shall be the master. When the terminalType fields in the MOS Request of the two terminals are identical, and the two terminals have different values of caller field, the caller shall be the master. If the caller fields are identical, the terminalType and statusDeterminationNumber fields in the MOS Request of the two terminals are used according to the Master-slave determination procedure in C.2/H.245 and in an inferred manner without additional H.245 signaling. Generally, unexpected FSS-SDUs shall be discarded.

If the above FSS/MOS procedure is completed successfully, H.245 message exchange is skipped, or at least is not required to establish the session, and opened logical channels operate immediately. The procedure is shown in FIG. 22. It should be noted that the channels established through the FSS/MOS procedure operate immediately on their determined multiplexer entries and require no special framing.

Logical Channels

A terminal indicates its requested logical channels by listing H.245 OpenLogicalChannel (OLC) requests according to an order of preference in mediaProfile. The requests shall be processed in the same order. Logical channel numbers (LCNs) are assigned by the message originator. OLC requests with the same LCN indicate alternative media capabilities for the logical channel.

Terminal capability sets for both terminals are inferred from the combination of mediaProfiles from local and remote. Multiple OpenLogicalChannel entries with the same LCN correspond to a series of alternative capability descriptor entry; OpenLogicalChannels with different LCNs correspond to simultaneous capability descriptor entries. The capability direction is set to receive capability (e.g. receiveVideoCapability, receiveAudioCapability) unless symmetric is set, where the capability direction is set to receive and transmit capability (e.g. receiveAndTransmitVideoCapability, receiveAndTransmitAudioCapability).

The set of capability descriptors is derived with the same order of preference as the order in mediaProfile, and includes by default an instance of each logical channel type. The remote terminal is assumed to support all adaptation layers (AL1, AL2 and AL3) for all media categories (audio, video and data). Other settings in the TerminalCapabilitySet adopt the corresponding recommended values specified in 3GPP TR26.110, H.324, H.245 and H.223.

Codecs are selected in the same way as normal H.245 message exchanges, deduced according to capability preferences and media mode conflict resolution as in B.2.2.2/H.324 and C.4.1.3/H.324. Channels are considered open following the computation of the inferred mode. The peer's channel is selected by reversing the TCS inputs to the selection algorithm. An example of ICM is illustrated in Table 17, which illustrates an example that does not have symmetric codecs set.

TABLE 17

| Entity A (Master) | Entity B (Slave) |
|---|---|
| Transmitted | Transmitted |
| LCN1: AMR Tx, AL2 | LCN1: AMR Tx, AL2 |
| LCN2: MPEG4 Tx, AL2 | LCN1: G.723.1 Tx, AL2 |
| LCN2: H.263 Tx, AL2 | LCN2: H.263 Tx, AL2 |
|  | LCN2: MPEG4 Tx, AL2 |
| Inferred | Inferred |
| LCN1, AMR Tx, AL2 | LCN1: AMR Tx, AL2 |
| LCN2: H.263 Tx, AL2 | LCN2: MPEG4 Tx, AL2 |

In the example illustrated in Table 17, each entity selects media channels most preferred for reception by its peer entity. Both entities prefer AMR. Entity A prefers to receive MPEG4-Video while entity B prefers to receive H.263.

Table 18 illustrates another example of ICM in which symmetric codecs are set.

TABLE 18

| Entity A (Master) | Entity B (Slave) |
|---|---|
| Transmitted | Transmitted |
| LCN1: AMR Tx, AL2 | LCN1: AMR Tx, AL2 |
| LCN2: MPEG4 Tx, AL2 | LCN1: G.723.1 Tx, AL2 |
| LCN2: H.263 Tx, AL2 | LCN2: H.263 Tx, AL2 |
|  | LCN2: MPEG4 Tx, AL2 |
| Inferred | Inferred |
| LCN1, AMR Tx, AL2 | LCN1: AMR Tx, AL2 |
| LCN2: MPEG4 Tx, AL2 | LCN2: MPEG4 Tx, AL2 |

In the example illustrated in Table 18, each entity selects media channels most preferred for reception by its peer entity. Both entities prefer AMR. Entity A prefers to receive MPEG4-Video while entity B uses MPEG4-Video in symmetry to the master.

For bidirectional logical channels, the reverse LCN shall be the same as the forward LCN. For example, if Terminal A desires Audio OLC on 1 and Video bidirectional on 2 (forward and reverse, which will dominate) and Terminal B desires Audio OLC on 1 and Video is OLC on 3 (irrelevant for this example though), the result is:

Terminal A transmits audio on 1

Terminal B transmits audio on 1

Terminal A transmits video on 2

Terminal B transmits video on 2, with the terminals receiving have inferred the same result. The channel numbers eventuated upon is assigned by the message originator.

If a reverse LCN is already assigned, the next available LCN shall be assigned. An example of this behavior is: Terminal A desires Audio OLC on 1 and Video bidirectional on 2 (forward and reverse, which will dominate) and Terminal B desires Video is OLC on 1 (irrelevant for this example though) and Audio OLC on 2. The audio channel from 2 will clash with the video logical channel number desired in the reverse direction of the bidirectional request.

The result in this example is:
Terminal A transmits audio on 1
Terminal B transmits audio on 2
Terminal A transmits video on 2 (with reverse on 3)
Terminal B transmits video on 3 (using reverse of Terminal A), and the terminals receiving have inferred the same result.

This takes place as the channel number is assigned by the message originator, but if an LCN is already assigned, the next available LCN is assigned. So in this case, A wanted reverse video on 2, but B had already assigned 2 to audio, so the reverse video is increased by one to the next available LCN.

In an embodiment, the highest LCN shall be 14, and any OLC requests that lead to LCN exceeding 14 shall be ignored. In other embodiments, the highest LCN shall be 13, and any OLC requests that lead to LCN exceeding 13 shall be ignored. If ICM contains an H.223 adaptation layer type not supported by a terminal, the terminal shall fallback.

It should be appreciated that the specific steps illustrated in the described embodiment provide a particular method of reducing a call setup time for a call between a pair of H.324-like terminals according to an embodiment of the present invention. Other sequences of steps may also be performed according to alternative embodiments. For example, alternative embodiments of the present invention may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

According to another embodiment of the present invention, a method of making a master-slave determination during a call setup procedure between a call between a pair of H.324-like terminals coupled to a telecommunications network is provided. The method includes transmitting a first set of parameters from the first terminal to the second terminal. The first set of parameters includes at least a first terminalType field, a first caller field, and a first statusDeterminationNumber field. In a specific embodiment, transmitting the first set of parameters is performed prior to transmitting an H.245 message from the first terminal the second terminal. Additionally, the first set of parameters may be included in a preference message transmitted directly on a bearer.

The method also includes receiving a second terminalType field transmitted from the second terminal to the first terminal. The second set of parameters includes at least a second terminalType field, a second caller field, and a second statusDeterminationNumber field. The method further includes utilizing an inference algorithm to make the master-slave determination.

According to a particular embodiment of the present invention, the inference algorithm includes defining the first terminal as a master terminal if a value of the first terminalType field is greater than a value of the second terminalType field and defining the second terminal as the master terminal if the value of the first terminalType field is less than the value of the second terminalType field. If the value of the first terminalType field is equal to the value of the second terminalType field, the inference algorithm includes defining the first terminal as the master terminal if the first caller field indicates that the first terminal is the caller and the second caller field indicates that the second terminal is not the caller and defining the second terminal as the master terminal if the second caller field indicates that the second terminal is the caller and the first caller field indicates that the first terminal is not the caller.

In another particular embodiment, the inference algorithm further includes defining the first terminal as the master terminal if the first statusDeterminationNumber is greater than the second statusDeterminationNumber and defining the second terminal as the master terminal if the first statusDeterminationNumber is less than the second statusDeterminationNumber.

In some embodiments, the process of making the master-slave determination is performed without transmitting an acknowledgement message from the first terminal to the second terminal indicating the master-slave determination. The acknowledgement message may include a MasterSlaveDetermination Ack message. The pair of H.324-like terminals may include a 3G-324M terminal, for example, a 3G-324M gateway or a 3G-324M handset.

It should be appreciated that the specific steps illustrated in the described embodiment provide a particular method of making a master-slave determination during a call setup procedure according to an embodiment of the present invention. Other sequences of steps may also be performed according to alternative embodiments. For example, alternative embodiments of the present invention may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

Multiplex Table Entries

The logical channel number shall be mapped to H.223 multiplex entry index. For example, if logical channel 1 is opened, multiplex entry index 1 will be associated to this logical channel as "(LCN1, RC UCF}". For a reverse logical channel, the logical channel number shall be mapped to multiplex entry index at the H.223 demultiplexer. Explicit multiplex table entries may be set using additionalInfo parameter. Alternate multiplex entries may be signaled similarly as assigning LCNs for alternative media capabilities. It should be noted that outgoing LCNs specified in explicit multiplex table entries for transmission are not expected to be changed. Additionally, it should be noted that for alternative logical channels of {AMR, G.723.1} with LCN 3 and {H.263, H.261} with LCN 2, additional multiplex entries may be set as follows:

Index 5: (empty); Index 5: {LC 3, RC 22}, {LC2, RC UCF}

Index 7: {LC 3, RC 32}, {LC2, RC UCF}; Index 7: {LC 3, RC 25}, {LC2, RC UCF}

Index 8: {LC 3, RC 7}, {LC2, RC UCF}

This represents when AMR is selected, multiplex entries are: Index 7: {LC 3, RC 32}, {LC2, RC UCF}; Index 8: {LC 3, RC 7}, {LC2, RC UCF}; when G.723.1 is selected, multiplex entries are: Index 5: {LC 3, RC 22}, {LC2, RC UCF}; Index 7: {LC 3, RC 25}, {LC2, RC UCF}.

According to some embodiments of the present invention, a fallback procedure is used by a terminal to switch to an alternate phase of normal operation mode. Fallback in some embodiments may be further caused under the additional conditions shall also initiate a fallback from MOS:

A normal H.245 TerminalCapabilitySet message with empty genericControlCapability containing MOS OID after completion of the MOS procedure.

A terminal does not detect a valid MOS request, or does not accept the ICM, within a multiple of the network round trip delay (RTD) period. Typically, 3 RTDs is adopted.

The situation where both terminals are the same with respect to caller and callee, have the same terminalType and the same statusDeterminationNumber.

Figure 37:
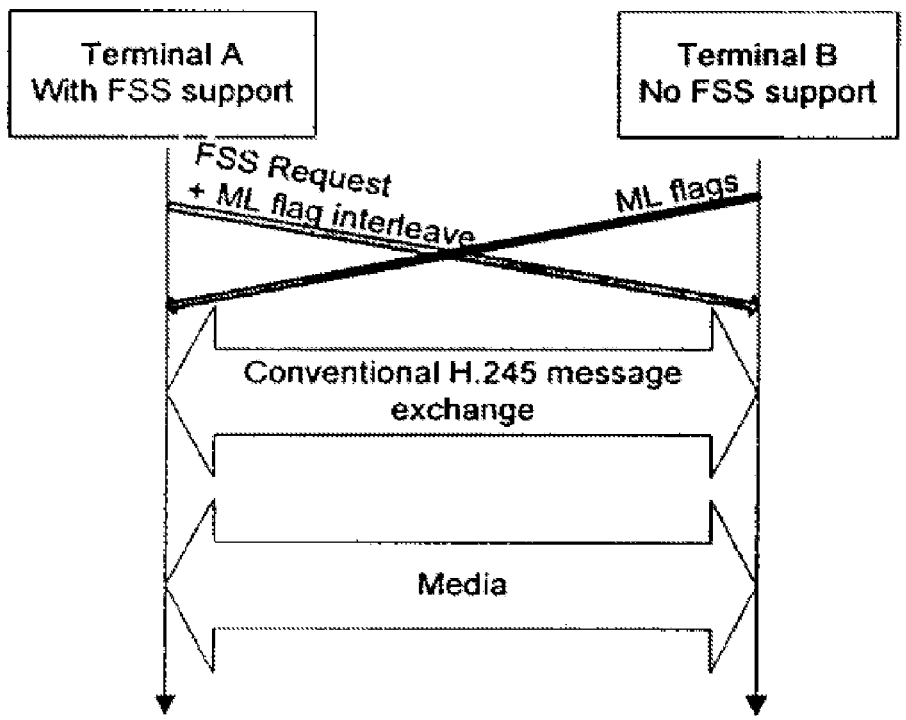
FIG. 37 is a simplified diagram illustrating a fallback procedure according to an embodiment of the present invention.

During fallback, a terminal will stop transmitting FSS frames, ignore the FSS outcome, and follow normal start up procedures as defined in H.324 Annex C. A number of conditions may initiate fallback. For example, detecting more than 20 valid consecutive mobile level stuffing flags as described in C.6/H.324 will result in initiation of a fallback procedure. Moreover, a normal start up procedure with detection of a normal H.245 TerminalCapabilitySet message as the first non-empty H.223 MUX-PDU at an agreed initial mobile level before completion of the FSS procedure, or a normal H.245 TerminalCapabilitySet message with empty genericControlCapability containing FSS OID after completion of the FSS procedure will result in initiation of a fallback procedure. Furthermore, if a terminal does not detect a valid FSS request, or does not accept the ICM, within a multiple of the network round trip delay (RTD) period, a fallback procedure will be initiated. As an example, a period of 3 RTDs will result in the initiation of a fallback procedure. FIG. 37 is a simplified diagram illustrating a fallback procedure according to an embodiment of the present invention.

FIG. 38 and FIG. 39 provide a listing of FSS/MOS parameters utilized in embodiments of the present invention. Embodiments of the present invention also utilize the MOS Ack Capability Identifier and the MOS Ack Parameter-requestAck as defined in H.324 Annex K.

AnswerFast4 Frames & Synchronization Flags

FIG. 24 is a simplified illustration of the structure of an AnswerFast4 frame according to an embodiment of the present invention. As illustrated in FIG. 24, the AnswerFast4 request and response frames are octet aligned. Accordingly, AnswerFast4 message transmissions are octet aligned, allowing for compatibility with conventional transmissions of other mobile levels.

The Frame Information (FI) bit allocation is shown in Table 19. Bit 8 is reserved and shall be set to 1. Bit 7 represents the Last Segment (LS) flag, and the three following bits represent the Segment Sequence Number (SSN). The three least significant bits are reserved and shall be set to 0. The use of LS and SSN are specified in the section on the Payload Segmentation and Reassembly (PSR) Procedure.

TABLE 19

| 8 | 7 | 6 | 5 | 4 | 3 | 2 | 1 | |
|---|---|---|---|---|---|---|---|---|
| 1 | LS | SSN3 | SSN2 | SSN1 | 0 | 0 | 0 | Octet 1 |

According to an embodiment, the FI field of the AnswerFast4 frame has the values shown in Table20:

TABLE 20

| Frame Information (FI) | Description |
|---|---|
| 0x00 | Request Frame |
| 0x01 | Response Frame |
| 0x02 . . . 0x7F | Reserved |
| MSB of Frame Info | 1 -> Payload length present & Payload length >= 1. 0 -> Payload length is not present. No payload |

The payload length field indicates the payload size before applying emulation insertion octets. The messages can be optimized for size by use of a payload present indicator, that if not present would leave the message at a minimum size. If payload were present, a payload present indicator, a payload length and a payload would all be included in the message.

In general, the payload can be of any length. In some applications, the frame information is configured to limit the payload to 150 octets, as in many networks, frames are transmitted and processed in 160 octets time-slots. Depending on the network configuration, the payload length will be varied as appropriate to the particular applications.

The messages can also be used for differing purposes depending on certain values in a header field. Different message types, such as Request, Response or Command and Indication, or media could be indicated. Also, sequence numbers or segment indicators could also be used for error resiliency and protocol use.

The Payload corresponds to an FSS-SDU or an FSS-SDU segment. FSS-SDU corresponds to an H.245 genericRequest message (using GenericMessage) as defined more fully in FIG. 38 and FIG. 39, and is encoded as H.245 MultimediaSystemControlMessage according to Tacked Encoding Rules (PER) as defined in ITU-T Rec. X.691.

Referring once again to FIG. 24, the Cyclic Redundancy Check (CRC) field is 16 bits in length and is determined by applying a CRC to the entire frame excluding the AnswerFast4 Sync Flags. In an embodiment, the CRC is as described in accordance with 8.1.1.6.1/V.42. On detecting a CRC error, undefined Frame Information, or undefined Reserved bits, the corresponding FSS frame will be discarded.

Error detection or error correction can be added to AnswerFast4 messages if desired. Error correction could be used with a Forward Error Correction code similar to those already used in H.324 for higher multiplexer levels and a modification to the message allowing transmission of the required information. Error detection could be implemented using a cyclic redundancy check. The CRC value could be transmitted in the message in a specified field.

Multiplexer synchronization flag emulation protection may be performed on AnswerFast frames to ensure the entire message appears as noise and/or unwanted data on the bearer. This ensures that any transmissions are not misinterpreted by legacy devices as conventional transmissions such as level detect. It also affords the ability to invisibly transmit AnswerFast4 messages during a session through another legacy device, such as a gateway, that may be capable of intercepting legacy transmissions.

Before sending the frame to the bearer, an emulation insertion procedure is performed. The fields with Payload Length, Payload, and CRC are applied with an emulation insertion procedure. In an embodiment, all octets with values 0xA3, 0x35, 0xE1, 0x4D, 0x19, 0xB1 and 0x7E are duplicated by 1 octet with the same value.

Once both terminals detect an AnswerFast4 Request message, they will determine the media or media modes. When an AnswerFast4 Response message is in use, and when a terminal can successfully determine the media mode according to the media preference, AnswerFast4 Response can be sent. Again, the AnswerFast4 Response message is optional, and can be used as a confirmation in some situations, for example, if a terminal such as a gateway prefers to confirm the media codec selections prior to proceeding with a session. Another situation in which a Response is used is if the AnswerFast4 Request contains some application specific information request, for example, an encryption key.

There are many ways that a media mode can be determined according to the preferences and capabilities expressed from each device. If preferences resemble H.245 preferences (e.g. expressed by TCS, OLCs, and the like) codecs may be selected in the same way as normal H.245 message exchanges except that transactions are conducted implicitly till the final outcome. This technique forms an ICM and it may be deduced according to capability preferences and media mode conflict resolution as specified in B.2.2.2 and C.4.1.3 in H.245. In some embodiments, the ICM provides methods and techniques in which a unique non-conflicting media mode is determined by both terminals based on media preferences contained in a local profile request and a peer profile request. In a specific embodiment, the media preferences contained in the local profile request and the peer profile request are the same for both terminals.

Many other restrictions and rules sets for determining media mode are also possible, and some may be made over fewer variable characteristics. If profiles are used, then a simple matching of capabilities in preferred order could be conducted. For example if audio profiles 0x0000, 0x0100, 0x1000 are supported by a device, and it receives indication that a peer device supports only 0x01000, then 0x0100 would be selected. For the case where more than one profile capabilities are common to the devices, a preference selection will be made. An example of a preference rule would be to assign preference to the order in which the profiles are expressed. This preference order could be forward or reverse, and could be modified by other inputs. Another rule could be to select a preference based on index, either highest or lowest. For example if audio profiles 0x0000, 0x0100, 0x1000 are supported by a device, and it receives indication that a peer device supports 0x0000 and 0x01000, then 0x0100 could be selected by a rule using a highest index rule. One of ordinary skill in the art would recognize many variations, modifications, and alternatives.

Once a terminal detects an AnswerFast4 Request message, it can determine configurations (media/data/multiplexer modes) for both itself and the remote device according to the preferences received and the preferences it will transmit or has transmitted. The determination of configuration can be made from the input/presence of the AnswerFast4 message and a set of predefined rules. These rules may be predefined or predetermined based on some input, or may be simple rules based on explicit messages. Rules may, or may not, re-use rules that already exist in a device presently, such as H.245 most preferred mode.

The AnswerFast4 Sync Flag is defined as illustrated in Table 21.

TABLE 21

| 0xA3 | 1 0 1 0 | 0 0 1 1 |
| 0x35 | 0 0 1 1 | 0 1 0 1 |

An AnswerFast4 synchronization flag may be selected to ensure that it is not interpreted as a conventional message, but instead appears as noise/ignorable data to a conventional terminal. In an embodiment, one AnswerFast4 Synchronization Flag is inserted immediately before and after each AnswerFast4 Frame. Generally, only one AnswerFast4 Synchronization Flag will exist in between two consecutive AnswerFast4 Frames.

Payload Segmentation and Reassembly (PSR) Procedure

This procedure is identical to Command and Control Segmentation and Reassembly Layer (CCSRL) procedure in C.8.1/H.324 with the following modifications. The FSS LS flag shall be used in place of CCSRL LS. LS shall be set to 1 on the FSS-PDU containing the last segment of an FSS-SDU. It shall be set to 0 otherwise. The SSN shall be set to 0 for the first segment and monotonically incremented for each segment, the maximum value of SSN shall be 6. The value 7 is reserved.

Flag Emulation Avoidance

Before transmitting an FSS frame onto the bearer, an FEA procedure shall be performed against synchronization flags for all mobile levels of H.324. Frame Information, Segment Sequence Number, Payload Length, Payload and CRC are included in the FEA procedure. All octets with values 0xA3, 0x35, 0xE1, 0x4D, 1x1E, 0xB2, 0x19, 0xB1, 0x7E, and 0xC5 shall have an octet with value 0xC5 inserted immediately preceding them.

Mobile Flags Interleaving

According to an embodiment, a terminal should insert stuffing flags of its mobile level, as described in C.6.1/H.324, between FSS Frames separated by one FSS Synchronization Flag. No more than 10 flags shall be inserted. For mobile level 0, no more than 20 flags shall be inserted. A terminal should also insert minimum stuffing flags in between MUX-PDUs until a non-stuffing MUX-PDU is detected.

Figure 40:
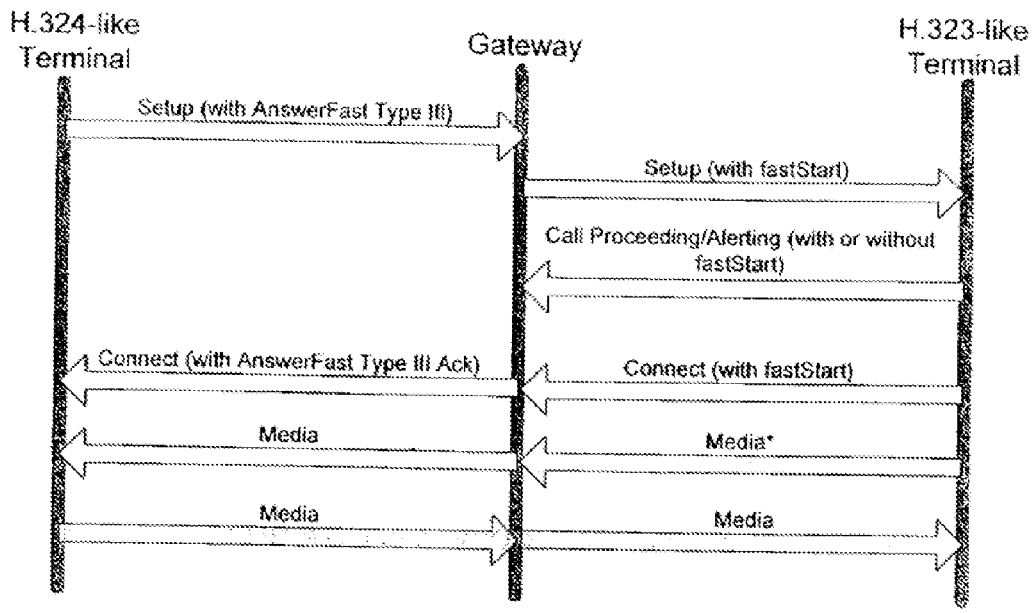
FIG. 40 illustrates an embodiment of the method of using bearer "user" information to reduce connection times for calls between an H.324 terminal and an H.323 terminal using a gateway.

Embodiment in the Context of a H.324/H.323 Gateway:

A further embodiment demonstrating use with a gateway to an H.323 terminal using "FastConnect" is illustrated by FIG. 40. These embodiments offer a maximum reduction in call set up time. These embodiments eliminate all round trip exchange for H.245 messages and, for the H.324 call segment, initial mobile level detection.

Embodiment in the Context of a H.324/SIP Gateway:

The embodiment in this context is similar to that of the H.324/H.323 gateway with the exception that the gateway converts the information (AnswerFast1, 2, 3 and/or 4) to SIP signaling messages.

Terminal Modifications Useful for Example Embodiments of AnswerFast

The 3G modem may contribute to significant increases in the call set up time. Therefore, the operation and interaction of the modem with the call/session set up phase is an area of interest. Merely by way of example, areas in which potential optimization is available include:

1. Modem initialization,
2. Time required from bearer CONNECT signal to bearer channel availability, and
3. Resources required for modem operation.

It is generally expected that the receiver and transmitter sides may be in separate threads. In either case, the thread priority should preferably be set to as high as possible to maintain continuous data flow at the communication bearer.

Embodiments of the present invention minimize the time to ready media processors, which is potentially noticeable, by initializing media input/output (e.g., audio and video) as soon as possible. In a particular embodiment, the optimal time is when a call is going to be made. From the perspective of a caller, this refers to the time when the call button is pressed. From the perspective of an answerer, this refers to the time when the RING tone is detected. Media processors, including audio and video media processors, are provided, one for frame capturing and encoding, and one for decoding and playback.

In a specific embodiment, in order to provide optimal call set up performance, all supported encoders and decoders are made available and ready before the start of AnswerFast procedures. This process is referred to as codec initialization and is applicable to both audio and video. This embodiment has less relevance to system performance when the initialization time is negligible. Of note, for embedded systems, encoders and decoders can be instantiated as soon as the inferred common mode is available, thus allowing time to ready the encoders and decoders as quickly as possible after that event.

Embodiments of the present invention provide for session preparation, in which media devices are initialized and placed in a ready state before the bearer is established. For some applications, optimization may need to be performed to achieve the desired session preparation. These media devices include, but are not limited to:

1. Video capture/camera, including self-view if applicable and associated codecs,
2. Video display and associated codecs,
3. Audio capture/microphone and associated codecs, and
4. Audio playback and associated codecs.

As the techniques presented here are forward compatible with new device capabilities, it would be advantageous to be able to update capabilities and preferences of the device for fast session set up whenever other modifications are made. It is therefore highly desirable that the AnswerFast user entity, as well as the AnswerFast rules and profiles are designed and implemented in a way that allows for simple update to released devices. Merely by way of example, in an embodiment, over the air updates are provided. These over the air updates may be provided either in a combined update or distributed over several updates. When combined, an update of a capability (e.g., a codec) may be coupled with any updates in device preferences, as well as any upgraded rules required for using that capability. One of ordinary skill in the art would recognize many variations, modifications, and alternatives.

Flexibility of AnswerFast Messaging

The AnswerFast messaging system has a range of flexibility both in application and implementation. The information transmission and any rules can cover any configurations desired, and the fully configurable session can be set up in significantly faster time than is available through conventional set up procedures. It is possible to reduce the complexity of rules and implementations by placing certain limitations on the kinds of flexibility available. Primitive versions of the AnswerFast transmissions could be used that are less configurable and flexible, but still yield many advantages. The advantages may be leveraged best in a setting were many homogenous devices, or devices with homogenous characteristics (e.g., the same codecs) are interoperating. In this setting, several assumptions may be made about the expected decisions of the remote device, and in the majority of cases, these assumptions would be confirmed correct. This can give a statistical gain in the performance of the devices, as the number of times an assumption is confirmed would far outweigh the times it is incorrect, which would typically result in a corrective negotiation.

Combinations of Techniques

For example, networks that support the H.324M standard for mobile multi-media telephony may use a number of available session setup schemes. These schemes differ in the speed of the session setup and the flexibility and reliability offered to the terminal and the network. Flexibility refers to the ability of service providers to provide the media in a differentiated way without having to define these new formats as part of the default formats supported by the network. Reliability refers to the confidence in successfully establishing a session. Some session setup methods can be considered lossless in that acknowledgments are mandatory on the communicating devices, while others can be considered highly reliable because of the repetition of messages and other techniques.

Additionally, any terminal may support AnswerFast3 and another terminal may support AnswerFast1/2/4. Both terminals should be able to operate at their common support type (i.e. in this case AnswerFast2) as if the calling terminal would not receive the AnswerFast3 response in the call signaling phase. The general mode is that terminals fall back to the highest common mode and within that mode to the highest supported version. Of course, there may be variations, alternatives, and modifications.

Although each of the above techniques has been described according to specific techniques including AnswerFastSRP, AnswerFast1, AnswerFast2, AnswerFast3, and AnswerFast4, there can be various modifications, alternatives, and variations. That is, one or more of the various types can be combined with other types according to a specific embodiment. Additionally, a specific sequence of methods using certain types can be performed. As merely an example, a method using AnswerFast3 and then AnswerFast4 and then AnswerFast2 and then AnswerFast1 and then a standard mode of operation can be performed. Alternatively, any combination of these types depending upon the application can also be performed according to specific embodiments.

In a specific embodiment, AnswerFast2 may be performed if AnswerFast3 fails or is not supported. Alternatively or in combination, AnswerFast1 may be performed if AnswerFast2 fails or is not supported. AnswerFastSRP may be continued to be used in the case either or both AnswerFast1 and AnswerFast2 are not accepted. Any practical combination of these may be used depending upon a level of support for each of the terminals according to a specific embodiment. In general, however, techniques using the call signaling process for embedding messages for the initial mode of operation may be performed before those techniques using processes after call signaling has been established. Of course, one of ordinary skill in the art would recognize many variations, modifications, and alternatives.

For an H.324 entity which supports all AnswerFast methods, embodiments of the present invention provide methods and system to support fallback procedures when the called H.324 entity does not support one or more of the AnswerFast methods. For example, if a calling terminal begins a call using AnswerFast3, and the called terminal does not support AnswerFast3, the calling terminal will fallback using the following procedures:

AnswerFast4
AnswerFast2

Normal H.245 communication as in Phase D of the terminal procedures specified in 7.4/H.324.

The fallback procedure of AnswerFast3 has been described previously.

If a calling terminal begins or continues a call using AnswerFast4, and the called terminal does not support AnswerFast4, the calling terminal will fallback using the following procedures:

AnswerFast2
Normal H.245 communication as in Phase D of the terminal procedures specified in 7.4/H.324.

The fallback procedure of AnswerFast4 has been described previously. Of course variants of AnswerFast4 methods may be attempted before dropping back to AnswerFast2 if these are present in the terminals.

If a calling terminal begins or continues a call using AnswerFast2, and the called terminal does not support AnswerFast2, the calling terminal will fallback using the following procedure:

Normal H.245 communication as in Phase D of the terminal procedures specified in 7.4/H.324.

The fallback procedure of AnswerFast2 has been described previously.

According to embodiments of the present invention, terminal configurations are utilized to take advantage of the benefits provided by AnswerFast technologies. As an example, embodiments of the present invention utilize SRP extensions (i.e., frame parallel transmission) to provide several benefits. The SRP extension techniques, more fully described in U.S. patent application Ser. No. 10/732,917, previously referenced, could be used in conjunction with the H.245 techniques described herein with respect to AnswerFast1 and AnswerFast2. These techniques will provide benefits including, but not limited to, session resilience, transmission efficiency, and any associated increase in set up performance.

Although each of the techniques has been described according to specific techniques including AnswerFast1, AnswerFast2, AnswerFast3, and AnswerFast4, there can be various modifications, alternatives, and variations. That is, one or more of the various types can be combined with other types according to a specific embodiment. Additionally, a specific sequence of methods using certain types can be performed. As merely an example, a method using AnswerFast3 and then AnswerFast4 and then AnswerFast2 and then AnswerFast1 and then a standard mode of operation can be performed. Alternatively, any combination of these types depending upon the application can also be performed according to specific embodiments. In a specific embodiment, AnswerFast2 may be performed if AnswerFast3 fails or is not supported. Alternatively or in combination, AnswerFast1 may be performed if AnswerFast2 fails or is not supported. Any practical combination of these may be used depending upon a level of support for each of the terminals according to a specific embodiment. In general, however, techniques using the call signaling process for embedding messages for the initial mode of operation may be performed before those techniques using processes after call signaling has been established. Of course, one of ordinary skill in the art would recognize many variations, modifications, and alternatives.

Figure 41:
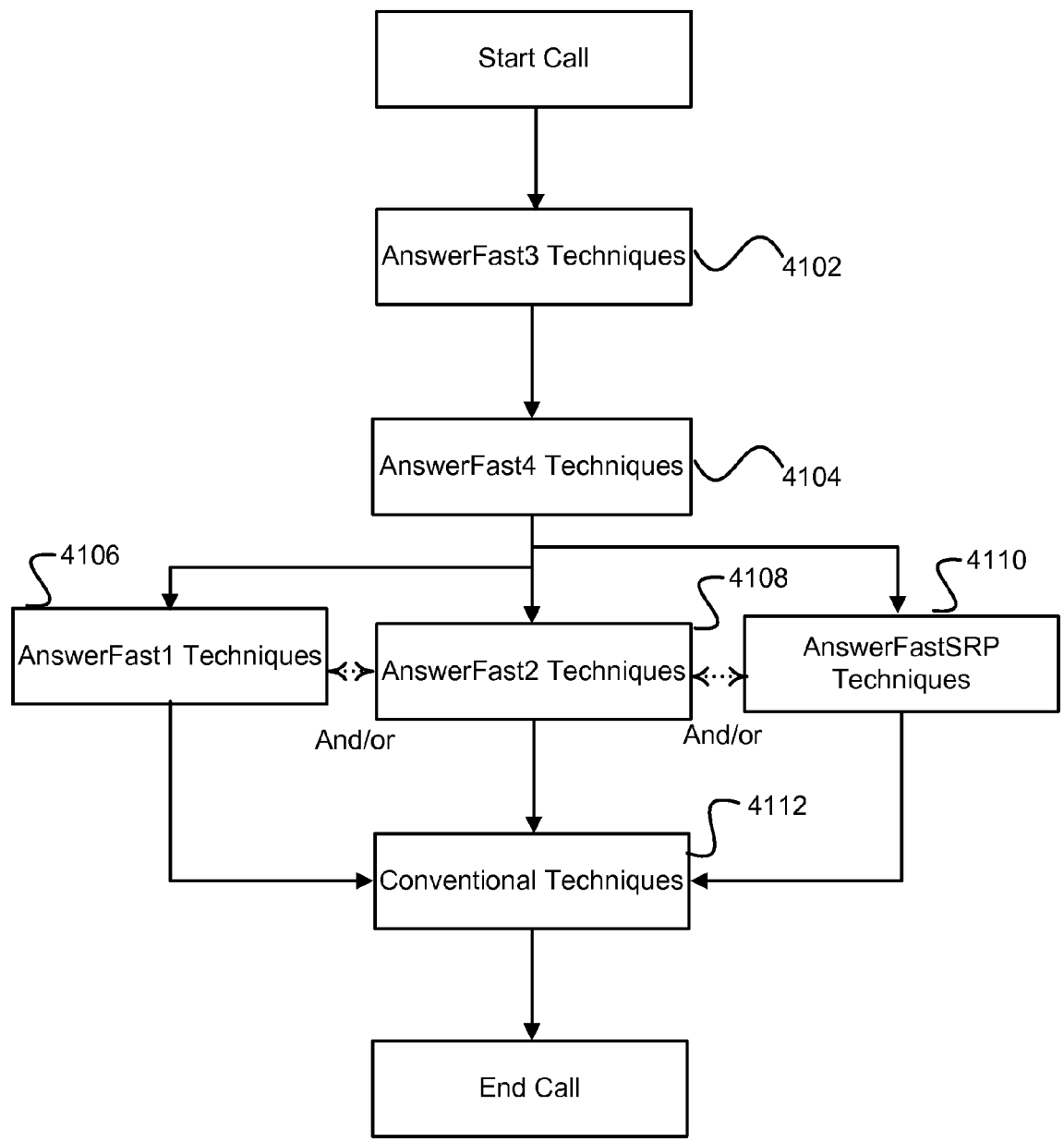
FIG. 41 illustrates a possible hierarchy of AnswerFast methods/techniques.

FIG. 41 illustrates a hierarchy based on time of execution in a call. The hierarchy can also represent a fallback strategy when one technique fails entirely. The hierarchy can similarly represent a refinement/augmentation strategy when an earlier technique does not provide a session with the completely desired characteristics. In this case, a result from the earlier session might be retained, refined or augmented. For example, mobile level selected earlier might be retained, media channels might be refined, or additional media channels might be added. The hierarchy need not be limited to only AnswerFast techniques presently described, many variants exist in the scope of the present invention.

Figure 42:
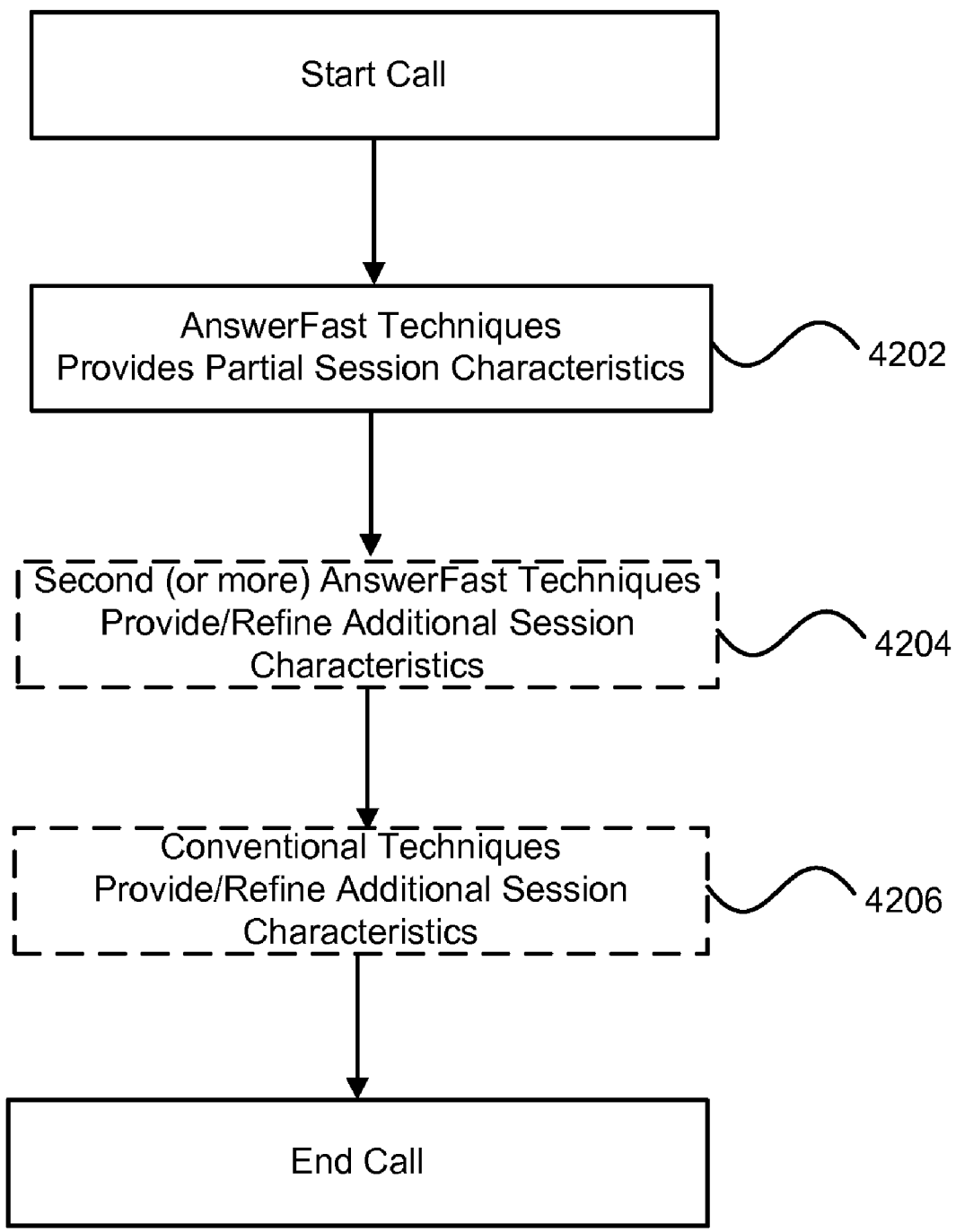
FIG. 42 illustrates a combination of AnswerFast techniques whereby session characteristics are refined in subsequent AnswerFast or conventional techniques.
Figure 43:
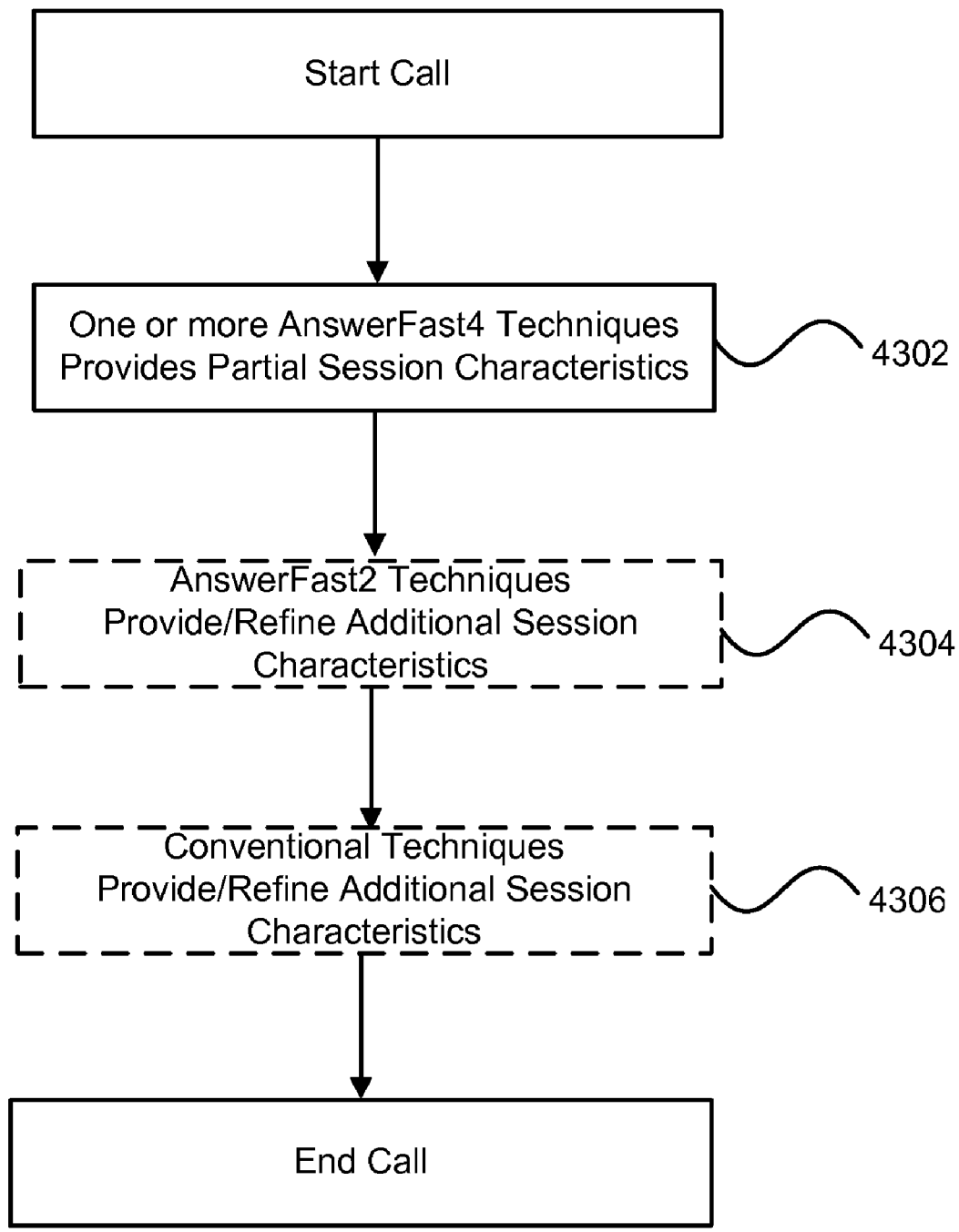
FIG. 43 illustrates a combination of AnswerFast4 and AnswerFast2 techniques whereby session characteristics are refined in subsequent AnswerFast2 or conventional techniques.

FIG. 42 and FIG. 43 show session refinement mechanism whereby characteristics of a session achieved by an initial session setup method are further refined, redefined or augmented according to a second, or additional session setup method, which is preferably an AnswerFast mechanism to ensure speed of session establishment is minimized but may be another technique such as a conventional technique.

FIG. 43 shows in particular a combination for refinement that has substantial benefits. This call sequence attempts to initiate a session optionally using one or more AnswerFast4 variants, such as a profile based version incorporating tunneled/pre-negotiated media, or a fully negotiated version. If after the AnswerFast negotiations are complete, there are aspects of the desired session that were unfulfilled then a subsequent AnswerFast stage may be used to further refine the characteristics. In this case, AnswerFast2 is used to refine the session, but it adopts characteristics such as mobile level and any existing media channels, and augments the session with additional media channels, additional multiplexer table entries and also any other session capabilities or information desired (these additional capabilities/information may be provided using conventional techniques also). For speed interoperating with a like terminal as well as other terminals the AnswerFast2 technique preferably also encompasses an AnswerFast1 and an AnswerFastSRP technique although this is optional.

Various combinations of the Answerfast techniques have particular value in their speed, flexibility, and/or tradeoffs they offer. A few of these are illustrated by the following examples:

AnswerFast Combination Class I.1

This combination of techniques combines various AnswerFast4 techniques and AnswerFast2 techniques. The AnswerFast4 profiles (inclusive of tunneled media), and the AnswerFast4 negotiated media are combined using a common preference message format and possibly one or more common preference expressions such as mobile level and combined with optional conventional mobile level interleaving. The selection between using an AnswerFast profile based media and AnswerFast explicitly negotiated media is made either by predetermined arrangement of a hierarchy of the two techniques, or an expression of support and a preference (such as signaling supported and signaling preferred). The preference may be included in preference message, implicit in the media or some other way. Generally this combination will be able to attempt to negotiate a session using AnswerFast4 profiles or AnswerFast4 negotiated, but in the cases this happens or negotiation fails or establishes only a partial session, then the session negotiation continues in H.245 control channel messages, in particular an AnswerFast2 mechanism expressed in a TerminalCapabilitySet field such as the genericInformation field. In order to ensure no time is lost in a mobile level mismatch, the AnswerFast2 technique uses the mobile level as negotiated in the AnswerFast4 common preferences. The combination may also benefit from overriding or redefining a decision from the AnswerFast4 common preferences using a later message, such as in the AnswerFast2 negotiations or in normal H.245 messages. In particular, the master slave determination as decided in AnswerFast4 negotiations may be re-determined using H.245 to ensure it can be controlled more easily in infrastructure and the like.

The combination will also interoperate with conventional terminals in a time that is almost negligibly different to another conventional terminal. This combination may further optionally support AnswerFastSRP and AnswerFast1 in order to obtain the best performance for AnswerFast2 and interoperation with legacy devices.

The performance of this combination would be displayable media received in around 0.5 RTD (or 1.0 RTD) for the AnswerFast4 tunneled media mode, displayable media received in around 1.0 RTD for the AnswerFast4 negotiated media mode, displayable media received in around 1.5 RTD for the AnswerFast2 media.

Combination Class I.2

This combination is similar to the combination Class I.1 and is interoperable with it. However, in this case, the AnswerFast4 profiles do not attempt to use tunneled/non-negotiated media. The terminals instead elect to wait until preferences are received from the other terminal and then elect to send profile based media if allowed by any mode selection algorithms. The performance of this combination would be displayable media received in around 1.0 RTD for the AnswerFast4 tunneled media mode, displayable media received in around 1.0 RTD for the AnswerFast4 negotiated media mode, displayable media received in around 1.5 RTD for the AnswerFast2 media. This combination can interoperate with Class I.1 using AnswerFast4 profiles, AnswerFast4 negotiated or AnswerFast2.

Combination Class II.1

This combination is similar to the combination Class I.1 and is interoperable with it. However, in this case, there is no use of the AnswerFast4 negotiated technique. The performance of this combination would be displayable media received in around 0.5 RTD (or 1.0 RTD) for the AnswerFast4 tunneled media mode, displayable media received in around 1.5 RTD for the AnswerFast2 media. This combination can interoperate with Class Is using AnswerFast4 profiles or AnswerFast2.

Combination Class II.2

This combination is similar to the combination Class I.1 and is interoperable with it. However, in this case, there is no use of the AnswerFast4 negotiated technique and the AnswerFast4 profiles do not attempt to use tunneled/non-negotiated media. The terminals instead elect to wait until preferences are received from the other terminal and then elect to send profile based media if allowed by any mode selection algorithms.

The performance of this combination would be displayable media received in around 1.0 RTD for the AnswerFast4 tunneled media mode and displayable media received in around 1.5 RTD for the AnswerFast2 media. This combination can interoperate with Class Is using AnswerFast4 profiles, AnswerFast4 negotiated or AnswerFast2 and Class II.1 using AnswerFast4 profiles or AnswerFast2.

Combination Class III

This combination is similar to the combination Class I.1 and is interoperable with it. However in this case there is no use of the AnswerFast4 profiles. The performance of this combination would be displayable media received in around 1.0 RTD for the AnswerFast4 negotiated mode, displayable media received in around 1.5 RTD for the AnswerFast2 media. This combination can interoperate with Class I methods using AnswerFast4 negotiated or AnswerFast2 and Class II methods using AnswerFast2. Variants of Class III may also elect to not perform negotiations until after receiving a preference message from the remote.

Combination Class IV

This combination is interoperable with the combination Class I, II and III but only uses minimal AnswerFast4 common information before continuing in AnswerFast2. It does not use AnswerFast4 profiles or AnswerFast4 negotiated. The performance of this combination would be displayable media received in around 1.5 RTD for the AnswerFast2 media. This combination can interoperate with the methods Class I, II, and III using AnswerFast2.

Variants of Class IV may also elect to not use the common AnswerFast4 information and may instead perform conventional techniques, or other techniques such as preconfigured or implicit selection, to determine other session characteristics such as multiplexer level.

Combination Class H.245-1

This combination of techniques combines AnswerFast1 techniques and AnswerFastSRP techniques. It is also interoperable with AnswerFast1 alone, AnswerFastSRP alone and conventional setup. This provides primarily the benefits of the AnswerFast1 technique, but the AnswerFastSRP technique provides advantages particularly in the case of errors and large H.245 messages (that require segmentation).

The performance of this method is about the same as normal AF1, however it improves by 0.5 RTD over AnswerFast1 with each SRP frame that may be sent without acknowledgement (i.e. for each segment of a larger message). It also affords the benefits of allowing smaller SRP segments with no cost to performance allowing slightly better performance in mobile networks as compared to larger messages.

Combination Class H.245-2

This combination of techniques combines AnswerFast1 techniques, AnswerFast2 techniques and AnswerFastSRP techniques. This provides a reasonably fast and flexible setup when talking to like combination terminals and also a fast, almost negligible, fallback when talking to Class H.245-1 terminals. It also has the benefit of having a reasonable simple implementation. It is also interoperable with AnswerFast1, AnswerFastSRP and conventional setup.

The performance of this method is about the same as normal AF2, however it improves by 0.5 RTD over AnswerFast1 with each SRP frame that may be sent without acknowledgement (i.e. for each segment of a larger message). Also, it has significant advantages when communicating with AnswerFast1, AnswerFast2 or AnswerFastSRP devices.

It is recognizable, for those skilled in the art and familiar with the field, that it may be attractive to allow a terminal or a node in the network to use a number of session setup schemes, taking advantage of the strengths of the different schemes in different situations.

To allow a meaningful co-existence of separate session setup schemes, embodiments of the present invention provide a method and apparatus adapted for use in the management of the session setup schemes or protocols. Thus, according to embodiments of the present invention, a method of allowing a terminal or node to use a number of session setup schemes is provided.

Figure 3:
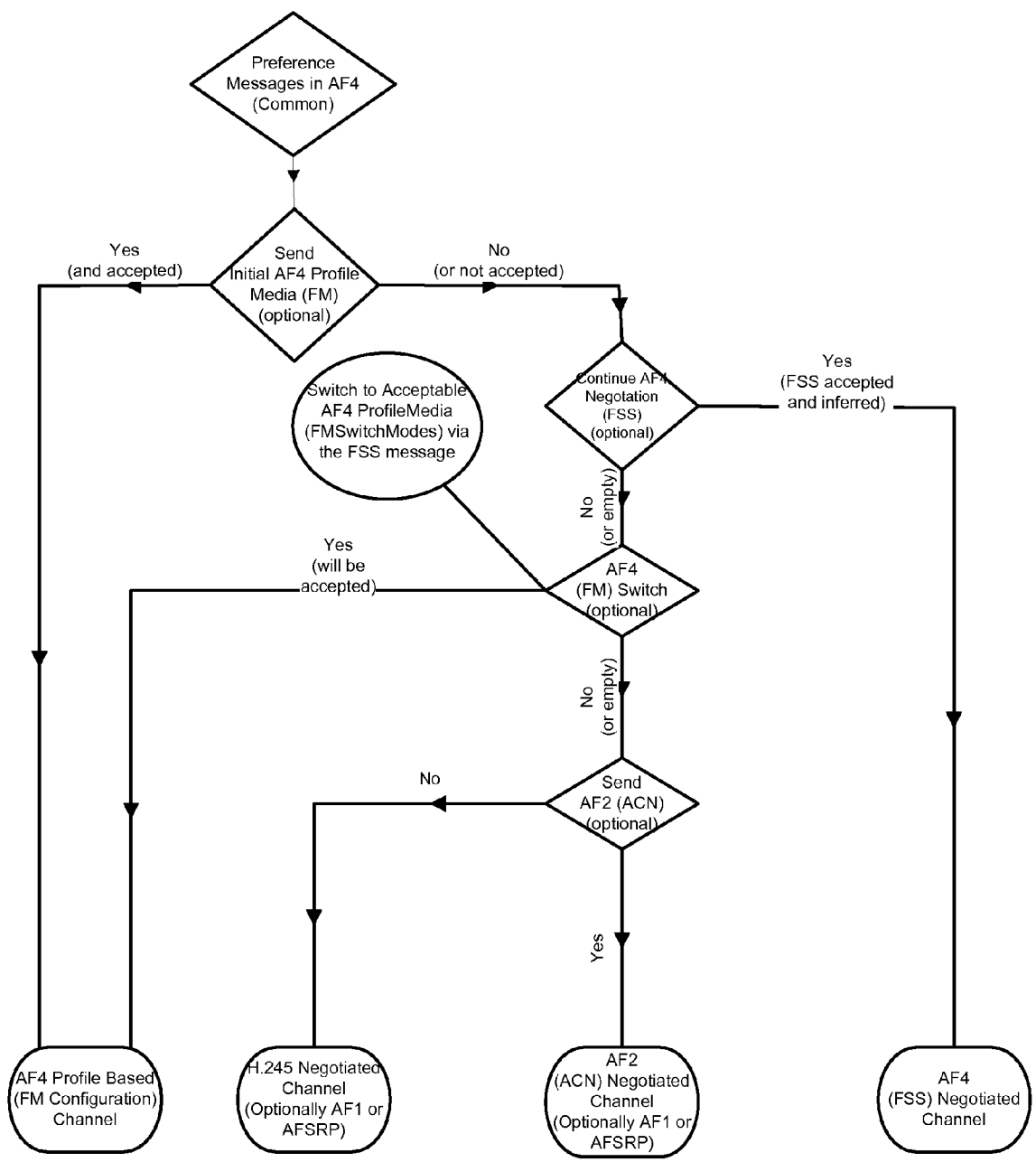
FIG. 3 is a simplified flowchart illustrating a method of combining several session setup techniques according to an embodiment of the present invention.

In an embodiment of the present invention, initial preference messages are sent by both terminals and/or nodes after a bearer channel has been established. The bearer channel is the channel established by the network that carries information between the terminals and/or the nodes. Referring to FIG. 3, these messages may be referred to as "bullets". Typically, these messages carry a small amount of information that express some of the capabilities and preferences (as in which media types the device prefers to use, and possibly which algorithms are supported and/or preferred) of each of the communicating devices (whether they be terminals or nodes).

Using the received information, the communicating devices use a common decision making algorithm to determine which session setup mechanism is used. Once the session setup is complete, media flows between the communicating devices until the session is closed.

In FIG. 3, the "bullets" carry the information referred to above. Using this information, a decision is made on whether the fastest session setup method should be used, in this case the fastest method is an AnswerFast4 technique that tunnels media encapsulated in preference messages according to a limited set of preconfigured channel profiles (referred to as FM in FIG. 3), the use of these profiles causes this technique to have lower flexibility than the other methods. Further details of tunneling information and media in pre-negotiation messages may be found throughout the present specification. If the decision is made to use the fastest session setup method, then the session is created in that manner, or at least an attempt is made that may result in either a complete session or may result in a partial session containing only a subset of the desired number of media/data channels. Such missing desired channels might cause an attempt to establish these additional channels using a fallback technique.

If session creation fails using the fastest method, then a common, reliable method (and most time consuming method, referred to as H.245 in FIG. 3) may be used to setup the session. More flexibility can be added to the session setup by the optional adoption of a more flexible session setup method, but that is still based on AnswerFast4 techniques (for example in FIG. 3, FSS is included) further details of which are also found in the applications recited in the previous paragraph. FSS allows the communicating devices to share more information and thus consumes more time while allowing additional flexibility to the way media is communicated between the communicating devices because both terminals both have access to at least a reasonable amount of preference information received from the other terminal.

Again, if the session setup fails, then the slowest and most reliable accelerated session setup method may be used. However, it should be noted that performance, even if in only a few cases, may not be acceptable to device manufacturers or the consumer and so a reliable session setup scheme which is slightly faster than the most reliable scheme could optionally be included in the device. This slightly faster version could be a variant of AnswerFast2, a variant of AnswerFast1 or a variant of AnswerFastSRP, or a combination of all three. In FIG. 3, this scheme is referred to as ACN, and it is an AnswerFast2 technique that preferably employs AnswerFast1 and AnswerFastSRP to achieve its best performance. Accelerated H.245 procedures such as those employed in ACN typically involve the transmission of more information and the acknowledgement of more of that information than the faster session setup schemes. As with the other schemes, if the session fails to be established, then the most reliable session setup scheme will be used. In this way, a number of session setup schemes can be used in the same communication device to allow the advantages of the various schemes to be realized in different situations.

With reference to FIG. 3, it should be noted that if an optional element is not implemented, not used, or fails for one or more reasons, the "No" path is utilized. Additionally, conventional mobile level flags may be interleaved up to a point at which the peer terminals support for the set of procedures illustrated is determined. Furthermore, it should be noted that the established sessions may optionally be further refined and/or augmented using additional session setup techniques. For example, an AnswerFast4 session may be refined using AnswerFast2 session setup techniques. Moreover, other sessions may be refined using H.245 procedures.

Embodiments of the present invention allows the different session setup schemes or protocols to operate in the same device with a meaningful result. Moreover, embodiments provide for scalable session setup creation, where speed is traded with flexibility and reliability. A further advantage of embodiments of the present invention is that methods and systems provided herein allow a subset of the available session setup schemes to be used in any one device and still operate reliably with devices that implement a smaller or larger subset.

As would be obvious there are many variations, alternatives and modifications of which of the various session acceleration techniques might be combined and the extent of their combination and cross-use of information between the techniques. As described more fully throughout the present specification, embodiments of the present invention combine one or more accelerated or conventional session setup techniques in a hierarchical manner. Such session setup techniques may be combined in various manners as described herein. In addition to the embodiments described, other combinations may also be performed according to alternative embodiments. For example, alternative embodiments of the present invention may combine the session setup techniques outlined above in a different order. Moreover, the various techniques may include multiple sub-techniques that may be performed in various orders and combinations as appropriate to the individual technique. Furthermore, additional techniques may be added or removed depending on the particular applications. One of ordinary skill in the art would recognize many variations, modifications, and alternatives.

The examples and embodiments described herein are for illustrative purposes only. Various modifications or changes in light thereof will be suggested to persons skilled in the art and are to be included within the spirit and purview of this application and scope of the appended claims. It is not intended that the invention be limited, except as indicated by the appended claims.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one of ordinary skill in the art would recognize many other variations, modifications, and alternatives.

The examples and embodiments described herein are for illustrative purposes only. Various modifications or changes in light thereof will be suggested to persons skilled in the art and are to be included within the spirit and purview of this application and scope of the appended claims. It is not intended that the invention be limited, except as indicated by the appended claims.

What is claimed is:

1. A method of establishing a session between a first device and a second device, the session being established over a telecommunications network using an accelerated session setup technique, the method comprising:
   providing a first accelerated session setup technique comprising transmitting media on an early bearer;
   providing a second accelerated session setup technique comprising transmitting session preference information on the early bearer;
   providing a third accelerated session setup technique comprising using a field in an H.245 message and receiving an acknowledgement from the second device; and
   establishing the session using either the first accelerated session setup technique, the second accelerated session setup technique, or the third accelerated session setup technique based on a predetermined process.

2. The method of claim 1 wherein the predetermined process comprises:
   attempting to establish the session using the first accelerated session setup technique; and
   determining that the first accelerated session setup technique failed; and
   establishing the session using the second accelerated session setup technique.

3. The method of claim 1 wherein a session establishment time associated with the first accelerated session setup technique is less than a session establishment time associated with the second accelerated session setup technique.

4. A telecommunications apparatus comprising:
   a first processor adapted to attempt session establishment using a first session establishment technique comprising transmitting media on an early bearer;
   a second processor adapted to attempt session establishment using a second session establishment technique comprising transmitting session preference information on the early bearer;
   a third processor adapted to attempt session establishment using a third session establishment technique comprising using a field in an H.245 message and receiving an acknowledgement; and
   a transmitter adapted to transmit audio and video information in accordance with a session established in whole or in part by the first processor, the second processor, or the third processor.

5. The telecommunications apparatus of claim 4 wherein the first session establishment technique further comprises transmitting media sent before a negotiation process using one or more preconfigured profiles.

* * * * *